US008924422B2

(12) United States Patent
Minamizawa

(10) Patent No.: US 8,924,422 B2
(45) Date of Patent: Dec. 30, 2014

(54) CONDITION MATCHING SYSTEM, LINKED CONDITIONAL MATCHING DEVICE, AND CONDITION MATCHING PROCESSING METHOD

(75) Inventor: Takeaki Minamizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 107 days.

(21) Appl. No.: 13/818,269

(22) PCT Filed: Aug. 11, 2011

(86) PCT No.: PCT/JP2011/004554
§ 371 (c)(1),
(2), (4) Date: Feb. 21, 2013

(87) PCT Pub. No.: WO2012/026082
PCT Pub. Date: Mar. 1, 2012

(65) Prior Publication Data
US 2013/0159336 A1    Jun. 20, 2013

(30) Foreign Application Priority Data
Aug. 25, 2010    (JP) ................................. 2010-188543

(51) Int. Cl.
*G06F 17/30*    (2006.01)
*G06F 21/62*    (2013.01)
*H04L 29/06*    (2006.01)

(52) U.S. Cl.
CPC ....... *G06F 17/30386* (2013.01); *H04L 63/0815* (2013.01); *G06F 21/6254* (2013.01)
USPC ............ 707/791; 707/802; 707/822; 707/828

(58) Field of Classification Search
CPC ................................. G06F 17/00; G06F 17/30
USPC .............................................. 707/600–899
See application file for complete search history.

(56) References Cited

U.S. PATENT DOCUMENTS

2003/0115327 A1*    6/2003    Kokado et al. ................ 709/225

FOREIGN PATENT DOCUMENTS

JP    2002-288136 A    10/2002
JP    2003-331148 A    11/2003
(Continued)

OTHER PUBLICATIONS

Scott Cantor, et al., "Assertions and Protocols for the OASIS Security Assertion Language (SAML) V 2.0", OASIS Standards, "3.8 Name Identifier Mapping Protocol", Mar. 15, 2005, p. 63 of 86, OASIS, Internet, <http://docs.oasis-open.org/security/saml/v2.0/saml-core-2.0-os.pdf>.

(Continued)

*Primary Examiner* — Isaac M Woo
(74) *Attorney, Agent, or Firm* — Sughrue Mion, PLLC

(57) ABSTRACT

A condition matching system is provided which can specify users who match predetermined conditions, in the state where various categories of user information are held decentrally, while suppressing processing load and network load. User ID supplying means 91 stores user ID transmission status information indicating which user's user ID has been transmitted to which condition matching device. Linked conditional matching means 93 causes user ID selecting means 94 to select a user ID of any user having his/her user IDs transmitted respectively to condition matching devices 90 that received conditions from condition designating means 92. In response to a request from the linked conditional matching means 93, the user ID selecting means 94 selects user IDs on the basis of the user ID transmission status information. The linked conditional matching means 93 uses the user IDs to cause the respective condition matching devices 90 to sequentially narrow down the users who meet the conditions.

10 Claims, 21 Drawing Sheets

(56) References Cited

FOREIGN PATENT DOCUMENTS

| JP | 2004-54312 | A | 2/2004 |
|----|------------|---|--------|
| JP | 2004-86536 | A | 3/2004 |
| JP | 2005-128672 | A | 5/2005 |
| JP | 2006-79588 | A | 3/2006 |
| JP | 4195450 | B2 | 12/2008 |
| JP | 4303130 | B2 | 7/2009 |
| JP | 2010-165306 | A | 7/2010 |
| JP | 2010-186250 | A | 8/2010 |

OTHER PUBLICATIONS

Tsutomu Matsumoto, "On Shared Attribute Certification", IPSJ SIG Technical Reports, Jul. 22, 2005, pp. 321-328, vol. 2005, No. 70.

* cited by examiner

| ACCOUNT ID | HOBBY |
|---|---|
| hina | SPORT, MOVIE |
| miu | SPORT, GAME |
| misaki | TRAVEL |
| ayano | TRAVEL, SPORT |
| syou | COOKING, SPORT |
| sakura | COOKING, SEWING, SPORT |
| eita | FISHING |
| : | : |

(b)

| ACCOUNT ID | AGE GROUP |
|---|---|
| hina | 30 |
| misaki | 30 |
| ayano | 40 |
| hiroto | 30 |
| syou | 30 |
| sakura | 30 |
| eita | 20 |
| : | : |

(c)

| ACCOUNT ID | GENDER |
|---|---|
| hina | FEMALE |
| miu | FEMALE |
| misaki | FEMALE |
| ayano | FEMALE |
| hiroto | MALE |
| syou | MALE |
| sakura | FEMALE |
| : | : |

| ACCOUNT ID | PROVISIONAL USER ID |
|---|---|
| hina | USER-A-001 |
| miu | USER-A-002 |
| misaki | USER-A-003 |
| ayano | USER-A-004 |
| syou | USER-A-006 |
| sakura | USER-A-007 |
| eita | USER-A-008 |
| ⋮ | ⋮ |

(b)

| ACCOUNT ID | PROVISIONAL USER ID |
|---|---|
| hina | USER-B-001 |
| misaki | USER-B-003 |
| ayano | USER-B-004 |
| hiroto | USER-B-005 |
| syou | USER-B-006 |
| sakura | USER-B-007 |
| eita | USER-B-008 |
| ⋮ | ⋮ |

(c)

| ACCOUNT ID | PROVISIONAL USER ID |
|---|---|
| hina | USER-C-001 |
| miu | USER-C-002 |
| misaki | USER-C-003 |
| ayano | USER-C-004 |
| hiroto | USER-C-005 |
| syou | USER-C-006 |
| sakura | USER-C-007 |
| ⋮ | ⋮ |

| LINKED CONDITIONAL ID | MATCHING CONDITION |
|---|---|
| ⋮ | ⋮ |
| 123 | HOBBY = SPORT |

(b)

| LINKED CONDITIONAL ID | MATCHING CONDITION |
|---|---|
| ⋮ | ⋮ |
| 123 | AGE GROUP = 30 |

(c)

| LINKED CONDITIONAL ID | MATCHING CONDITION |
|---|---|
| ⋮ | ⋮ |
| 123 | GENDER = FEMALE |

FIG. 5

| SINGLE SIGN-ON ID | ADDRESS OF CONDITION MATCHING EXECUTION UNIT IN EACH CONDITION MATCHING DEVICE | | |
|---|---|---|---|
| | http://matching-a.com | http://matching-b.com | http://matchin-c.com |
| USER-001 | USER-A-001 | USER-B-001 | USER-C-001 |
| USER-002 | USER-A-002 | UNISSUED | USER-C-002 |
| USER-003 | USER-A-003 | USER-B-003 | USER-C-003 |
| USER-004 | USER-A-004 | USER-B-004 | USER-C-004 |
| USER-005 | UNISSUED | USER-B-005 | USER-C-005 |
| USER-006 | USER-A-006 | USER-B-006 | USER-C-006 |
| USER-007 | USER-A-007 | USER-B-007 | USER-C-007 |
| USER-008 | USER-A-008 | USER-B-008 | UNISSUED |
| ⋮ | ⋮ | ⋮ | ⋮ |

FIG. 13

| SINGLE SIGN-ON ID | ADDRESS OF CONDITION MATCHING EXECUTION UNIT IN EACH CONDITION MATCHING DEVICE | | |
|---|---|---|---|
| | http://matching-a.com | http://matching-b.com | http://matchin-c.com |
| USER-001 | USER-A-001@IDP-X | USER-B-001@IDP-X | USER-C-001@IDP-X |
| USER-002 | USER-A-002@IDP-X | UNISSUED | USER-C-002@IDP-X |
| USER-003 | USER-A-003@IDP-X | USER-B-003@IDP-X | USER-C-003@IDP-X |
| USER-004 | USER-A-004@IDP-X | USER-B-004@IDP-X | USER-C-004@IDP-X |
| ⋮ | ⋮ | ⋮ | ⋮ |

FIG. 14

| SINGLE SIGN-ON ID | ADDRESS OF CONDITION MATCHING EXECUTION UNIT IN EACH CONDITION MATCHING DEVICE | | |
|---|---|---|---|
| | http://matching-a.com | http://matching-b.com | http://matchin-c.com |
| USER-005 | UNISSUED | USER-B-005@IDP-Y | USER-C-005@IDP-Y |
| USER-006 | USER-A-006@IDP-Y | USER-B-006@IDP-Y | USER-C-006@IDP-Y |
| USER-007 | USER-A-007@IDP-Y | USER-B-007@IDP-Y | USER-C-007@IDP-Y |
| USER-008 | USER-A-008@IDP-Y | USER-B-008@IDP-Y | UNISSUED |
| ⋮ | ⋮ | ⋮ | ⋮ |

| ACCOUNT ID | PROVISIONAL USER ID |
|---|---|
| hina | USER-A-001@IDP-X |
| miu | USER-A-002@IDP-X |
| misaki | USER-A-003@IDP-X |
| ayano | USER-A-004@IDP-X |
| syou | USER-A-006@IDP-Y |
| sakura | USER-A-007@IDP-Y |
| eita | USER-A-008@IDP-Y |
| ⋮ | ⋮ |

(b)

| ACCOUNT ID | PROVISIONAL USER ID |
|---|---|
| hina | USER-B-001@IDP-X |
| misaki | USER-B-003@IDP-X |
| ayano | USER-B-004@IDP-X |
| hiroto | USER-B-005@IDP-Y |
| syou | USER-B-006@IDP-Y |
| sakura | USER-B-007@IDP-Y |
| eita | USER-B-008@IDP-Y |
| ⋮ | ⋮ |

(c)

| ACCOUNT ID | PROVISIONAL USER ID |
|---|---|
| hina | USER-C-001@IDP-X |
| miu | USER-C-002@IDP-X |
| misaki | USER-C-003@IDP-X |
| ayano | USER-C-004@IDP-X |
| hiroto | USER-C-005@IDP-Y |
| syou | USER-C-006@IDP-Y |
| sakura | USER-C-007@IDP-Y |
| ⋮ | ⋮ |

FIG. 16

| USER ID DOMAIN |
|---|
| @IDP-X |
| @IDP-Y |

CONDITION MATCHING SYSTEM, LINKED CONDITIONAL MATCHING DEVICE, AND CONDITION MATCHING PROCESSING METHOD

CROSS REFERENCE TO RELATED APPLICATIONS

This application is a National Stage of International Application No. PCT/JP2011/004554 filed Aug. 11, 2011, claiming priority based on Japanese Patent Application No. 2010-188543 filed Aug. 25, 2010, the contents of all of which are incorporated herein by reference in their entirety.

TECHNICAL FIELD

The present invention relates to a condition matching system and condition matching processing method for specifying users who match predetermined conditions, and a linked conditional matching device and linked conditional matching program for using a plurality of devices that store information on users to perform the processing of sequentially narrowing down users who match predetermined conditions.

BACKGROUND ART

Recently, there are an increasing number of configurations in which multiple sets of information held by multiple business operators are combined to provide a new service on the Internet. This configuration is generally called a mashup service.

Further, a single sign-on has become widespread which allows a user to perform logon processing only once to use services offered by a plurality of business operators. The single sign-on mechanism performs association (ID federation) of user IDs owned by different business operators, to thereby allow each business operator to verify the identity of the user who is the owner of the user information (personal information) provided to the business operator.

It is conceivable to implement a mashup service with high added value by utilizing the user information that the users have provided to the business operators as described above. In the case of implementing such a mashup service, a person who wishes to provide the mashup service may acquire user information from various business operators who have already provided services to the users and utilize the acquired user information. An example of such acquisition and utilization of user information is proposed in SAML (Security Assertion Markup Language) developed by a standards organization called OASIS (Organization for the Advancement of Structured Information Standards) (see Non Patent Literature (NPL) 1). In SAML, it is proposed, in the specification called NameIDMapping, to acquire encrypted user IDs from the business operators who hold user information, and use the encrypted user IDs to acquire the user information for utilization.

Further, the single sign-on systems are described in Patent Literatures (PTLs) 1 to 3, and so on. For example, PTL 1 describes an authentication information database in which user identification information, authentication information corresponding to the systems operated by different business operators, and single sign-on IDs as required, are stored in association with each other.

PTLs 2 and 3 also describe the systems utilizing single sign-on.

Further, PTL 4 describes a business model in which a reception site of user information is provided for each business operator (shop) in a particular regional shopping area, and a distributor centrally manages the collected user information (including mail addresses), adjusts the distribution information for the respective business operators to an appropriate quality and amount, and transmits the information to the user terminals during optimal time zones.

CITATION LIST

Patent Literatures

PTL 1: Japanese Patent Application Laid-Open No. 2004-86536 (paragraph 0026)
PTL 2: Japanese Patent No. 4303130
PTL 3: Japanese Patent No. 4195450
PTL 4: Japanese Patent Application Laid-Open No. 2004-54312 (paragraphs 0033, 0041, 0047, 0055 etc.)

Non Patent Literature

NPL 1: Scott Cantor, John Kemp, Rob Philpott, Eve Maler, "Assertions and Protocols for the OASIS Security Assertion Language (SAML) V 2.0", OASIS Standards, "3.8 Name Identifier Mapping Protocol", Page 63 of 86, [online], Mar. 15, 2005, OASIS, [searched Jul. 13, 2010], Internet <http://docs.oasis-open.org/security/saml/v2.0/saml-core-2.0-os.pdf>

SUMMARY OF INVENTION

Technical Problem

In the case where user information is collected from various business operators who hold the user information and the collected user information is used to provide a mashup service, the user information may be leaked to a third party due to the vulnerability of the communication network used for collecting the user information, or the vulnerability of the processing server or data server that hold the user information collected from the business operators.

Further, in order to select the users as the destinations of information, for example, user information may be collected from various business operators who already hold the user information, and the users may be selected on the basis of the collected user information. In such a case as well, the user information may be leaked to a third party as described above. In order to prevent such leakage of information, it is preferable not to collect user information from the business operators who hold the user information.

It is also preferable that, in the state where various categories of user information are held decentrally by various business operators, users who match predetermined conditions can be specified under suppressed network load and processing load.

In view of the foregoing, an object of the present invention is to provide a condition matching system and condition matching processing method that can specify users who match predetermined conditions, in the state where various categories of user information are held decentrally, while suppressing the processing load and network load.

Another object of the present invention is to provide a linked conditional matching device and linked conditional matching program, adapted to the above condition matching system, for implementing the processing of sequentially narrowing down the users who match the predetermined conditions with a light load, in the state where various categories of user information are held decentrally.

Solution to Problem

A condition matching system according to the present invention includes a plurality of condition matching devices each specifying any user whose user information matches a designated condition, the system including: user ID supplying means operable, in response to reception of condition matching device identification information for identifying a condition matching device from a user terminal, to transmit a user ID of a user who uses the user terminal to the condition matching device identified by the condition matching device identification information, and store user ID transmission status information indicating which user's user ID has been transmitted to which condition matching device; condition designating means for transmitting a plurality of conditions that should be met by user information and that have been determined for different categories of user information, respectively to the condition matching devices which store user information of the categories corresponding to the conditions; linked conditional matching means for repeating processing of causing a respective condition matching device that has received a condition from the condition designating means to specify a user ID of any user whose user information matches the condition, to thereby specify the user ID of any user whose user information of the respective categories for which the conditions have been determined meets the corresponding conditions; and user ID selecting means for selecting a user ID of any user having his/her user IDs transmitted respectively to the condition matching devices that have received the conditions from the condition designating means, on the basis of the user ID transmission status information stored in the user ID supplying means; wherein the linked conditional matching means causes the user ID selecting means to select user IDs, and transmits a list of the selected user IDs to a condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

Further, a linked conditional matching device according to the present invention is connected to a plurality of condition matching devices and condition designating means via a communication network, each condition matching device specifying any user whose user information matches a designated condition, the condition designating means transmitting a plurality of conditions that should be met by user information and that have been determined for different categories of user information, respectively to the condition matching devices which store user information of the categories corresponding to the conditions, the linked conditional matching device including: user ID supplying means operable, in response to reception of condition matching device identification information for identifying a condition matching device from a user terminal, to transmit a user ID of a user who uses the user terminal to the condition matching device identified by the condition matching device identification information, and store user ID transmission status information indicating which user's user ID has been transmitted to which condition matching device; linked conditional matching means for repeating processing of causing a respective condition matching device that has received a condition from the condition designating means to specify a user ID of any user whose user information matches the condition, to thereby specify the user ID of any user whose user information of the respective categories for which the conditions have been determined meets the corresponding conditions; and user ID selecting means for selecting a user ID of any user having his/her user IDs transmitted respectively to the condition matching devices that have received the conditions from the condition designating means, on the basis of the user ID transmission status information stored in the user ID supplying means; wherein the linked conditional matching means causes the user ID selecting means to select user IDs, and transmits a list of the selected user IDs to a condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

Further, a linked conditional matching device according to the present invention is connected to a plurality of condition matching devices, condition designating means, and user ID supplying means via a communication network, each condition matching device specifying any user whose user information matches a designated condition, the condition designating means transmitting a plurality of conditions that should be met by user information and that have been determined for different categories of user information, respectively to the condition matching devices which store user information of the categories corresponding to the conditions, the user ID supplying means being operable, in response to reception of condition matching device identification information for identifying a condition matching device from a user terminal, to transmit a user ID of a user who uses the user terminal and user ID supplier identification information for identifying a user ID supplier that the user terminal is using, to the condition matching device identified by the condition matching device identification information, and store user ID transmission status information indicating which user's user ID has been transmitted to which condition matching device, the linked conditional matching device including: user ID supplier identification information storing means for storing predetermined user ID supplier identification information; linked conditional matching means for repeating processing of causing a respective condition matching device that has received a condition from the condition designating means to specify a user ID of any user whose user information matches the condition, to thereby specify the user ID of any user whose user information of the respective categories for which the conditions have been determined meets the corresponding conditions; and user ID selecting means for selecting a user ID of any user having his/her user IDs transmitted respectively to the condition matching devices that have received the conditions from the condition designating means, on the basis of the user ID transmission status information stored in the user ID supplying means; wherein the linked conditional matching means transmits the user ID supplier identification information stored in the user ID supplier identification information storing means to one of the condition matching devices that have received the conditions from the condition designating means, to cause the condition matching device to specify, from among user IDs associated with the user ID supplier identification information, the user ID of any user whose user information matches the condition transmitted to the condition matching device, causes the user ID selecting means to select, from among the user IDs, the user ID of any user having his/her user IDs transmitted respectively to the condition matching devices that have received the conditions from the condition designating means, and transmits a list of the selected user IDs to another condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

Further, a condition matching method according to the present invention includes: a step, performed by user ID supplying means, of, in response to reception of condition matching device identification information for identifying a condition matching device from a user terminal, transmitting a user ID of a user who uses the user terminal to the condition matching device identified by the condition matching device identification information, and storing user ID transmission status information indicating which user's user ID has been transmitted to which condition matching device; a step, performed by condition designating means, of transmitting a plurality of conditions that should be met by user information and that have been determined for different categories of user information, respectively to condition matching devices which store user information of the categories corresponding to the conditions; a step, performed by linked conditional matching means, of requesting user ID selecting means to select a user ID of any user having his/her user IDs transmitted respectively to the condition matching devices that have received the conditions from the condition designating means; a step, performed by the user ID selecting means, of selecting user IDs in response to a request from the linked conditional matching means; and a step, performed by the linked conditional matching means, of transmitting a list of the user IDs selected by the user ID selecting means to a condition matching device to cause the condition matching device to specify, from the list of the user IDs, the user ID of any user whose user information matches the condition transmitted to the condition matching device, and thereafter, sequentially transmitting a list of the specified user IDs to another condition matching device to cause the condition matching device to specify, from the list of the user IDs, the user ID of any user whose user information matches the condition transmitted to the condition matching device.

Further, a linked conditional matching program according to the present invention is a linked conditional matching program installed in a computer connected to a plurality of condition matching devices and condition designating means via a communication network, each condition matching device specifying any user whose user information matches a designated condition, the condition designating means transmitting a plurality of conditions that should be met by user information and that have been determined for different categories of user information, respectively to the condition matching devices which store user information of the categories corresponding to the conditions, the program causing the computer to perform: user ID supplying processing of, in response to reception of condition matching device identification information for identifying a condition matching device from a user terminal, transmitting a user ID of a user who uses the user terminal to the condition matching device identified by the condition matching device identification information, and storing user ID transmission status information indicating which user's user ID has been transmitted to which condition matching device; linked conditional matching processing of repeating processing of causing a respective condition matching device that has received a condition from the condition designating means to specify a user ID of any user whose user information matches the condition, to thereby specify the user ID of any user whose user information of the respective categories for which the conditions have been determined meets the corresponding conditions; and user ID selecting processing of selecting a user ID of any user having his/her user IDs transmitted respectively to the condition matching devices that have received the conditions from the condition designating means, on the basis of the user ID transmission status information stored in the user ID supplying processing; wherein in the linked conditional matching processing, the program causes the computer to perform the user ID selecting processing, to perform processing of transmitting a list of the user IDs selected in the user ID selecting processing to a condition matching device to cause the condition matching device to specify, from the list of the user IDs, the user ID of any user whose user information matches the condition transmitted to the condition matching device, and thereafter, to perform processing of sequentially transmitting a list of the specified user IDs to another condition matching device to cause the condition matching device to specify, from the list of the user IDs, the user ID of any user whose user information matches the condition transmitted to the condition matching device.

Further, a linked conditional matching program according to the present invention is a linked conditional matching program installed in a computer connected to a plurality of condition matching devices, condition designating means, and user ID supplying means via a communication network, each condition matching device specifying any user whose user information matches a designated condition, the condition designating means transmitting a plurality of conditions that should be met by user information and that have been determined for different categories of user information, respectively to the condition matching devices which store user information of the categories corresponding to the conditions, the user ID supplying means being operable, in response to reception of condition matching device identification information for identifying a condition matching device from a user terminal, to transmit a user ID of a user who uses the user terminal and user ID supplier identification information for identifying a user ID supplier that the user terminal is using, to the condition matching device identified by the condition matching device identification information, and store user ID transmission status information indicating which user's user ID has been transmitted to which condition matching device, the computer including user ID supplier identification information storing means for storing predetermined user ID supplier identification information, the program causing the computer to perform: linked conditional matching processing of repeating processing of causing a respective condition matching device that has received a condition from the condition designating means to specify a user ID of any user whose user information matches the condition, to thereby specify the user ID of any user whose user information of the respective categories for which the conditions have been determined meets the corresponding conditions; and user ID selecting processing of selecting a user ID of any user having his/her user IDs transmitted respectively to the condition matching devices that have received the conditions from the condition designating means, on the basis of the user ID transmission status information stored in the user ID supplying means; wherein in the linked conditional matching processing, the program causes the computer to perform processing of transmitting the user ID supplier identification information stored in the user ID supplier identification information storing means to one of the condition matching devices that have received the conditions from the condition designating means, to cause the condition matching device to specify, from among user IDs associated with the user ID supplier identification information, the user ID of any user whose user information matches the condition transmitted to the condition matching device, to perform the user ID selecting processing, and to perform processing of transmitting a list of the user IDs selected in the user ID selecting processing to another condition matching device to cause the condition matching device to specify, from the list of the user IDs, the user ID of any user whose user information matches the condition transmitted to the condition matching device, and thereafter, to perform processing of sequentially transmitting a list of the specified user IDs to another condition matching device to cause the condition matching device to specify, from the list of the user IDs, the user ID of any user whose user information matches the condition transmitted to the condition matching device.

Advantageous Effects of Invention

According to the present invention, in the state where various categories of user information are held decentrally, it is possible to specify the users who match predetermined conditions, while suppressing the processing load and network load.

BRIEF DESCRIPTION OF DRAWINGS

FIG. 2 is a diagram illustrating, by way of example, information stored in user information storing units 21 in condition matching devices 2a, 2b, 2c.

FIG. 3 is a diagram illustrating, by way of example, information stored in provisional user ID storing units 22 in the condition matching devices 2a, 2b, 2c.

FIG. 4 is a diagram illustrating, by way of example, information stored in condition matching execution units 23 in the condition matching devices 2a, 2b, 2c.

FIG. 5 is a diagram illustrating, by way of example, information regarding the status of issuance of provisional user IDs.

FIG. 6 is a diagram illustrating, by way of example, the operation in the case where a user terminal 4 makes a utilization request with single sign-on.

FIG. 13 is a diagram illustrating, by way of example, information regarding the status of issuance of provisional user IDs in a processing execution device 14a.

FIG. 14 is a diagram illustrating, by way of example, information regarding the status of issuance of provisional user IDs in a processing execution device 14b.

FIG. 15 is a diagram illustrating, by way of example, information stored in provisional user ID storing units 62 in condition matching devices 12a to 12c.

FIG. 16 is a diagram illustrating, by way of example, provisional user ID domains stored in a provisional user ID domain storing unit 73.

FIG. 17 is a diagram illustrating, by way of example, the operation in the case where user terminals 4a, 4b make utilization requests with single sign-on.

DESCRIPTION OF EMBODIMENTS

Exemplary embodiments of the present invention will be described below with reference to the drawings.

In each of the following exemplary embodiments, a description will be made of a case where business operators who provide services to users hold user information (user attribute information) of different categories from each other, and the condition matching system according to the present invention specifies users, through linked conditional matching, to deliver advertisements to the terminals of the specified users. Here, the condition matching is the process of specifying identification information of any user whose user information matches a predetermined condition. The "linked" conditional matching means, in the case where user information is stored decentrally in a plurality of devices according to categories, the process of sequentially narrowing down the users who meet predetermined conditions so as to specify any user who meets all the conditions. The determination as to whether the conditions are met does not have to be limited to perfect matching between the conditions and the user information. For example, case-insensitive fuzzy matching or the like may be used for determination of the condition matching. Further, the result of determination of the users who meet the conditions may be derived so as to include a particular percentage (for example, 20 percent) of users who do not meet the conditions. Choosing a particular percentage of users who do not meet the conditions besides the users who meet the conditions in the above-described manner enables, for example, marketing for new users.

Exemplary Embodiment 1

Figure 1:
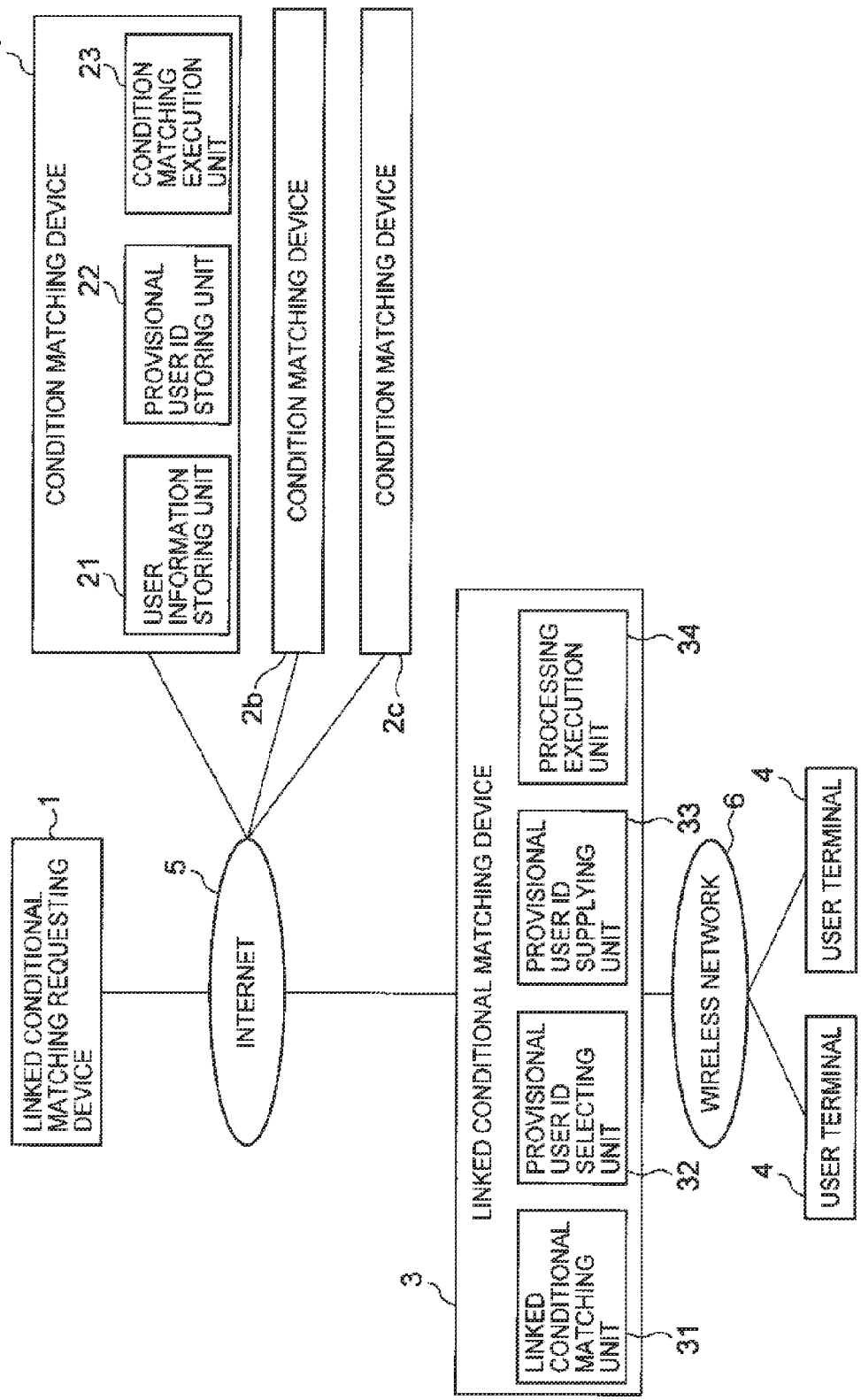
FIG. 1 is a block diagram showing, by way of example, a condition matching system according to a first exemplary embodiment of the present invention.

FIG. 1 is a block diagram showing, by way of example, a condition matching system according to the first exemplary embodiment of the present invention. The condition matching system of the first exemplary embodiment includes a linked conditional matching requesting device 1, a plurality of condition matching devices 2a to 2c, and a linked conditional matching device 3. While three condition matching devices 2a to 2c are shown in FIG. 1, the number of the condition matching devices is not limited to three, as long as it is more than one.

The linked conditional matching requesting device 1, the plurality of condition matching devices 2a to 2c, and the linked conditional matching device 3 are connected via the Internet 5. While the communication network for connecting the devices 1, 2a, 2b, 2c, and 3 is the Internet 5 in the following description, the communication network is not limited to the Internet 5; it may be, for example, the NGN (Next Generation Network), the ISDN (Integrated Services Digital Network), or the like.

Further, the linked conditional matching device 3 is connected to user terminals 4 via a wireless network 6. While the communication network for connecting the linked conditional matching device 3 and the user terminals 4 is the wireless network 6 in the following description, the communication network is not limited to the wireless network 6; it may be the NGN, the ISDN, or the like, as in the above-described case.

The condition matching devices 2a, 2b, 2c are managed by business operators who provide services to the users of the user terminals 4. The condition matching devices 2a, 2b, 2c may be managed by different business operators. Further, the condition matching devices 2a, 2b, 2c may provide different services. Here, a description will be made of a case where the condition matching devices 2a, 2b, 2c have collected from the users and stored in advance the user information for use in providing services (i.e. the information indicating the user attributes), in accordance with the services that are provided by the respective devices. The condition matching devices 2a, 2b, 2c each provide a service to the user who has made a utilization request with single sign-on. The utilization request with single sign-on refers to a request that a user makes for a service of a condition matching device by way of single sign-on.

The condition matching devices 2a, 2b, 2c each compare the above-described user information with a condition designated by the linked conditional matching requesting device 1, to specify any user matching the condition. The linked conditional matching requesting device 1 is managed, for example, by a business operator who performs information distribution to the users who match conditions. Hereinafter, the business operator who manages the linked conditional matching requesting device 1 will be referred to as a condition designator, who is differentiated from the business operators who manage the condition matching devices 2a, 2b, 2c.

The linked conditional matching device 3 repeats the processing of causing a condition matching device to specify the users who match a condition, and passing the result to another condition matching device to cause the device to specify the users who match another condition. By repeating this, the linked conditional matching device 3 narrows down the users to those who match all the conditions designated by the linked conditional matching requesting device 1. The linked conditional matching device 3 then performs processing such as information distribution to the terminals of the narrowed-down users. While information distribution is described here as an example of the processing to be performed on the terminals of the narrowed-down users, other processing may be performed. Here, a description will be made of a case where the linked conditional matching device 3 performs delivery of advertisements.

The condition matching system according to the present invention performs the above-described operations, and thus, it can also be referred to as an appropriate-user specifying system. Further, the linked conditional matching device 3 can also be referred to as a linked appropriate-user specifying device. Further, a linked conditional matching program for causing a computer to operate as the linked conditional matching device 3 can also be referred to as a linked appropriate-user specifying program.

The types of user IDs (user identification information) used in the exemplary embodiments of the present invention will now be described.

A user ID which is used by the linked conditional matching device 3 for identifying a user when accepting a utilization request with single sign-on is referred to as "single sign-on ID". When a user terminal 4 transmits a utilization request with single sign-on, it transmits the single sign-on ID as the user identification information.

Further, a user ID which is used by each of the condition matching devices 2a, 2b, 2c for identifying a user who has made a utilization request with single sign-on in order to provide a service to the user is referred to as "account ID".

Further, a user ID which is used by the linked conditional matching device 3 for designating a user when repeating the processing of causing one condition matching device to specify the users who match a condition and passing the result to another condition matching device to cause the another device to specify the users who match another condition (i.e. when conducting the linked conditional matching) is referred to as "provisional user ID". For example, the linked conditional matching device 3 transmits provisional user IDs to the condition matching device 2a so as to designate users when causing the condition matching device 2a to specify any user who matches a condition from among the designated users. The condition matching device 2a also transmits the provisional user IDs to the linked conditional matching device 3 when notifying of the users specified as a result of the condition matching.

In the following description, it is assumed that the three types of user IDs will be used. However, the condition matching system of the present invention may be configured to use some of the three types of user IDs, as will be described later.

The linked conditional matching device 3 holds in advance the provisional user IDs for use in the case where a user has made a utilization request with single sign-on by designating a condition matching device, for performing the user designation with that condition matching device. More specifically, the linked conditional matching device 3 includes a provisional user ID supplying unit 33 which holds in advance a provisional user ID of a user for each combination of a user and a condition matching device (for example, for each combination of a single sign-on ID and the network address of a condition matching device). Individual provisional user IDs may be predetermined; the manner of determining the individual provisional user IDs is not particularly limited. When a user makes a utilization request with single sign-on by designating a condition matching device, the linked conditional matching device 3 specifies, from a group of predetermined provisional user IDs, a provisional user ID that corresponds to the combination of the user and the condition matching device, and transmits the specified provisional user ID to that condition matching device. It is noted that the transmission of the provisional user ID may be referred to as "issuance". Further, the transmission of the provisional user ID may be referred to as "ID Federation" between the single sign-on ID and the account ID. A provisional user ID specified by a combination of a certain user and a certain condition matching device is transmitted from the linked conditional matching device 3 to that condition matching device only after that user makes a utilization request with single sign-on by designating that condition matching device. The state where a provisional user ID has not been transmitted to a corresponding condition matching device will be referred to as "unissued".

It is noted that it is preferable to prepare different provisional user IDs for the condition matching devices 2a, 2b, 2c for a same user, for preventing aggregation of the user information among the business operators who are operating the condition matching devices (i.e. for the purposes of protecting users' privacy). It is however possible to determine a common provisional user ID for the condition matching devices 2a, 2b, 2c. In the following, a description will be made of a case where, for a single user, different provisional user IDs are determined for the respective condition matching devices 2a, 2b, 2c.

Each of the condition matching devices 2a, 2b, 2c includes a user information storing unit 21, a provisional user ID storing unit 22, and a condition matching execution unit 23. In FIG. 1, however, the user information storing units 21, the provisional user ID storing units 22, and the condition matching execution units 23 as the constituent elements of the condition matching devices 2b, 2c are not shown.

The user information storing unit 21 stores an account ID and user information in association with each other. The category of user attribute that is stored as the user information in the user information storing unit 21 has been determined in advance in accordance with the type of service that the condition matching device provides to the user who has made a utilization request with single sign-on. In the present exemplary embodiment, a description will be made of a case where the user information storing units 21 in the respective condition matching devices 2a, 2b, 2c each store the user information of one category different from each other. Specifically, it is here assumed that the user information storing unit 21 in the condition matching device 2a stores information on the users' hobbies as the user information. It is also assumed that the user information storing unit 21 in the condition matching device 2b stores information on the users' age groups as the user information. It is also assumed that the user information storing unit 21 in the condition matching device 2c stores information on the users' genders as the user information.

FIG. 2 is a diagram illustrating, by way of example, the information stored in the user information storing units 21 in the condition matching devices 2a, 2b, 2c. FIG. 2(a) shows, by way of example, the information stored in the user information storing unit 21 in the condition matching device 2a. As shown in FIG. 2(a), the user information storing unit 21 in the condition matching device 2a stores the account IDs of the users who receive the services of the condition matching device 2a, and the information on the hobbies of those users, in association with each other.

FIG. 2(b) shows, by way of example, the information stored in the user information storing unit 21 in the condition matching device 2b. As shown in FIG. 2(b), the user information storing unit 21 in the condition matching device 2b stores the account IDs of the users who receive the services of the condition matching device 2b, and the information on the age groups of those users, in association with each other.

FIG. 2(c) shows, by way of example, the information stored in the user information storing unit 21 in the condition matching device 2c. As shown in FIG. 2(c), the user information storing unit 21 in the condition matching device 2c stores the account IDs of the users who receive the services of the condition matching device 2c, and the information on the genders of those users, in association with each other.

It is noted that the manner of storing the account IDs and the user information in association with each other in the user information storing unit 21 in each of the condition matching devices 2a, 2b, 2c is not particularly limited. All that is needed is that the user information storing unit 21 stores the account IDs and the user information in advance.

The provisional user ID storing unit 22 stores an account ID and a provisional user ID, received from the linked conditional matching device 3, in association with each other.

As described previously, when a user makes a utilization request with single sign-on by designating a condition matching device, the linked conditional matching device 3 transmits the provisional user ID specified by the combination of the user and the condition matching device, to that condition matching device. At this time, the linked conditional matching device 3 also transmits the user's account ID which is used in that condition matching device, together with the provisional user ID, to that condition matching device (i.e. the condition matching device designated by the user). When receiving the account ID and the provisional user ID from the linked conditional matching device 3, the provisional user ID storing unit 22 in that condition matching device stores the account ID and the provisional user ID in association with each other.

FIG. 3 is a diagram illustrating, by way of example, the information stored in the provisional user ID storing units 22 in the condition matching devices 2a, 2b, 2c. FIG. 3(a) shows, by way of example, the account IDs and the provisional user IDs stored in the provisional user ID storing unit 22 in the condition matching device 2a. FIG. 3(b) shows, by way of example, the account IDs and the provisional user IDs stored in the provisional user ID storing unit 22 in the condition matching device 2b. FIG. 3(c) shows, by way of example, the account IDs and the provisional user IDs stored in the provisional user ID storing unit 22 in the condition matching device 2a.

For example in the case where SAML is adapted, the provisional user ID storing unit 22 corresponds to the "SAML SP (Service Provider)".

The condition matching execution unit 23 compares user information with a condition designated by the linked conditional matching requesting device 1, to specify any user who matches the condition. More specifically, the condition matching execution unit 23 receives and stores, in advance, a condition for use in specifying users and an ID for designating that condition (referred to as "linked conditional ID") from the linked conditional matching requesting device 1. When receiving a linked conditional ID and a list of provisional user IDs from the linked conditional matching device 3, the condition matching execution unit 23 compares the user information of the respective users indicated by the provisional user IDs with the condition indicated by that linked conditional ID. The condition matching execution unit 23 returns to the linked conditional matching device 3 the provisional user ID of any user whose user information matches the condition, among the users indicated by the provisional user IDs.

FIG. 4 is a diagram illustrating, by way of example, the information stored in the condition matching execution units 23 in the condition matching devices 2a, 2b, 2c. FIG. 4(a) shows, by way of example, the information that the condition matching execution unit 23 in the condition matching device 2a has received from the linked conditional matching requesting device 1 and stored therein. In this case, when "123" is designated as the linked conditional ID from the linked conditional matching device 3, the condition matching execution unit 23 in the condition matching device 2a specifies any user, from among the designated users, who matches the condition that "the user's hobby is sport".

FIG. 4(b) shows, by way of example, the information that the condition matching execution unit 23 in the condition matching device 2b has received from the linked conditional matching requesting device 1 and stored therein. In this case, when "123" is designated as the linked conditional ID from the linked conditional matching device 3, the condition matching execution unit 23 in the condition matching device 2b specifies any user, from among the designated users, who matches the condition that "the user is in the age group of thirties".

FIG. 4(c) shows, by way of example, the information that the condition matching execution unit 23 in the condition matching device 2c has received from the linked conditional matching requesting device 1 and stored therein. In this case, when "123" is designated as the linked conditional ID from the linked conditional matching device 3, the condition matching execution unit 23 in the condition matching device 2c specifies any user, from among the designated users, who matches the condition that "the user's gender is female".

Further, although not shown in FIG. 1, each condition matching device 2a, 2b, 2c includes a service providing unit which provides a service to the user who has made the utilization request with single sign-on. The types of processing that the service providing units perform as services on the user terminals 4 are not particularly limited.

For each of the condition matching devices 2a, 2b, 2c, a network address used by a user terminal 4 for designating a condition matching device when making a utilization request with single sign-on and a network address used by the linked conditional matching requesting device 1 and the linked conditional matching device 3 for designating a condition matching device to cause it to specify any user matching a condition are determined. The former network address is the network address for accessing the service providing unit (not shown), while the latter network address is the network address for accessing the condition matching execution unit 23.

In the present exemplary embodiment, it is assumed that the network address for accessing the condition matching execution unit 23 in the condition matching device 2a is "http://matching-a.com". It is also assumed that the network address for accessing the condition matching execution unit 23 in the condition matching device 2b is "http://matching-b.com". It is also assumed that the network address for accessing the condition matching execution unit 23 in the condition matching device 2c is "http://matching-c.com".

The condition matching device including the user information storing unit 21, the provisional user ID storing unit 22, the condition matching execution unit 23, and the service providing unit (not shown) is implemented, for example, by a computer that operates in accordance with a program. The user information storing unit 21, the provisional user ID storing unit 22, the condition matching execution unit 23, and the service providing unit (not shown) may be implemented by the same hardware or may be implemented by separate hardware components or separate devices.

The linked conditional matching requesting device 1 is operable, for example in accordance with an operation of a condition designator, to transmit a linked conditional ID and conditions to be met by user information, to the condition matching devices which store the user information of the categories corresponding to the conditions desired by the condition designator. At this time, the linked conditional matching requesting device 1 assigns, in accordance with an operation of the condition designator, a common linked conditional ID to the plurality of conditions that the condition designator has determined for the respective categories of the user information. The linked conditional matching requesting device 1 then transmits the linked conditional ID and the conditions determined in accordance with the categories of the user information, to the condition matching storing units that store the user information of the corresponding categories. Accordingly, while the linked conditional ID to be transmitted to the respective condition matching devices is common, the conditions to be transmitted to the respective condition matching devices are different from each other. As a result, as shown by way of example in FIG. 4, the condition matching execution units 23 in the condition matching devices 2a, 2b, 2c store the linked conditional ID ("123"), which is common to the condition matching devices, and the conditions determined for the respective condition matching devices, in association with each other. In the present exemplary embodiment, a description will be made of a case where the linked conditional matching requesting device 1 transmits a linked conditional ID and a condition to a respective one of the condition matching devices 2a, 2b, 2c.

It is here assumed that the condition designator knows, in advance, the categories of the user information stored in the condition matching devices 2a, 2b, 2c of the respective business operators. For example, the condition designator may use a directory service as a Web service, such as UDDI (Universal Description, Discovery and Integration), to find the condition matching devices of the business operators who hold the user information of desired categories.

Further, after the linked conditional matching requesting device 1 transmits the linked conditional ID and the conditions to the respective condition matching devices 2a, 2b, 2c, the linked conditional matching requesting device 1 notifies the linked conditional matching device 3 of the linked conditional ID etc. to cause the linked conditional matching device 3 to perform the linked conditional matching. Then, in the present exemplary embodiment, the linked conditional matching requesting device 1 requests the linked conditional matching device 3 to perform the processing of delivering advertisements to the user terminal of any user who has been specified through the linked conditional matching.

The linked conditional matching device 3 includes a linked conditional matching unit 31, a provisional user ID selecting unit 32, the provisional user ID supplying unit 33, and a processing execution unit 34. The linked conditional matching device 3 is managed by a communication carrier, for example. While a description will be made below of the case where the linked conditional matching device 3 is managed by a communication carrier, the linked conditional matching device 3 may be managed by a party other than the communication carrier. For example, the linked conditional matching device 3 may be managed by an Internet service provider, or a service business operator who provides a Web page search service or the like.

The linked conditional matching unit 31 performs the linked conditional matching. That is, the linked conditional matching unit 31 repeats the processing of causing a condition matching device to specify the users who match a condition, and passing the result to another condition matching device to cause the device to specify the users who match another condition, to thereby specify any user who meets all the conditions designated by the linked conditional matching requesting device 1.

The provisional user ID selecting unit 32 extracts (selects) provisional user IDs of the users to be narrowed down by the condition matching devices, from the information regarding the status of issuance of provisional user IDs that the provisional user ID supplying unit 33 holds. More specifically, the provisional user ID selecting unit 32 requests, from the provisional user ID supplying unit 33, the provisional user IDs of the users to be narrowed down by the condition matching devices, and receives a list of those provisional user IDs from the provisional user ID supplying unit 33. The information regarding the status of issuance of provisional user IDs that the provisional user ID supplying unit 33 holds is the information shown by way of example in FIG. 5.

Further, in selecting the users (the provisional user IDs), the provisional user ID selecting unit 32 causes the provisional user ID supplying unit 33 to specify any user for whom provisional user IDs have already been transmitted to all the condition matching devices that store the user information of the categories corresponding to the respective conditions designated by the linked conditional matching requesting device 1. In the first exemplary embodiment, a list of these users is the default state of the list of the users to be narrowed down therefrom. The users are sequentially narrowed down from this user list.

When the provisional user ID supplying unit 33 receives from a user terminal 4 a utilization request with single sign-on together with the designation of a condition matching device, the provisional user ID supplying unit 33 specifies a provisional user ID that is to be used with that condition matching device for designating the user who owns that user terminal 4. That is, the provisional user ID supplying unit 33 specifies the provisional user ID that is determined from the combination of that user and the designated condition matching device. At the time of making the utilization request with single sign-on, the user terminal 4 also transmits the account ID to be used in the designated condition matching device, to the linked conditional matching device 3. The provisional user ID supplying unit 33 transmits this account ID and the specified provisional user ID to the designated condition matching device. The account ID and the provisional user ID are stored in the provisional user ID storing unit 22, as shown in FIG. 3.

Further, the provisional user ID supplying unit 33 stores the provisional user ID transmitted to the condition matching device, together with the single sign-on ID of that user and the network address of the condition matching device (network address for accessing the condition matching execution unit 23) corresponding to that provisional user ID. In this manner, the provisional user ID supplying unit 33 stores the information regarding the status of issuance of provisional user IDs. FIG. 5 is a diagram illustrating, by way of example, the information regarding the status of issuance of provisional user IDs. As shown by way of example in FIG. 5, the provisional user ID supplying unit 33 holds a database in which the provisional user IDs that have been issued are each stored in association with a combination of the single sign-on ID and the network address of the condition matching device. In the initial state, the information "unissued" is stored in place of a provisional user ID. "Unissued" means that a provisional user ID has not been transmitted to the condition matching device. When a user terminal 4 makes a utilization request with single sign-on by transmitting the single sign-on ID, the information for designating a condition matching device, and the account ID for use in that condition matching device, the provisional user ID supplying unit 33 specifies the provisional user ID corresponding to that single sign-on ID and the network address of that condition matching device, and transmits a set of the provisional user ID and the account ID to that condition matching device. The provisional user ID supplying unit 33 also stores that provisional user ID into the database shown by way of example in FIG. 5.

The provisional user ID supplying unit 33 corresponds to the ID provider in a single sign-on system. When SAML is adapted, the provisional user ID supplying unit 33 corresponds to the "SAML IDP (ID Provider)". When the Open ID developed by a standards organization called the OpenID Foundation is adapted, the provisional user ID supplying unit 33 corresponds to the "OpenID Provider".

The processing execution unit 34 carries out the processing determined by the linked conditional matching requesting device 1 on the user terminal 4 of any user who meets all the designated conditions. In the present exemplary embodiment, the processing execution unit 34 carries out the processing of delivering advertisements to the user terminal 4 of any user who meets the conditions. The manner of delivering advertisements is not particularly limited. For example, the processing execution unit 34 may deliver the advertisements by using the Internet mail or short message service.

For example, the processing execution unit 34 stores the mail addresses of the user terminals managed by a communication carrier and the single sign-on IDs in association with each other. When a single sign-on ID is designated by the linked conditional matching unit 31, the processing execution unit 34 may deliver the advertisements by using the mail address of the user terminal corresponding to that single sign-on ID as a destination.

The linked conditional matching unit 31, the provisional user ID selecting unit 32, the provisional user ID supplying unit 33, and the processing execution unit 34 are implemented, for example, by a CPU in a computer that operates in accordance with a linked conditional matching program. In this case, for example, a program storing device (not shown) in the computer stores the linked conditional matching program, and the CPU reads the program and operates, in accordance with the program, as the linked conditional matching unit 31, the provisional user ID selecting unit 32, the provisional user ID supplying unit 33, and the processing execution unit 34. The linked conditional matching unit 31, the provisional user ID selecting unit 32, the provisional user ID supplying unit 33, and the processing execution unit 34 may be implemented by separate hardware components or separate devices.

The user terminal 4 may be any terminal that can use the single sign-on and that can receive the information (advertisements in the present exemplary embodiment) transmitted from the processing execution unit 34. The manner of receiving advertisements is not particularly limited; the advertisements may be received via the Internet mail or short message service.

Further, the form of single sign-on in each of the exemplary embodiments of the present invention may be the same as that of the single sign-on known in the art.

The operations will now be described.

Figure 6:
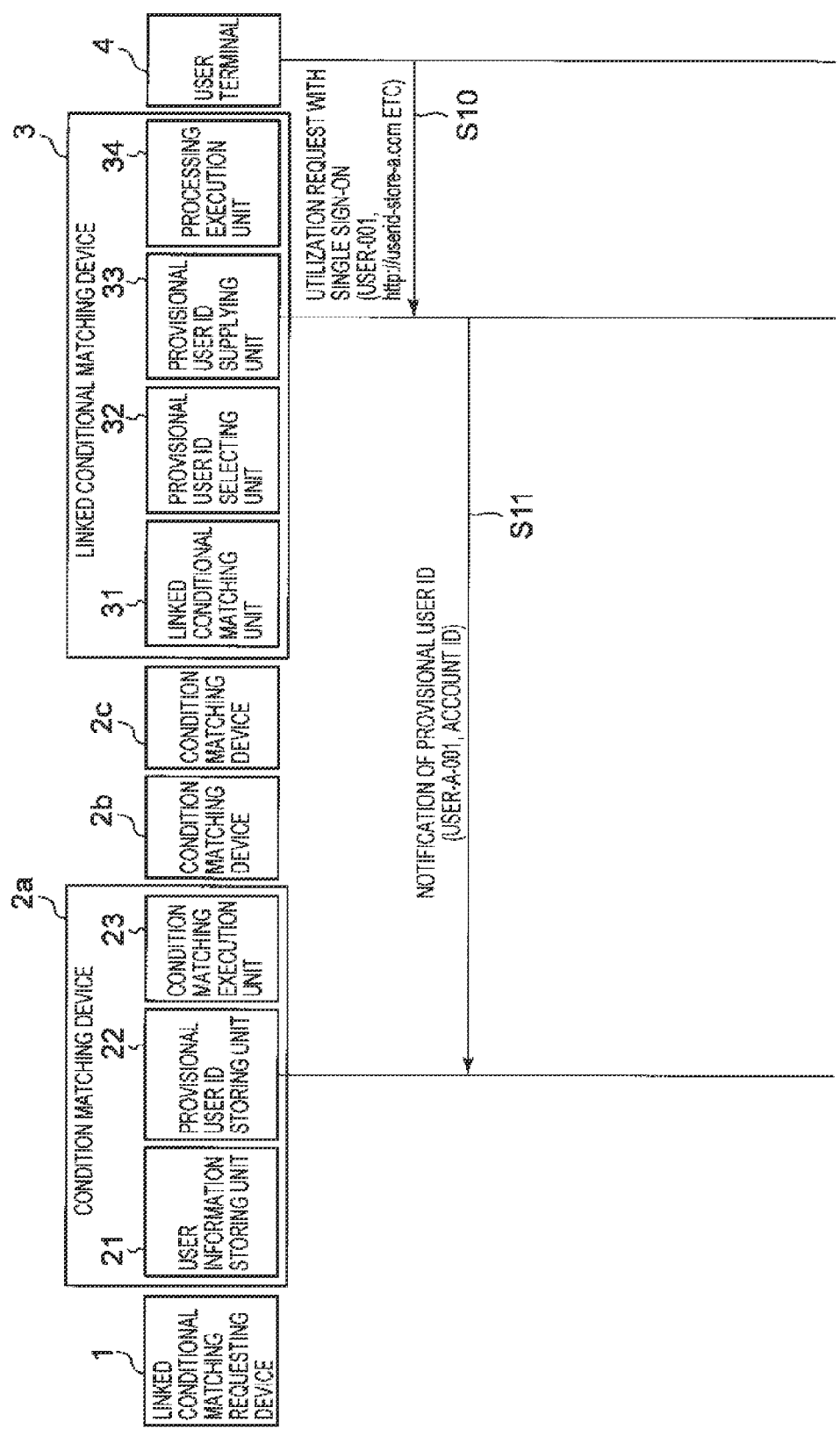

FIG. 6 is a diagram illustrating, by way of example, the operation in the case where a user terminal 4 makes a utilization request with single sign-on. First, a user terminal 4 makes a utilization request with single sign-on, in accordance with a user operation, to the provisional user ID supplying unit 33 in the linked conditional matching device 3 (step S10). More specifically, the user terminal 4 transmits the single sign-on ID of the user, the network address of the condition matching device from which the user requests a service, and the account ID of the user in that condition matching device, to the provisional user ID supplying unit 33. In the present example, it is assumed that "USER-001" is transmitted as the single sign-on ID, "http://userid-store-a.com" is transmitted as the network address of the condition matching device 2*a*, and "hina" is transmitted as the account ID in the condition matching device 2*a*. Here, "http://userid-store-a.com" is the network address for designating the condition matching device 2*a* at the time of making a utilization request with single sign-on. It is determined separately from "http://matching-a.com".

It is noted that the network address for designating a condition matching device at the time of making a utilization request with single sign-on and the network address for accessing the condition matching execution unit 23 may be the same. In such a case, in step S10, the user terminal 4 may transmit "http://matching-a.com" to designate the condition matching device 2*a*.

When the provisional user ID supplying unit 33 receives the single sign-on ID, the network address of the condition matching device, and the account ID in that condition matching device from the user terminal 4, the provisional user ID supplying unit 33 specifies a provisional user ID that corresponds to the combination of the single sign-on ID and the condition matching device. The provisional user ID supplying unit 33 then transmits the provisional user ID and the account ID received from the user terminal 4, to the provisional user ID storing unit 22 in the condition matching device designated by the user terminal 4 (step S11). Upon reception of the provisional user ID and the account ID, the provisional user ID storing unit 22 stores the provisional user ID and the account ID.

In the present example, the provisional user ID supplying unit 33 specifies "USER-A-001" as the provisional user ID that corresponds to the single sign-on ID "USER-001" received from the user terminal 4 and the network address "http://matching-a.com" of the condition matching device 2*a* (the address for accessing the condition matching execution unit 23) designated by the user terminal 4. Then, the provisional user ID supplying unit 33 transmits the provisional user ID "USER-A-001" and the account ID "hina" received in step S10, to the provisional user ID storing unit 22 in the condition matching device 2*a*. The provisional user ID storing unit 22 in the condition matching device 2*a* stores "USER-A-001" and "hina" (see FIG. 3(*a*)).

Further, the provisional user ID supplying unit 33 stores the specified provisional user ID "USER-A-001" as the provisional user ID that has been transmitted to the condition matching device 2*a*, in the database shown by way of example in FIG. 5, in association with the single sign-on ID "USER-001" and the network address "http://matching-a.com" of the condition matching device 2*a*.

While the description has been made of the case where a user terminal 4 designates the condition matching device 2*a* in the present example, the similar operations are performed when a user terminal 4 designates another condition matching device 2*b*, 2*c*. As a result, every time a user terminal 4 makes a utilization request with single sign-on, a provisional user ID is specified and stored into the database shown by way of example in FIG. 5.

Further, the single sign-on itself is identical to the normal single sign-on. When the provisional user ID supplying unit 33 has succeeded in authentication of the single sign-on ID, the condition matching device 2*a* provides a service to the user terminal 4. The content of the service is not particularly limited.

Figure 7:
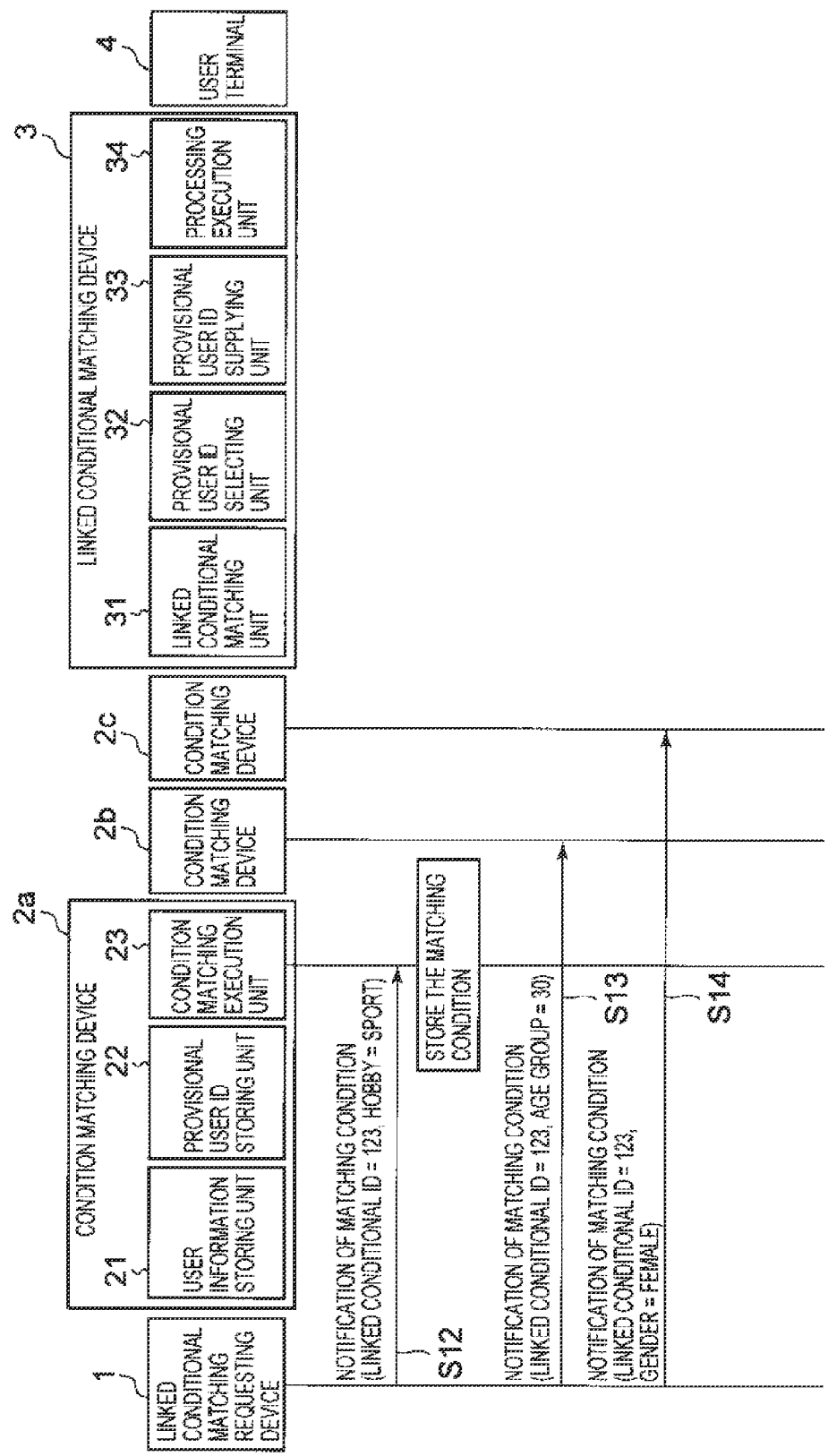
FIG. 7 is a diagram illustrating, by way of example, the operation in the case where a linked conditional matching requesting device 1 transmits conditions that should be met by user information, to the condition matching devices 2a, 2b, 2c.
Figure 8:
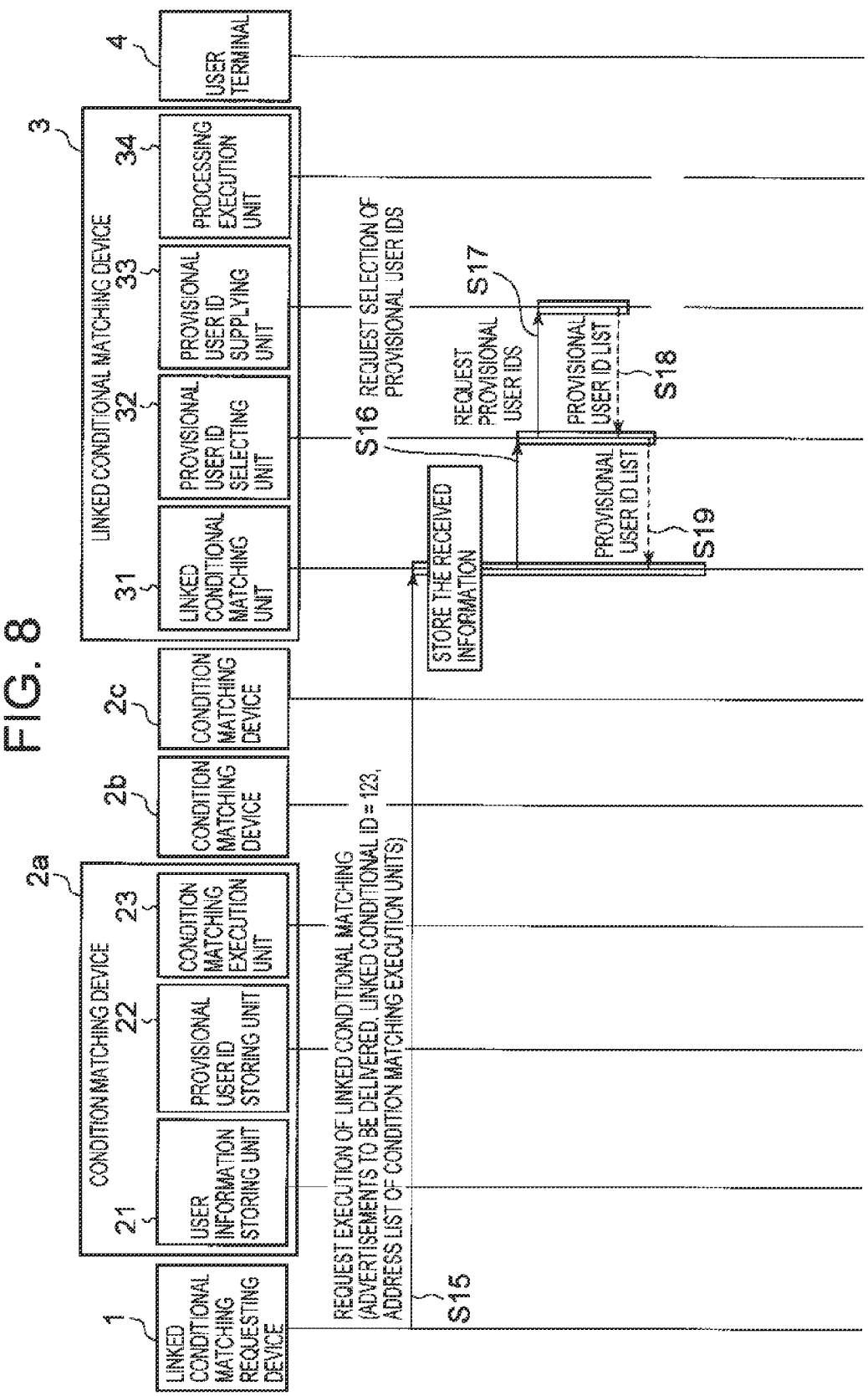
FIG. 8 is a diagram illustrating, by way of example, the progress of processing when a linked conditional matching device performs linked conditional matching.

FIG. 7 is a diagram illustrating, by way of example, the operation in the case where the linked conditional matching requesting device 1 transmits the conditions that should be met by the user information, to the condition matching devices 2*a*, 2*b*, 2*c*. Here, it is assumed that the condition designator has decided to deliver advertisements to any user who meets all of the condition that "the user's hobby is sport", the condition that "the user is in the age group of thirties", and the condition that "the user's gender is female". The linked conditional matching requesting device 1 assigns a common linked conditional ID to these three conditions determined by the condition designator. Here, it is assumed that the linked conditional ID "123" is assigned to the three conditions of: "the user's hobby is sport", "the user is in the age group of thirties", and "the user's gender is female".

The linked conditional matching requesting device 1 transmits the condition regarding the hobby that the condition designator has determined (the condition that "the user's hobby is sport") and the linked conditional ID "123", to the condition matching device 2*a* which stores the user information related to hobbies (step S12). Upon reception of this condition and the linked conditional ID "123", the condition matching execution unit 23 in the condition matching device 2*a* stores the condition and the linked conditional ID in association with each other (see FIG. 4(*a*)).

Similarly, the linked conditional matching requesting device 1 transmits the condition regarding the age group that the condition designator has determined (the condition that "the user is in the age group of thirties") and the linked conditional ID "123", to the condition matching device 2*b* which stores the user information related to the age groups (step S13). Upon reception of this condition and the linked conditional ID "123", the condition matching execution unit 23 in the condition matching device 2*b* stores the condition and the linked conditional ID in association with each other (see FIG. 4(*b*)).

Similarly, the linked conditional matching requesting device 1 transmits the condition regarding the gender that the condition designator has determined (the condition that "the user's gender is female") and the linked conditional ID "123", to the condition matching device 2*c* which stores the user information related to the genders (step S14). Upon reception of this condition and the linked conditional ID "123", the condition matching execution unit 23 in the condition matching device 2*c* stores the condition and the linked conditional ID in association with each other (see FIG. 4(*c*)).

FIGS. 8 to 11 are diagrams illustrating, by way of example, the progress of processing in the case where the linked conditional matching device performs linked conditional matching. First, the linked conditional matching requesting device 1 transmits, to the linked conditional matching device 3, a linked conditional ID which has been assigned to the conditions that should be met by users to whom advertisements are to be delivered, a list of network addresses of the condition matching devices (more specifically, the condition matching execution units 23) which are to perform user specification according to those conditions, and advertisements (advertisement information) which are to be delivered to the user terminal 4 of any user who meets the conditions (step S15). The linked conditional matching requesting device 1 transmits these pieces of information to thereby request the linked conditional matching device 3 to do the linked conditional matching.

In the present example, the linked conditional matching requesting device 1 transmits "123" as the linked conditional ID, and transmits "http://matching-a.com", "http://matching-b.com", and "http://matching-c.com" as the list of network addresses of the condition matching devices which are to perform user specification according to the conditions. This list of network addresses is the list of the network addresses of the condition matching devices 2a to 2c that were set as the destinations of the conditions in steps S12 to S14 (see FIG. 7).

The linked conditional matching unit 31 in the linked conditional matching device 3 stores the pieces of information (advertisement information, linked conditional ID, and network address list) received in step S15 from the linked conditional matching requesting device 1.

Next, in the linked conditional matching device 3, the linked conditional matching unit 31 notifies the provisional user ID selecting unit 32 of the network address list received in step S15 and one of those network addresses corresponding to the condition matching device which is made to perform the condition matching in the first place, to thereby request the provisional user ID selecting unit 32 to select provisional user IDs (step S16). The linked conditional matching unit 31 may arbitrary select, from the network address list, the network address of the condition matching device for making it perform the condition matching first. In the present example, the linked conditional matching unit 31 designates "http://matching-a.com", "http://matching-b.com", and "http://matching-c.com" as the network address list. Further, it is assumed that "http://matching-a.com" corresponding to the condition matching device 2a is designated as the network address of the condition matching device which is made to perform the condition matching first.

Upon reception of the request to select provisional user IDs (step S16), the provisional user ID selecting unit 32 requests, from the provisional user ID supplying unit 33, a list of the provisional user IDs satisfying the conditions that they are the provisional user IDs of the users for whom provisional user IDs have already been transmitted to all the condition matching devices 2a, 2b, 2c indicated by the network address list of "http://matching-a.com", "http://matching-b.com", and "http://matching-c.com", and that they are the provisional user IDs corresponding to the network address "http://matching-a.com" of the condition matching device 2a which is made to perform the condition matching first (step S17). The provisional user ID selecting unit 32 may issue, for example, an SQL requesting a list of such provisional user IDs to the provisional user ID supplying unit 33.

The provisional user ID supplying unit 33 extracts, from the database stored in the provisional user ID supplying unit 33 (see FIG. 5), the list of the provisional user IDs which are the provisional user IDs of the users for whom provisional user IDs have already been transmitted to all the condition matching devices 2a, 2b, 2c indicated by "http://matching-a.com", "http://matching-b.com", and "http://matching-c.com", and which correspond to the network address "http://matching-a.com" of the designated condition matching device 2a, and returns the list to the provisional user ID selecting unit 32 (step S18). It is noted that in the database shown by way of example in FIG. 5, when the provisional user ID is stored in association with a combination of a single sign-on ID and the network address of a condition matching device, it means that the provisional user ID has been transmitted (issued) to that condition matching device. When "unissued" is stored in association with a combination of a single sign-on ID and the network address of a condition matching device, it means that a provisional user ID has not been transmitted to that condition matching device.

In the example shown in FIG. 5, the users for whom provisional user IDs have already been transmitted to all the condition matching devices 2a, 2b, 2c indicated by "http://matching-a.com", "http://matching-b.com", and "http://matching-c.com" are the users having the single sign-on IDs of "USER-001", "USER-003", "USER-004", "USER-006", and "USER-007". The provisional user ID supplying unit 33 may, for example, determine these single sign-on IDs and then extract the provisional user IDs "USER-A-001", "USER-A-003", "USER-A-004", "USER-A-006", and "USER-A-007" that are of the users specified by the respective single sign-on IDs and that correspond to "http://matching-a.com". The provisional user ID supplying unit 33 may return the list of these provisional user IDs to the provisional user ID selecting unit 32.

The provisional user ID list obtained in the processing in steps S17 and S18 is the list of the users to be narrowed down therefrom. As to any user for whom a provisional user ID has not been issued corresponding to one or more of the network addresses "http://matching-a.com", "http://matching-b.com", and "http://matching-c.com", it is not possible to designate the condition matching to the condition matching execution unit(s). Thus, by extracting the list of the provisional user IDs of the users for whom provisional user IDs have been transmitted to all the condition matching devices 2a, 2b, 2c indicated by "http://matching-a.com", "http://matching-b.com", and "http://matching-c.com", it is possible to start the narrowing-down process, with any user for whom it is not possible to designate the condition matching to the condition matching execution unit(s) being excluded. This can reduce the processing load on the linked conditional matching device 3 and the condition matching devices 2a, 2b, 2c. Further, the network load on the Internet 5 (see FIG. 1) can also be reduced.

Further, in the above example, the description was made of the case where the provisional user ID selecting unit 32 issues an SQL to obtain the provisional user ID list from the provisional user ID supplying unit 33 for selection of the users. Alternatively, the provisional user ID selecting unit 32 may access the information held in the provisional user ID supplying unit 33 (see FIG. 5) and extract the list of the provisional user IDs which are the provisional user IDs of the users for whom provisional user IDs have been transmitted to all the condition matching devices 2a, 2b, 2c indicated by "http://matching-a.com", "http://matching-b.com", and "http://matching-c.com" and which correspond to "http://matching-a.com".

The provisional user ID selecting unit 32 transmits the provisional user ID list, obtained as a result of steps S17 and S18, to the linked conditional matching unit 31 (step S19). In the present example, the provisional user ID selecting unit 32 transmits "USER-A-001", "USER-A-003", "USER-A-004", "USER-A-006", and "USER-A-007" to the linked conditional matching unit 31. These are the provisional user IDs for use in the condition matching device 2a which is made to perform the condition matching first.

Next, the linked conditional matching unit 31 transmits the provisional user ID list, obtained in step S19, and the linked conditional ID, received from the linked conditional matching requesting device 1 in step S15, to the condition matching execution unit 23 in the condition matching device 2a which is made to perform the condition matching first (step S20). In the present example, the linked conditional matching unit 31 transmits "USER-A-001", "USER-A-003", "USER-A-004", "USER-A-006", and "USER-A-007" and the linked conditional ID "123" to the condition matching execution unit 23 in the condition matching device 2*a*. The linked conditional matching unit 31 transmits the provisional user ID list and the linked conditional ID in this manner to request the condition matching execution unit 23 to narrow down the users in the provisional user ID list so as to obtain a list of the users who meet the condition specified by the linked conditional ID (step S20).

The condition matching execution unit 23, which received the provisional user ID list and the linked conditional ID in step S20, requests a list of the account IDs corresponding to the provisional user ID list from the provisional user ID storing unit 22 in the condition matching device 2*a* (step S21).

In response to the request from the condition matching execution unit 23, the provisional user ID storing unit 22 extracts the account IDs corresponding to the provisional user IDs, and returns the list of the account IDs to the condition matching execution unit 23 (step S22). In the present example, the provisional user ID storing unit 22 in the condition matching device 2*a* stores the information shown by way of example in FIG. 3(*a*). On the basis of this information, the provisional user ID storing unit 22 extracts "hina", "misaki", "ayano", "syou", and "sakura" as the account IDs corresponding to "USER-A-001", "USER-A-003", "USER-A-004", "USER-A-006", and "USER-A-007", and returns the extracted account IDs to the condition matching execution unit 23.

Thereafter, the condition matching execution unit 23 transmits the account IDs acquired in step S22 to the user information storing unit 21 in the condition matching device 2*a*, to request the user information corresponding to the account IDs (step S23).

In response to the request from the condition matching execution unit 23, the user information storing unit 21 extracts the user information corresponding to the account IDs, and returns the account IDs and the user information, in association with each other, to the condition matching execution unit 23 (step S24). In the present example, the user information storing unit 21 in the condition matching device 2*a* stores the correspondence between the account IDs and the user information shown by way of example in FIG. 2(*a*). On the basis of this information, the user information storing unit 21 returns "sport, movie" as the user information of "hina", to the condition matching execution unit 23. Similarly, the user information storing unit 21 returns "travel" as the user information of "misaki", "travel, sport" as the user information of "ayano", "cooking, sport" as the user information of "syou", and "cooking, sewing, sport" as the user information of "sakura", to the condition matching execution unit 23.

The condition matching execution unit 23 has stored in step S12 the condition corresponding to the linked conditional ID "123" received in step S20. In the present example, the condition matching execution unit 23 has stored the condition that "the user's hobby is sport" (see FIG. 4(*a*)). The condition matching execution unit 23 specifies, on the basis of the user information acquired in step S24, any account ID corresponding to the user information that matches the condition. The condition matching execution unit 23 then returns a list of the provisional user IDs corresponding to the specified account IDs, to the linked conditional matching unit 31 in the linked conditional matching device 3 (step S25).

In the present example, the account IDs corresponding to the user information that matches the condition that "the user's hobby is sport" are "hina", "ayano", "syou", and "sakura". The condition matching execution unit 23 specifies these account IDs. The condition matching execution unit 23 then returns "USER-A-001", "USER-A-004", "USER-A-006", and "USER-A-007" as the list of the provisional user IDs corresponding to those account IDs, to the linked conditional matching unit 31.

As a result, the list of the provisional user IDs has been narrowed down by the condition matching device 2*a*, from the initial list obtained in steps S17 and S18, to the list of the provisional user IDs "USER-A-001", "USER-A-004", "USER-A-006", and "USER-A-007" of the users who meet the condition that "the user's hobby is sport".

Next, the linked conditional matching unit 31 causes a condition matching device that is made to perform the condition matching in the second place (here, the condition matching device 2*b*) to further narrow down the provisional user ID list. At this time, the linked conditional matching unit 31 notifies the provisional user ID supplying unit 33 of the provisional user ID list "USER-A-001", "USER-A-004", "USER-A-006", and "USER-A-007", received from the condition matching device 2*a* in step S25, and the network address "http://matching-b.com" of the condition matching device 2*b*, which is made to perform the condition matching next, to thereby request the provisional user IDs corresponding respectively to "USER-A-001", "USER-A-004", "USER-A-006", and "USER-A-007" and for use in the condition matching device 2*b* (http://matching-b.com) (step S26). The request in step S26 may be performed by SQL, for example.

In response to the request from the linked conditional matching unit 31, the provisional user ID supplying unit 33 extracts from the database (see FIG. 5) the provisional user IDs "USER-B-001", "USER-B-004", "USER-B-006", and "USER-B-007" in the condition matching device 2*b*, corresponding respectively to "USER-A-001", "USER-A-004", "USER-A-006", and "USER-A-007", and returns them to the linked conditional matching unit 31 (step S27). That is, the provisional user ID supplying unit 33 returns the provisional user ID list of "USER-B-001", "USER-B-004", "USER-B-006", and "USER-B-007" to the linked conditional matching unit 31.

Here, while the case of transmitting and receiving the provisional user ID list between the linked conditional matching unit 31 and the provisional user ID supplying unit 33 in steps S26 and S27 has been described, the processing in steps S26 and S27 may be repeated for each provisional user ID of a user.

The linked conditional matching unit 31 transmits the provisional user ID list "USER-B-001", "USER-B-004", "USER-B-006", and "USER-B-007" corresponding to the condition matching device 2*b*, obtained in steps S26 and S27, and the linked conditional ID, received from the linked conditional matching requesting device 1 in step S15, to the condition matching device 2*b*, to thereby request the execution of the condition matching (step S28). This operation is similar to the operation of transmitting the provisional user ID list and the linked conditional ID to the condition matching device 2*a* (step S20).

Further, the operation of the condition matching device 2*b* that has received the provisional user ID list and the linked conditional ID is similar to the operation of the condition matching device 2*a* (steps S21 to S25). That is, the condition matching execution unit 23 in the condition matching device 2*b* acquires the account ID list corresponding to the provisional user ID list from the provisional user ID storing unit 22 in the condition matching device 2*b*. In the present example, the provisional user ID storing unit 22 in the condition matching device 2b stores the information shown in FIG. 3(b). Therefore, the condition matching execution unit 23 obtains "hina", "ayano", "syou", and "sakura" as the account ID list. Further, the condition matching execution unit 23 acquires the user information corresponding to those account IDs from the user information storing unit 21 in the condition matching device 2b.

The condition matching execution unit 23 then specifies the account IDs that match the condition corresponding to the linked conditional ID "123" (the condition that "the user is in the age group of thirties"). In the present example, "hina", "syou", and "sakura" are in the age group of thirties, and "ayano" is in the age group of forties (see FIG. 2(b)). Thus, the condition matching execution unit 23 specifies "hina", "syou", and "sakura" as the account IDs matching the condition, and returns the provisional user ID list "USER-B-001", "USER-B-006", and "USER-B-007" corresponding thereto, to the linked conditional matching unit 31 in the linked conditional matching device 3 (step S29).

As a result, the provisional user ID list has further been narrowed down. Next, the linked conditional matching unit 31 causes a condition matching device that is made to perform the condition matching in the third place (here, the condition matching device 2c) to further narrow down the provisional user ID list. At this time, the linked conditional matching unit 31 notifies the provisional user ID supplying unit 33 of the provisional user ID list acquired in step S29 and the network address "http://matching-c.com" of the condition matching device 2c which is made to perform the condition matching next, to thereby request the provisional user IDs corresponding respectively to "USER-B-001", "USER-B-006", and "USER-B-007" and for use in the condition matching device 2c (http://matching-c.com) (step S30).

In response to the request from the linked conditional matching unit 31, the provisional user ID supplying unit 33 extracts from the database (see FIG. 5) the provisional user IDs "USER-C-001", "USER-C-006", and "USER-C-007" in the condition matching device 2c, corresponding respectively to "USER-B-001", "USER-B-006", and "USER-B-007", and returns them to the linked conditional matching unit 31 (step S31). The operations in steps S30 and S31 are similar to those in steps S26 and S27.

The linked conditional matching unit 31 transmits the provisional user ID list "USER-C-001", "USER-C-006", and "USER-CB-007" corresponding to the condition matching device 2c, obtained in steps S30 and S31, and the linked conditional ID, received from the linked conditional matching requesting device 1 in step S15, to the condition matching device 2c to thereby request the execution of the condition matching (step S32). This operation is similar to the operation of transmitting the provisional user ID list and the linked conditional ID to the condition matching device 2a or the condition matching device 2b (step S20, S28).

Further, the operation of the condition matching device 2c that has received the provisional user ID list and the linked conditional ID is similar to the operation of the condition matching device 2a, 2b. That is, the condition matching execution unit 23 in the condition matching device 2c acquires the account ID list corresponding to the provisional user ID list from the provisional user ID storing unit 22 in the condition matching device 2c. In the present example, the condition matching execution unit 23 acquires "hina", "syou", and "sakura" corresponding to "USER-C-001", "USER-C-006", and "USER-C-007". Further, the condition matching execution unit 23 acquires the user information corresponding to those account IDs from the user information storing unit 21 in the condition matching device 2c.

Then, the condition matching execution unit 23 specifies the account IDs that match the condition corresponding to the linked conditional ID "123" (the condition that "the user's gender is female"). In the present example, among "hina", "syou", and "sakura", "hina" and "sakura" are female (see FIG. 2(c)). Thus, the condition matching execution unit 23 specifies "hina" and "sakura" as the account IDs matching the condition, and returns the provisional user ID list of "USER-C-001" and "USER-C-007" corresponding thereto, to the linked conditional matching unit 31 in the linked conditional matching device 3 (step S33).

The linked conditional matching unit 31 has requested the condition matching to each of the condition matching devices 2a, 2b, 2c indicated by the network address list received in step S15. Therefore, the linked conditional matching unit 31 determines that there is no condition matching execution device to which it should request the condition matching next.

As a result, the provisional user ID list of "USER-C-001" and "USER-C-007" acquired by the linked conditional matching unit 31 represents the users who match all the conditions designated by the condition designator. The linked conditional matching unit 31 requests the processing execution unit 34 to perform the processing (advertisement delivery processing in the present exemplary embodiment) on the user terminals of the users specified by "USER-C-001" and "USER-C-007" (step S34). In step S34, the linked conditional matching unit 31 notifies the processing execution unit 34 of the provisional user IDs "USER-C-001" and "USER-C-007" and the advertisement information received in step S15.

In response to the advertisement delivery request in step S34, the processing execution unit 34 transmits the advertisement information to the user terminals 4 of the users specified by "USER-C-001" and "USER-C-007" (step S35).

In step S35, the processing execution unit 34 for example requests, from the provisional user ID supplying unit 33, the single sign-on IDs corresponding to the provisional user IDs "USER-C-001" and "USER-C-007" received in step S34, and acquires "USER-001" and "USER-007" from the provisional user ID supplying unit 33. At this time, the provisional user ID supplying unit 33 may extract the requested single sign-on IDs from the database (see FIG. 5), and return them to the processing execution unit 34. Then, the processing execution unit 34 may transmit the advertisement information to the user terminals 4 of the users indicated by those single sign-on IDs. For example, the processing execution unit 34 may transmit the advertisement information by using the mail addresses stored in advance in association with the single sign-on IDs as the destinations.

As a result, the advertisements can be delivered to the user terminals of the users who match all the conditions designated by the condition designator.

In the exemplary embodiment described above, there were three condition matching devices. In the case of using four or more condition matching devices, the linked conditional matching device 3 may perform the processing similar to steps S26 to S29 or steps S30 to S33 for the fourth condition matching device and others, before the processing in step S34 and on.

In the present exemplary embodiment, the provisional user ID selecting unit 32 causes the provisional user ID supplying unit 33 to extract the provisional user ID list of the users for whom provisional user IDs have been transmitted to all the condition matching devices 2a, 2b, 2c indicated by "http://matching-a.com", "http://matching-b.com", and "http://matching-c.com". Then, with this provisional user ID list as the initial state, the linked conditional matching unit 31 causes the respective condition matching devices 2a, 2b, 2c to sequentially perform the condition matching, to thereby specify any user who matches the designated conditions. As to the user for whom a provisional user ID has not been transmitted to at least one of the condition matching devices, it is not possible to cause that condition matching device to perform the condition matching. In the present invention, however, the provisional user ID selecting unit 32 causes the provisional user ID supplying unit 33 to extract only the provisional user IDs of the users for whom provisional user IDs have already been transmitted to the condition matching devices indicated by all the network addresses included in the network address list designated by the linked conditional matching requesting device 1, so that it is possible to exclude, from the list, the user for whom the condition matching cannot be performed. As a result, the processing load on the linked conditional matching device 3 and the condition matching devices 2a, 2b, 2c can be reduced. Further, as the amount of information of the provisional user ID list is reduced, it is possible to reduce the network load on the Internet 5 as well.

Further, the condition matching devices 2a, 2b, 2c each determine whether the user information of the users specified by the provisional user IDs received from the linked conditional matching unit 31 match the designated condition. Each of the condition matching devices 2a, 2b, 2c does not have to transmit the user information to the other devices. This can suppress the risk of leakage of the user information. Furthermore, it is unnecessary to encrypt the user information for transmitting the user information. This can reduce the processing load on the condition matching system.

Furthermore, the linked conditional matching requesting device 1 transmits a linked conditional ID and the conditions that should be met by the user information to the respective condition matching devices 2a, 2b, 2c, and transmits the linked conditional ID to the linked conditional matching device 3. Then, the linked conditional matching device 3 designates the linked conditional ID to cause each of the condition matching devices 2a, 2b, 2c to perform the condition matching. Accordingly, the condition designator is able to cause the advertisement delivery processing or the like to be performed on the user terminals of the users who match the desired conditions, without the need to notify the communication carrier managing the linked conditional matching device 3 of the conditions that should be met by the user information.

In the case of determining a provisional user ID for each user in advance, it is preferable to prepare a different provisional user ID for each of the condition matching devices 2a, 2b, 2c. By doing so, it is possible to lower the risk of leakage of the user identity to a third party on the basis of the provisional user ID lists transmitted and received between the condition matching devices 2a, 2b, 2c, and the linked conditional matching device 3.

The description was made above of the case where the linked conditional matching unit 31 acquires the provisional user IDs selected by the provisional user ID selecting unit 32 and then causes each of the condition matching devices to sequentially narrow down the users. Alternatively, the linked conditional matching unit 31 may transmit the same group of provisional user IDs to a plurality of condition matching devices to cause the respective condition matching devices to narrow down the users. For example, assume that there are four condition matching devices A to D. At this time, the linked conditional matching unit 31 may transmit the provisional user IDs of the users that the condition matching device A had narrowed down, to the condition matching devices B and C, to cause each of the condition matching devices B and C to narrow down the provisional user IDs. In this case, the linked conditional matching unit 31 may, for example, obtain a product set of the provisional user IDs narrowed down by the condition matching device B and the provisional user IDs narrowed down by the condition matching device C, and transmit the provisional user IDs belonging to that product set, to the condition matching device D.

In the above exemplary embodiment, the description was made of the case where the condition matching system uses three types of user IDs (account IDs, single sign-on IDs, and provisional user IDs). However, it is unnecessary to use all the three types of user IDs, the account IDs, single sign-on IDs, and provisional user IDs, as long as the system is configured such that user IDs that can designate users between the linked conditional matching device 3 and each of the condition matching devices 2a, 2b, 2c (the user IDs that play a role similar to that of the above-described provisional user IDs) are used and that each of the condition matching devices 2a, 2b, 2c can specify any user whose user information matches a condition from among the users specified by the user IDs received from the linked conditional matching device 3. Such an example will be described below as a modification of the first exemplary embodiment.

For example, it is unnecessary for each of the condition matching devices 2a, 2b, 2c to use the account IDs. In this case, each condition matching device 2a, 2b, 2c may identify each user by the provisional user ID received from the provisional user ID supplying unit 33, and store the provisional user ID and the user information in association with each other. In this configuration, the user information storing unit 21 of each of the condition matching devices 2a, 2b, 2c may include a storing unit (referred to as "user information/provisional user ID storing unit") which stores the provisional user IDs and the user information in association with each other, instead of the user information storing unit 21 and the provisional user ID storing unit 22. Further, the user terminal 4 does not have to transmit the account IDs in step S10. The provisional user ID supplying unit 11 may transmit the provisional user IDs to the condition matching device in step S11. The user information/provisional user ID storing unit stores the provisional user IDs. Then, after step S11, the condition matching device may store the user information of the user in association with the provisional user ID in the user information/provisional user ID storing unit. The manner of storing the user information in association with the provisional user ID in the user information/provisional user ID storing unit is not particularly limited. In this configuration, the user information/provisional user ID storing unit stores the provisional user ID and the user information directly in association with each other. This enables the condition matching execution unit 23 to extract the user information of the user specified by the provisional user ID received from the linked conditional matching device 3, from the user information/provisional user ID storing unit. Then, the condition matching execution unit 23 may compare the user information with the designated condition.

Further, for example in the case of designating the users between the linked conditional matching device 3 and each of the condition matching devices 2a, 2b, 2c, the single sign-on IDs may be used in place of the provisional user IDs in the above exemplary embodiment. In this configuration example, the provisional user ID supplying unit 33 is referred to as a user ID supplying unit 33 for convenience' sake. Further, the provisional user ID selecting unit 32 is referred to as a user ID selecting unit 32 for convenience' sake. Furthermore, the provisional user ID storing unit 22 is referred to as a user ID storing unit 22 for convenience' sake. In step S11, the user ID supplying unit 33 may transmit the account ID and the single sign-on ID received from the user terminal 4, to the condition matching device. Then, the user ID storing unit 22 in the condition matching device may store the account ID and the single sign-on ID in association with each other. Further, the user ID supplying unit 33 may store, for the network address of each condition matching device, information as to whether the single sign-on ID has been transmitted to the condition matching device, in the database shown by way of example in FIG. 5. In steps S17 and S18, the user ID selecting unit 32 may request, from the user ID supplying unit 33, the single sign-on IDs of the users whose single sign-on IDs have been transmitted to all the condition matching devices indicated by the network address list, and, in response to the request, the user ID supplying unit 33 may return the requested single sign-on IDs to the user ID selecting unit 32. In the processing in and after step S19 as well, the condition matching system may use the single sign-on IDs in place of the provisional user IDs in the first exemplary embodiment. The remaining points are identical to those in the first exemplary embodiment. In this example, the single sign-on IDs play a role similar to that of the provisional user IDs in the first exemplary embodiment.

Exemplary Embodiment 2

The second exemplary embodiment provides a configuration in which a provisional user ID supplying unit, which transmits provisional user IDs to a condition matching device, and a processing execution unit, which executes advertisement delivery or other processing, are arranged in a distributed manner in each of a plurality of devices (processing execution devices, described later) that are managed by different user ID suppliers. That is, in the second exemplary embodiment, there are provided a plurality of processing execution devices each of which transmits provisional user IDs to the condition matching device that was designated by a user at the time when a utilization request with single sign-on was accepted, and also performs transmission of advertisements to the user terminal of any user who matches all the conditions designated by a condition designator. The processing execution devices are managed by the user ID suppliers different from each other.

A user ID supplier assigns a user ID to the user of a user terminal. In the present exemplary embodiment, a description will be made of a case where the user ID supplier assigns user IDs to the users of the user terminals and also provides services to the users. Examples of the user ID supplier include a communication carrier, an Internet service provider, and a service business operator who provides a Web page search service and so on, although the user ID suppliers are not limited thereto. All that is needed is that the user ID suppliers manage processing execution devices 14a, 14b, which will be described later. The following description will be made of the case where the processing execution devices 14a, 14b, described later, are managed by communication carriers.

Figure 12:
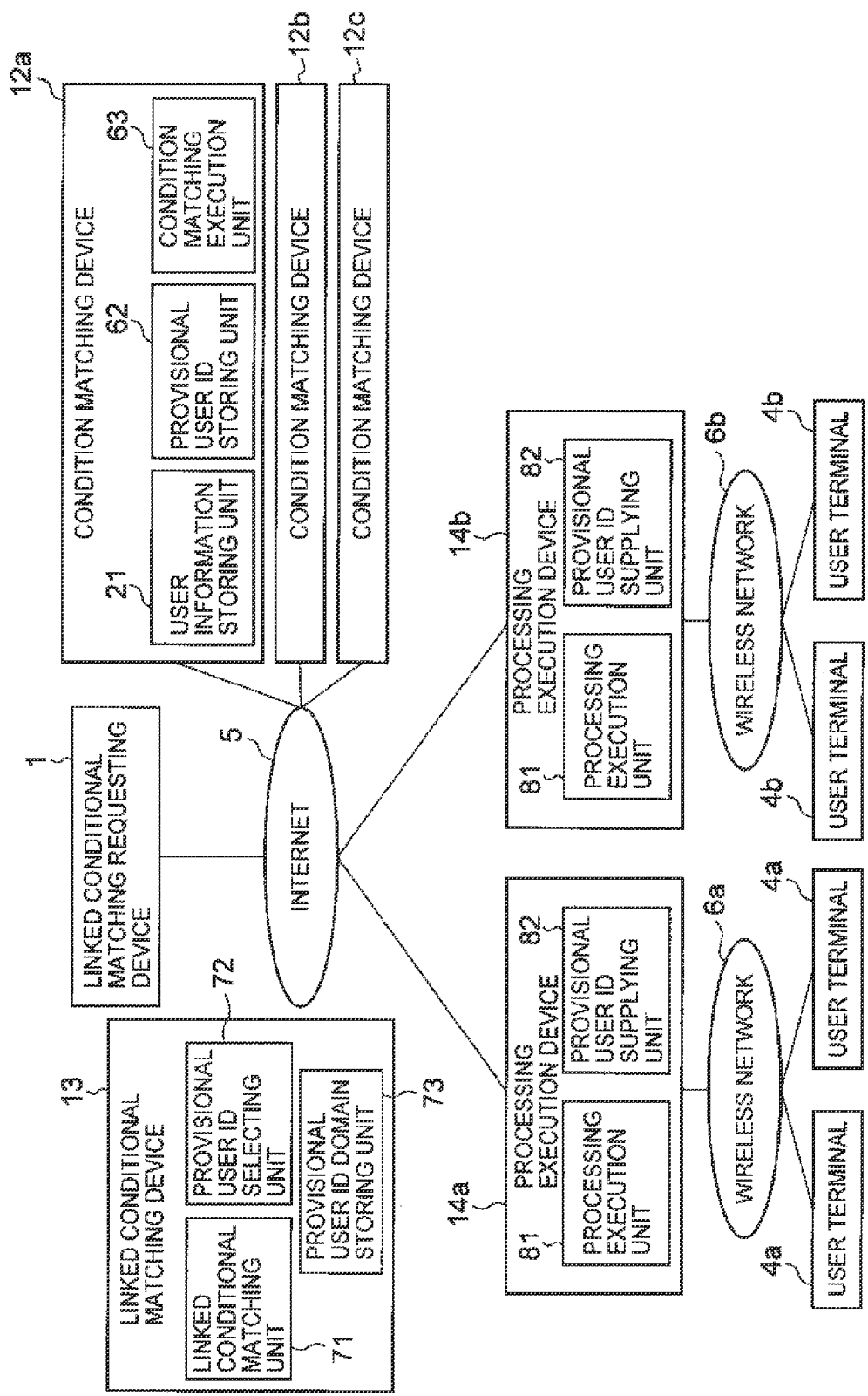
FIG. 12 is a block diagram showing, by way of example, the condition matching system according to a second exemplary embodiment of the present invention.

FIG. 12 is a block diagram showing, by way of example, a condition matching system according to the second exemplary embodiment of the present invention. The same constituent elements as in the first exemplary embodiment are denoted by the same reference signs as in FIG. 1, and the detailed description thereof will not be repeated. The condition matching system according to the second exemplary embodiment includes a linked conditional matching requesting device 1, a plurality of condition matching devices 12a to 12c, a linked conditional matching device 13, and a plurality of processing execution devices 14a, 14b. As in the first exemplary embodiment, the number of condition matching devices is not limited to three, as long as it is more than one. Further, the number of processing execution devices is not limited to two; another one or more processing execution device(s) may be provided.

The linked conditional matching requesting device 1, the condition matching devices 12a to 12c, the linked conditional matching device 13, and the processing execution devices 14a, 14b are connected via a communication network such as the Internet 5.

The linked conditional matching requesting device 1 is the same as in the first exemplary embodiment.

The processing execution devices 14a, 14b are managed by different communication carriers. To the processing execution device 14a, user terminals 4a of the users who receive communication services from the communication carrier that manages the processing execution device 14a (called the "communication carrier X") are connected through a wireless network 6a. To the processing execution device 14b, user terminals 4b of the users who receive communication services from the communication carrier that manages the processing execution device 14b (called the "communication carrier Y") are connected through a wireless network 14b. While the wireless networks 6a, 6b are shown in FIG. 12 by way of example, the processing execution devices and the user terminals may be connected through other communication networks, as with the case of the first exemplary embodiment.

Each processing execution device includes a processing execution unit 81 and a provisional user ID supplying unit 82. While the processing execution device 14a will be described below, the same description applies to the processing execution device 14b.

When the provisional user ID supplying unit 82 in the processing execution device 14a receives from a user terminal 4a a utilization request with single sign-on together with designation of a condition matching device and account ID, the provisional user ID supplying unit 82 specifies a provisional user ID for use with the condition matching device in designating the user who owns the user terminal 4. More specifically, the provisional user ID supplying unit 82 holds in advance a provisional user ID of a user for each combination of the user of a user terminal 4a and a condition matching device (for example, for each combination of a single sign-on ID and the network address of a condition matching device). The provisional user ID supplying unit 82 may specify the provisional user ID that corresponds to the combination of the user who has made the utilization request with single sign-on and the condition matching device which was designated at the time of the request.

It is noted that individual provisional user IDs may be determined in advance. The manner of determining the provisional user IDs is not particularly limited. However, in the second exemplary embodiment, it is configured such that a provisional user ID includes identification information indicating that the provisional user ID is the one held in the processing execution device 14a of the communication carrier X (in other words, that it is the provisional user ID issued from the processing execution device 14a). This identification information will be referred to as a provisional user ID domain. Further, in the present example, it is assumed that the provisional user ID supplying unit 82 in the processing execution device 14a of the communication carrier X holds a group of provisional user IDs each including "@IDP-X" as the provisional user ID domain. The provisional user ID domain may also be referred to as user ID supplier identification information. In the present exemplary embodiment, a description will be made of the case where the provisional user ID and the provisional user ID domain (user ID supplier identification information) are associated with each other as the provisional user ID includes the provisional user ID domain. However, the provisional user ID and the provisional user ID domain may be handled separately from each other, as long as the provisional user ID and the provisional user ID domain are associated with each other.

The provisional user ID supplying unit 82 transmits the account ID and the specified provisional user ID to the designated condition matching device. In the present exemplary embodiment, the provisional user ID includes the provisional user ID domain. This results in the fact that the provisional user ID supplying unit 82 also transmits the provisional user ID domain to the condition matching device. As previously described, the provisional user ID and the provisional user ID domain may be handled separately from each other, in which case the provisional user ID and the provisional user ID domain may be transmitted to the condition matching device separately from each other.

Further, the provisional user ID supplying unit 82 in the processing execution device 14a stores the provisional user ID transmitted to the condition matching device, together with the single sign-on ID of the user and the network address of the condition matching device corresponding to that provisional user ID. In this manner, the provisional user ID supplying unit 82 stores the information regarding the status of issuance of the provisional user IDs. This is the same as in the first exemplary embodiment. FIG. 13 is a diagram illustrating, by way of example, the information regarding the status of issuance of provisional user IDs in the processing execution device 14a. The information shown in FIG. 13 is similar to that in the database shown by way of example in FIG. 5. In the initial state, the information "unissued" is stored in place of a provisional user ID. When a user terminal 4a makes a utilization request with single sign-on by designating a condition matching device, the provisional user ID supplying unit 82 specifies a provisional user ID from among a group of predetermined provisional user IDs, and transmits a set of the provisional user ID and the account ID to the condition matching device. The provisional user ID supplying unit 82 also stores the provisional user ID into the database shown by way of example in FIG. 13. In the processing execution device 14a, as shown in FIG. 13, each provisional user ID includes the provisional user ID domain "@IDP-X".

The provisional user ID supplying unit 82 in the processing execution device 14b operates in the same manner as the provisional user ID supplying unit 82 in the processing execution device 14a. However, the provisional user ID supplying unit 82 in the processing execution device 14b holds in advance, for each combination of a user and a condition matching device, a provisional user ID including "@IDP-Y" as the provisional user ID domain indicating that the provisional user ID is the one held in the processing execution device 14b of the communication carrier Y (in other words, that it is the provisional user ID issued from the processing execution device 14b).

An example of the information regarding the status of issuance of provisional user IDs in the processing execution device 14b is shown in FIG. 14. The structure of the database is similar to the example shown in FIG. 13, although the provisional user ID domain and the single sign-on IDs are different.

While "@IDP-X" and "@IDP-Y" are used as the provisional user ID domains in the present exemplary embodiment, "@IDP-X" and "@IDP-Y" are merely illustrative; the character strings constituting the provisional user ID domains are not particularly limited.

Further, the processing execution unit 81 in each of the processing execution devices 14a, 14b delivers advertisements to the user terminals of the users who have been specified by the linked conditional matching device 13 through the linked conditional matching. While the case for the processing execution unit 81 to deliver advertisements to the user terminals is described here as in the first exemplary embodiment, the manner of the processing performed on the user terminals is not restricted to the delivery of advertisements.

The processing execution unit 81 and the provisional user ID supplying unit 82 are implemented, for example, by a computer that operates in accordance with a program for a processing execution device. The processing execution unit 81 and the provisional user ID supplying unit 82 may be implemented by the same hardware, or may be implemented by separate hardware components or separate devices.

Each of the condition matching devices 12a, 12b, 12c includes a user information storing unit 21, a provisional user ID storing unit 62, and a condition matching execution unit 63.

The user information storing unit 21 is the same as the one in the first exemplary embodiment. In the following description, it is assumed that the user information storing unit 21 in the condition matching device 12a stores the information shown by way of example in FIG. 2(a). It is assumed that the user information storing unit 21 in the condition matching device 12b stores the information shown by way of example in FIG. 2(b). It is assumed that the user information storing unit 21 in the condition matching device 12c stores the information shown by way of example in FIG. 2(c).

The provisional user ID storing unit 62 stores account IDs and provisional user IDs in association with each other, as in the first exemplary embodiment. However, the provisional user ID storing unit 62 receives and stores the account IDs and the provisional user IDs from the provisional user ID supplying units 82 in the processing execution devices 14a, 14b. FIG. 15 is a diagram illustrating, by way of example, the information stored in the provisional user ID storing units 62 in the condition matching devices 12a to 12c. FIG. 15(a) shows, by way of example, the account IDs and the provisional user IDs stored in the provisional user ID storing unit 62 in the condition matching device 12a. FIG. 15(b) shows, by way of example, the account IDs and the provisional user IDs stored in the provisional user ID storing unit 62 in the condition matching device 12b. FIG. 15(c) shows, by way of example, the account IDs and the provisional user IDs stored in the provisional user ID storing unit 62 in the condition matching device 12c.

In the case where a provisional user ID is designated from the condition matching execution unit 63, the provisional user ID storing unit 62 returns the account ID corresponding to that provisional user ID to the condition matching execution unit 63. Further, in the case where a provisional user ID domain is designated from the condition matching execution unit 63, the provisional user ID storing unit 62 returns the account IDs corresponding respectively to the provisional user IDs including that provisional user ID domain, to the condition matching execution unit 63.

The condition matching execution unit 63 operates in a manner similar to the condition matching execution unit 23 in the first exemplary embodiment. However, when the condition matching execution unit 63 receives a linked conditional ID and a provisional user ID domain from the linked conditional matching device 13, the condition matching execution unit 63 requests the account IDs corresponding to the provisional user IDs including that provisional user ID domain from the provisional user ID storing unit 62. The condition matching execution unit 63 then specifies any user who meets the condition indicated by the linked conditional ID, and returns a list of the provisional user IDs of the specified users to the linked conditional matching device 13.

Although not shown in FIG. 12, each of the condition matching devices 12a, 12b, 12c includes a service providing unit which provides a service to the user who has made the utilization request with single sign-on. The types of processing that the service providing units perform on the user terminals 4a, 4b as the services to the users are not particularly limited.

The condition matching device including the user information storing unit 21, the provisional user ID storing unit 62, the condition matching execution unit 63, and the service providing unit (not shown) is implemented, for example, by a computer that operates in accordance with a program. The user information storing unit 21, the provisional user ID storing unit 62, the condition matching execution unit 63, and the service providing unit (not shown) may be implemented by the same hardware, or they may be implemented by separate hardware components or separate devices.

The linked conditional matching device 13 includes a linked conditional matching unit 71, a provisional user ID selecting unit 72, and a provisional user ID domain storing unit 73. In the present exemplary embodiment, the linked conditional matching device 13 is managed, for example, by a business operator such as an Internet service provider, different from the communication carriers that manage the processing execution devices 14a, 14b.

The provisional user ID domain storing unit 73 stores one or more provisional user ID domains. FIG. 16 is a diagram illustrating, by way of example, the provisional user ID domains stored in the provisional user ID domain storing unit 73. The provisional user ID domain(s) stored in the provisional user ID domain storing unit 73 define(s) the processing execution device(s) such that the users who own the user terminals connected to the processing execution device(s) are subjected to the processing of specifying, from among those users, any user who matches the conditions designated by the linked conditional matching requesting device 1.

For example, in the example shown in FIG. 16, "@IDP-X" and "@IDP-Y" are stored. In this case, even if another processing execution device is provided besides the processing execution devices 14a, 14b shown in FIG. 12, at the time of specifying any user who matches the designated conditions, the linked conditional matching device 13 excludes, from the processing objects, the provisional user ID of a user of any user terminal that makes a utilization request with single sign-on through the another processing execution device.

Further, for example assume that the provisional user ID domain storing unit 73 stores "@IDP-X" alone. In this case, at the time of specifying any user who matches the designated conditions, the linked conditional matching device 13 uses the provisional user IDs issued from the processing execution device 14a to specify the users, while excluding the provisional user IDs issued from the processing execution device 14b from the processing objects.

It is noted that the administrator of the linked conditional matching device 13 may determine in advance which users using the processing execution device(s) of which communication carrier(s) are to be selected as the processing objects of the linked conditional matching, and store the provisional user ID domain(s) for the processing execution device(s) in the provisional user ID domain storing unit 73. In this case, the way of storing the provisional user ID domain(s) in the provisional user ID domain storing unit 73 by the administrator of the linked conditional matching device 13 is not particularly limited.

The linked conditional matching unit 71 performs the linked conditional matching. That is, the linked conditional matching unit 71 repeats the processing of causing a condition matching device to specify the users who match a condition, and passing the result to another condition matching device to cause the device to specify the users who match another condition, to thereby specify any user who meets all the conditions designated by the linked conditional matching requesting device 1.

In the second exemplary embodiment, however, the linked conditional matching unit 71 notifies a condition matching device that is made to perform the condition matching first of the provisional user ID domain(s) stored in the provisional user ID domain storing unit 73 and a linked conditional ID, to cause the condition matching device to specify, from among the provisional user IDs including the notified provisional user ID domain(s), the provisional user IDs corresponding to the user information matching the condition. Thereafter, the linked conditional matching unit 71 causes the provisional user ID selecting unit 72 to select provisional user IDs from the list of the provisional user IDs. The succeeding operation is similar to that of the linked conditional matching unit 31 in the first exemplary embodiment.

When the provisional user ID selecting unit 72 is notified of the list of the provisional user IDs from the linked conditional matching unit 71, the provisional user ID selecting unit 72 selects the provisional user IDs of the users to be narrowed down by the condition matching device, from the information held in the provisional user ID supplying units 82 in the processing execution devices 14a, 14b (i.e. the information regarding the status of issuance of provisional user IDs; see FIGS. 13 and 14). At this time, the provisional user ID selecting unit 72 requests, from each provisional user ID supplying unit 82, a list of the provisional user IDs, among the provisional user IDs included in the list notified from the linked conditional matching unit 71, satisfying the conditions that they are the provisional user IDs of the users for whom provisional user IDs have already been transmitted to all the condition matching devices that store the user information related to the respective conditions designated by the linked conditional matching requesting device 1, and that they are the provisional user IDs used in the condition matching device in which the condition matching is to be carried out next. The provisional user ID selecting unit 72 acquires the resultant list of such provisional user IDs from each provisional user ID supplying unit 82.

The linked conditional matching unit 71, the provisional user ID selecting unit 72, and the provisional user ID domain storing unit 73 are implemented, for example, by a CPU of a computer that operates in accordance with a linked conditional matching program. In this case, for example, a program storing device (not shown) in the computer stores the linked conditional matching program, and the CPU reads the program and, in accordance with the program, operates as the linked conditional matching unit 71, the provisional user ID selecting unit 72, and the provisional user ID domain storing unit 73. Alternatively, the linked conditional matching unit 71, the provisional user ID selecting unit 72, and the provisional user ID domain storing unit 73 may be implemented by separate hardware components or separate devices.

The operations will now be described.

In the present example, it is assumed that the network address for accessing the condition matching execution unit 63 in the condition matching device 12a is "http://matching-a.com". Further, it is assumed that the network address for accessing the condition matching execution unit 63 in the condition matching device 12b is "http://matching-b.com". Further, it is assumed that the network address for accessing the condition matching execution unit 63 in the condition matching device 12c is "http://matching-c.com". These network addresses are used when the linked conditional matching requesting device 1 and the linked conditional matching unit 71 designate a condition matching device.

It is however assumed that the network address for use in designating the condition matching device 12a when a user terminal makes a utilization request with single sign-on is "http://userid-store-a.com".

Figure 17:
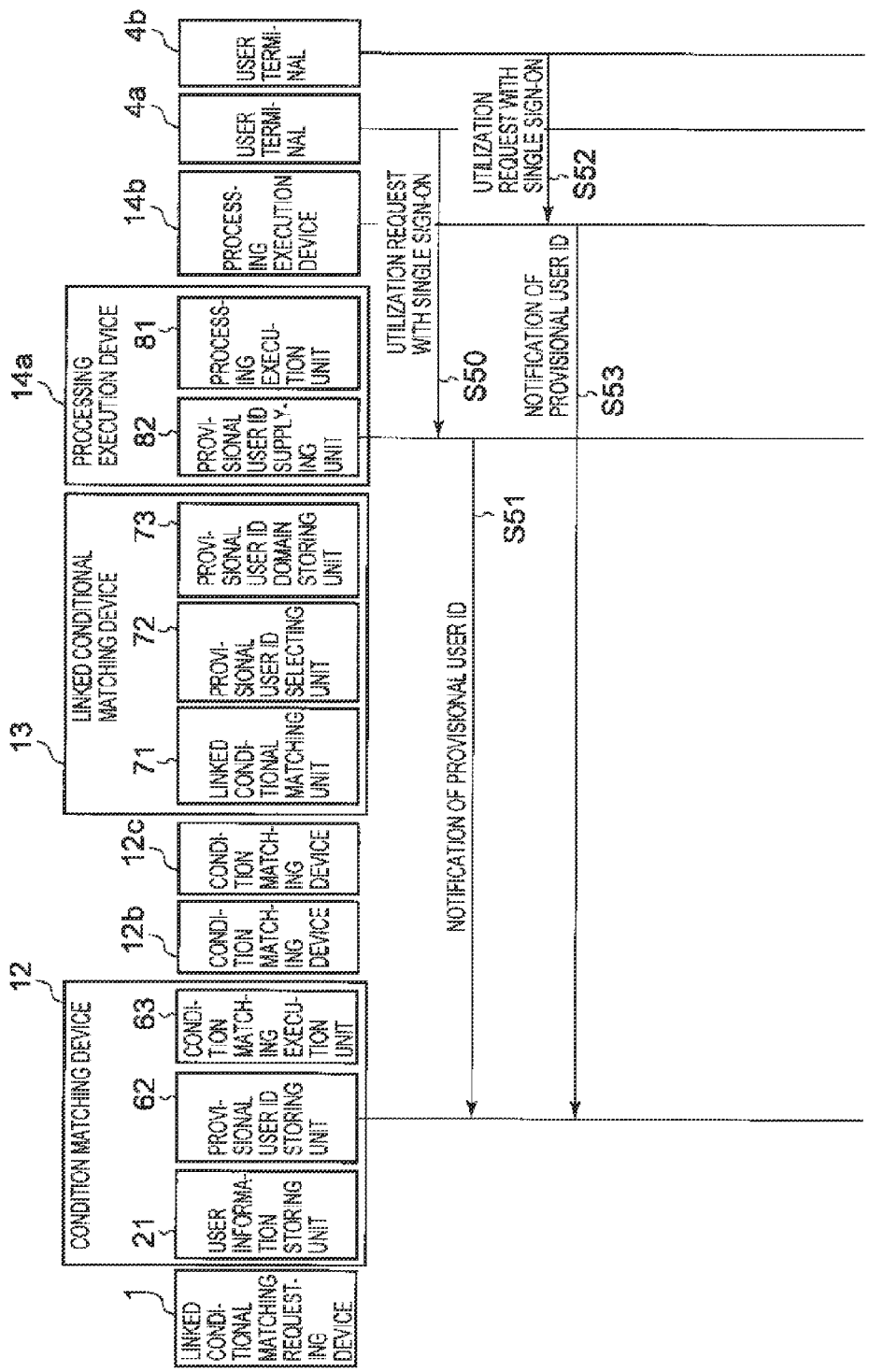

FIG. 17 is a diagram illustrating, by way of example, the operation in the case where the user terminals 4a, 4b each make a utilization request with single sign-on. In the second exemplary embodiment, the operation when requesting utilization with single sign-on is similar to that in the first exemplary embodiment except that the destination of the utilization request with single sign-on is the provisional user ID supplying unit 82 included in each of the processing execution devices 14a, 14b. In the following description, it is assumed that the condition matching device 12a is designated when each user terminal makes the utilization request with single sign-on.

That is, a user terminal 4a of a user who uses the communication carrier X transmits the single sign-on ID of the user (assumed to be "USER-001"), the network address "http://userid-store-a.com" of the condition matching device 12a from which the user requests a service, and the account ID "hina" of the user in the condition matching device 12a, to the provisional user ID supplying unit 82 in the processing execution device 14a of the communication carrier X (step S50). The user terminal 4a makes a utilization request with single sign-on by transmitting these pieces of information.

When the provisional user ID supplying unit 82 in the processing execution device 14a receives the single sign-on ID, the network address of the condition matching device 12a, and the account ID in the condition matching device 12a from the user terminal 4a, the provisional user ID supplying unit 82 specifies a provisional user ID that corresponds to the combination of the single sign-on ID and the condition matching device 12a, from among predetermined provisional user IDs. In the present example, it is assumed that this provisional user ID is "USER-A-001@IDP-X". The provisional user ID supplying unit 82 transmits the specified provisional user ID "USER-A-001@IDP-X" and the account ID "hina" received from the user terminal 4a, to the provisional user ID storing unit 62 in the condition matching device 12a designated by the user terminal 4a (step S51). Upon reception of the provisional user ID and the account ID, the provisional user ID storing unit 62 stores the provisional user ID "USER-A-001@IDP-X" and the account ID "hina", as shown in FIG. 15(a).

Further, the provisional user ID supplying unit 82 stores the provisional user ID "USER-A-001@IDP-X", transmitted to the condition matching device 12a, as the provisional user ID corresponding to the single sign-on ID "USER-001" and the network address "http://matching-a.com" of the condition matching device 12a, into the database, as shown by way of example in FIG. 13.

When the provisional user ID supplying unit 82 has succeeded in authentication of the single sign-on ID, the condition matching device 12a carries out the service to the user terminal 4a of "USER-001". The content of the service is not particularly limited.

The operation in the case where a user terminal 4b of a user who uses the communication carrier Y makes a utilization request with single sign-on is similar as described above. That is, the user terminal 4b transmits the single sign-on ID of the user (assumed to be "USER-007"), the network address "http://userid-store-a.com" of the condition matching device 12a, and the account ID "sakura" of the user in the condition matching device 12a, to the provisional user ID supplying unit 82 in the processing execution device 14b of the communication carrier Y (step S52).

When the provisional user ID supplying unit 82 in the processing execution device 14b receives the pieces of information transmitted in step S52, the provisional user ID supplying unit 82 specifies a provisional user ID that corresponds to the combination of the single sign-on ID and the condition matching device 12a, from among predetermined provisional user IDs. In the present example, it is assumed that this provisional user ID is "USER-A-007@IDP-Y". The provisional user ID supplying unit 82 transmits the provisional user ID "USER-A-007@IDP-Y" and the account ID "sakura" to the provisional user ID storing unit 62 in the condition matching device 12a (step S53). The provisional user ID storing unit 62 stores the received information of "USER-A-007@IDP-Y" and "sakura", as shown by way of example in FIG. 15(a).

Further, the provisional user ID supplying unit 82 stores the provisional user ID "USER-A-007@IDP-Y", transmitted to the condition matching device 12a, as the provisional user ID corresponding to the single sign-on ID "USER-007" and the network address "http://matching-a.com" of the condition matching device 12a, into the database, as shown by way of example in FIG. 14.

When the provisional user ID supplying unit 82 has succeeded in authentication of the single sign-on ID, the condition matching device 12a carries out the service to the user terminal 4b of "USER-007".

As the processing similar to those in steps S50, S51 or steps S51, S52 described above is repeated, the provisional user ID is stored one by one in the database shown by way of example in FIGS. 13 and 14.

Figure 18:
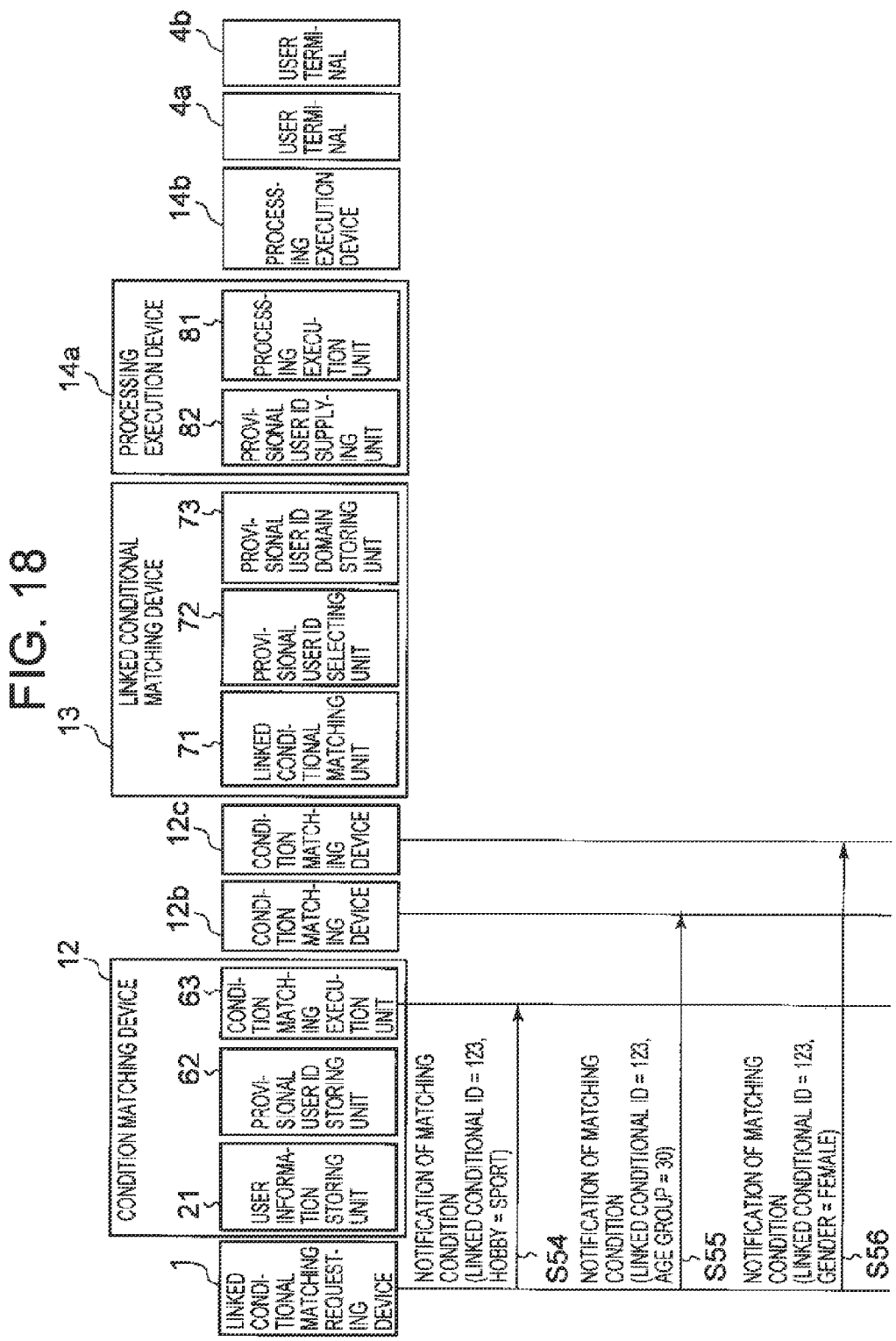
FIG. 18 is a diagram illustrating, by way of example, the operation in the case where the linked conditional matching requesting device 1 transmits conditions that should be met by user information, to the condition matching devices 12a, 12b, 12c.

FIG. 18 is a diagram illustrating, by way of example, the operation in the case where the linked conditional matching requesting device 1 transmits the conditions that should be met by the user information to the condition matching devices 12a, 12b, 12c. This operation is similar to steps S12 to S14 in the first exemplary embodiment.

For example, the linked conditional matching requesting device 1 transmits the condition that "the user's hobby is sport" and the linked conditional ID "123" to the condition matching device 12a which stores the user information related to hobbies (step S54). Upon reception of this condition and the linked conditional ID "123", the condition matching execution unit 63 in the condition matching device 12a stores the condition and the linked conditional ID in association with each other (see FIG. 4(a)).

Further, for example, the linked conditional matching requesting device 1 transmits the condition that "the user is in the age group of thirties" and the linked conditional ID "123" to the condition matching device 12b which stores the user information related to the age groups (step S55). Then, the condition matching execution unit 63 in the condition matching device 12b stores this condition and the linked conditional ID in association with each other (see FIG. 4(b)).

Further, for example, the linked conditional matching requesting device 1 transmits the condition that "the user's gender is female" and the linked conditional ID "123" to the condition matching device 12c which stores the user information related to the genders (step S56). Then, the condition matching execution unit 63 in the condition matching device 12c stores this condition and the linked conditional ID in association with each other (see FIG. 4(c)).

The conditions transmitted in steps S54 to S56 have been determined by the condition designator who manages the linked conditional matching requesting device 1. The above-described "123" is an example of the linked conditional ID. Another value may be assigned as the linked conditional ID.

FIGS. 19 to 22 are diagrams illustrating, by way of example, the progress of processing in the case where the linked conditional matching device performs the linked conditional matching. First, the linked conditional matching requesting device 1 transmits, to the linked conditional matching device 13, a linked conditional ID which has been assigned to each condition that should be met by users to whom advertisements are to be delivered, a list of network addresses of the condition matching devices (more specifically, the condition matching execution units 63) which are to perform user specification according to those conditions, and advertisements which are to be delivered to the user terminal 4a, 4b of any user who meets the conditions (step S57). The operation in step S57 is similar to that in step S15 in the first exemplary embodiment. The linked conditional matching requesting device 1 transmits these pieces of information to thereby request the linked conditional matching device 13 to do the linked conditional matching.

In the present example, the linked conditional matching requesting device 1 transmits "123" as the linked conditional ID, and transmits "http://matching-a.com", "http://matching-b.com", and "http://matching-c.com" as the list of network addresses.

The linked conditional matching unit 71 in the linked conditional matching device 13 stores the pieces of information (advertisement information, linked conditional ID, and network address list) received in step S57 from the linked conditional matching requesting device 1.

Next, in the linked conditional matching device 13, the linked conditional matching unit 71 requests a provisional user ID domain from the provisional user ID domain storing unit 73 (step S58). In response to this request, the provisional user ID domain storing unit 73 returns the provisional user ID domain(s) stored (step S59). In the present example, it is assumed that the provisional user ID domain storing unit 73 stores "@IDP-X" and "@IDP-Y", as shown in FIG. 16, and that the provisional user ID domain storing unit 73 returns "@IDP-X" and "@IDP-Y".

When the linked conditional matching unit 71 acquires the provisional user ID domains, the linked conditional matching unit 71 transmits those provisional user ID domains "@IDP-X", "@IDP-Y" and the linked conditional ID "123" received in step S57, to the condition matching execution unit 63 of the condition matching device which is made to perform the condition matching first (step S60). To the condition matching device which is made to perform the condition matching first, the provisional user ID domains and the linked conditional ID are transmitted to thereby request the execution of the condition matching. In the present example, the description will be made of the case where the condition matching device 12a is made to perform the condition matching first, although the condition matching device which is made to perform the condition matching first may be one other than the condition matching device 12a.

When the condition matching execution unit 63 in the condition matching device 12a receives the provisional user ID domains "@IDP-X", "@IDP-Y" and the linked conditional ID "123", the condition matching execution unit 63 transmits the provisional user ID domains "@IDP-X" and "@IDP-Y" to the provisional user ID storing unit 62 in the condition matching device 12a, to request the account IDs corresponding to the provisional user IDs including the provisional user ID domains (step S61).

In response to the request in step S61, the provisional user ID storing unit 62 specifies all the provisional user IDs including "@IDP-X" or "@IDP-Y" from among the provisional user IDs stored, and further, it returns the account IDs corresponding to those provisional user IDs to the condition matching execution unit 63 (step S62). In the present example, it is assumed that the provisional user ID storing unit 62 stores the information shown by way of example in FIG. 15(a). In this case, the provisional user ID storing unit 62 returns "hina", "miu", "misaki", "ayano", "syou", "sakura", and "eita" as the account IDs corresponding to the provisional user IDs including "@IDP-X" or "@IDP-Y", to the condition matching execution unit 63.

In the case where the provisional user ID storing unit 62 stores provisional user IDs not including "@IDP-X" or "@IDP-Y" (i.e. the provisional user IDs determined by a processing device other than the processing execution devices 14a, 14b), those provisional user IDs are not returned to the condition matching execution unit 63.

Next, the condition matching execution unit 63 transmits the account IDs acquired in step S62 to the user information storing unit 21 in the condition matching device 12a, to request the user information corresponding to the account IDs (step S63).

In response to the request from the condition matching execution unit 63, the user information storing unit 21 extracts the user information corresponding to the account IDs, and returns the account IDs and the user information in association with each other to the condition matching execution unit 63 (step S64). In the present example, the user information storing unit 21 in the condition matching device 12a stores the information shown by way of example in FIG. 2(a). On the basis of this information, the user information storing unit 21 returns "sport, movie" as the user information of "hina" to the condition matching execution unit 63. Similarly, the user information storing unit 21 returns "sport, game" as the user information of "miu", "travel" as the user information of "misaki", "travel, sport" as the user information of "ayano", "cooking, sport" as the user information of "syou", "cooking, sewing, sport" as the user information of "sakura", and "fishing" as the user information of "eita", to the condition matching execution unit 63.

The condition matching execution unit 63 has stored in step S54 the condition corresponding to the linked conditional ID "123" received in step S57. In the present example, the condition matching execution unit 63 has stored the condition that "the user's hobby is sport" (see FIG. 4(a)). The condition matching execution unit 63 specifies, on the basis of the user information acquired in step 64, any account ID corresponding to the user information that matches the information. In the present example, "hina", "miu", "ayano", "syou", and "sakura" match the condition. Further, the condition matching execution unit 63 requests, from the provisional user ID storing unit 62, the provisional user IDs corresponding to these account IDs, and acquires the provisional user IDs "USER-A-001@IDP-X", "USER-A-002@IDP-X", "USER-A-004@IDP-X", "USER-A-006@IDP-Y", and "USER-A-007@IDP-Y" from the provisional user ID storing unit 62. Then, the condition matching execution unit 63 returns the list of these provisional user IDs to the linked conditional matching unit 71 in the linked conditional matching device 13 (step S65). As a result, the linked conditional matching unit 71 obtains the list of these provisional user IDs as a response to the condition matching execution request in step S60.

Next, the linked conditional matching unit 71 notifies the provisional user ID selecting unit 72 of the network address list received in step S57, the provisional user ID list received in step S65, and the network address of the condition matching device which is made to perform the condition matching next, to thereby request the provisional user ID selecting unit 72 to select provisional user IDs (step S66). In the present example, the linked conditional matching unit 71 notifies "http://matching-a.com", "http://matching-b.com", and "http://matching-c.com" as the network address list. Further, the linked conditional matching unit 71 notifies "USER-A-001@IDP-X", "USER-A-002@IDP-X", "USER-A-004@IDP-X", "USER-A-006@IDP-Y", and "USER-A-007@IDP-Y" as the provisional user ID list. Further, it is assumed that the condition matching device which should perform the condition matching next is the condition matching device 12b. Therefore, the linked conditional matching unit 71 notifies "http://matching-b.com" as the network address of the condition matching device which is made to perform the condition matching next.

Upon reception of the provisional user ID selection request (step S66), the provisional user ID selecting unit 72 sorts the notified provisional user ID list by the provisional user ID domains. Then, the provisional user ID selecting unit 72 transmits the provisional user IDs including "@IDP-X", i.e. "USER-A-001@IDP-X", "USER-A-002@IDP-X", and "USER-A-004@IDP-X", to the provisional user ID supplying unit 82 in the processing execution device 14a corresponding to "@IDP-X", together with the network address list "http://matching-a.com", "http://matching-b.com", and "http://matching-c.com", and the network address "http://matching-b.com" of the condition matching device 12b which is made to perform the condition matching next (step S67). By transmitting these pieces of information in step S67, the provisional user ID selecting unit 72 causes the provisional user ID supplying unit 82 in the processing execution device 14a to specify, from among "USER-A-001@IDP-X", "USER-A-002@IDP-X", and "USER-A-004@IDP-X", the provisional user ID of any user for whom provisional user IDs have been transmitted to all the condition matching devices 12a, 12b, 12c indicated by the network address list "http://matching-a.com", "http://matching-b.com", and "http://matching-c.com". Further, the provisional user ID selecting unit 72 requests, from the provisional user ID supplying unit 82 in the processing execution device 14a, a list of the provisional user IDs which are the provisional user IDs representing the same users as the specified provisional user IDs and which correspond to the network address "http://matching-b.com" of the condition matching device 12b which is made to perform the condition matching next. The provisional user ID selecting unit 72 may, for example, transmit an SQL requesting the list of such provisional user IDs to the provisional user ID supplying unit 82 in the processing execution device 14a.

The provisional user ID supplying unit 82 in the processing execution device 14a specifies, from among the designated provisional user IDs "USER-A-001@IDP-X", "USER-A-002@IDP-X", and "USER-A-004@IDP-X", the provisional user ID of any user for whom provisional user IDs have been transmitted to all the condition matching devices 12a, 12b, 12c indicated by the designated network address list "http://matching-a.com", "http://matching-b.com", and "http://matching-c.com", on the basis of the database stored in the provisional user ID supplying unit 82 itself (see FIG. 13). In the present example, as to "USER-A-002@IDP-X", a provisional user ID has not been issued to the condition matching device 12b ("http://matching-b.com") (see FIG. 13), and therefore, "USER-A-002@IDP-X" is excluded, and "USER-A-001@IDP-X" and "USER-A-004@IDP-X" are specified. The provisional user ID supplying unit 82 then specifies the provisional user IDs "USER-B-001@IDP-X" and "USER-B-004@IDP-X", representing the same users as "USER-A-001@IDP-X" and "USER-A-004@IDP-X" and corresponding to "http://matching-b.com", and transmits the specified IDs to the provisional user ID selecting unit 72 (step S68). The provisional user ID selecting unit 72 receives this provisional user ID list of "USER-B-001@IDP-X" and "USER-B-004@IDP-X" as a response to the request in step S67.

Alternatively, the provisional user ID selecting unit 72 may transmit, for each provisional user ID, the network address list and the network address "http://matching-b.com" of the condition matching device 12b which is made to perform the condition matching next, together with the provisional user ID, to the provisional user ID supplying unit 82 in the processing execution device 14a, so as to cause the provisional user ID supplying unit 82 to determine whether provisional user IDs for the user indicated by that provisional user ID have been transmitted to all the condition matching devices 12a, 12b, 12c indicated by "http://matching-a.com", "http://matching-b.com", and "http://matching-c.com", and may request a provisional user ID representing the same user as the relevant provisional user ID and corresponding to "http://matching-b.com" on the condition that the provisional user IDs have been transmitted to all the condition matching devices 12a, 12b, 12c.

In response to this request, the provisional user ID supplying unit 82 in the processing execution device 14a determines, for the user indicated by the designated provisional user ID, whether provisional user IDs have been transmitted to all the condition matching devices 12a, 12b, 12c indicated by "http://matching-a.com", "http://matching-b.com", and "http://matching-c.com". Then, in the case where the provisional user IDs have been transmitted to all of the condition matching devices 12a, 12b, 12c, the provisional user ID supplying unit 82 transmits the provisional user ID that represents the same user as the relevant provisional user ID and that corresponds to "http://matching-b.com", to the provisional user ID selecting unit 72. If any one of the provisional user IDs corresponding respectively to the network addresses has not been issued yet, the provisional user ID supplying unit 82 notifies the provisional user ID selecting unit 72 to that effect.

In this case, the provisional user ID selecting unit 72 and the provisional user ID supplying unit 82 in the processing execution device 14a repeat the request and response for each of "USER-A-001@IDP-X", "USER-A-002@IDP-X", and "USER-A-004@IDP-X".

As to the provisional user IDs including "@IDP-Y", the provisional user ID selecting unit 72 makes a request similar to that in step S67 to the provisional user ID supplying unit 82 in the processing execution device 14b. That is, the provisional user ID selecting unit 72 transmits the provisional user IDs including "@IDP-Y", i.e. "USER-A-006@IDP-Y" and "USER-A-007@IDP-Y", to the provisional user ID supplying unit 82 in the processing execution device 14b corresponding to "@IDP-Y", together with the network address list "http://matching-a.com", "http://matching-b.com", and "http://matching-c.com", and the network address "http://matching-b.com" of the condition matching device 12b which is made to perform the condition matching next (step S69). By transmitting these pieces of information in step S69, the provisional user ID selecting unit 72 causes the provisional user ID supplying unit 82 in the processing execution device 14*b* to specify, from among "USER-A-006@IDP-Y" and "USER-A-007@IDP-Y", the provisional user ID of any user for whom provisional user IDs have been transmitted to all the condition matching devices 12*a*, 12*b*, 12*c* indicated by the network address list "http://matching-a.com", "http://matching-b.com", and "http://matching-c.com". Further, the provisional user ID selecting unit 72 requests, from the provisional user ID supplying unit 82 in the processing execution device 14*b*, a list of the provisional user IDs which are the provisional user IDs representing the same users as the specified provisional user IDs and which correspond to the network address "http://matching-b.com" of the condition matching device 12*b* which is made to perform the condition matching next. For example, the provisional user ID selecting unit 72 may transmit an SQL requesting the list of such provisional user IDs to the provisional user ID supplying unit 82 in the processing execution device 14*b*, as in step S67.

The provisional user ID supplying unit 82 in the processing execution device 14*b* specifies, from among the designated provisional user IDs "USER-A-006@IDP-Y" and "USER-A-007@IDP-Y", the provisional user ID of any user for whom provisional user IDs have been transmitted to all the condition matching devices 12*a*, 12*b*, 12*c* indicated by the designated network address list "http://matching-a.com", "http://matching-b.com", and "http://matching-c.com", on the basis of the database stored in the provisional user ID supplying unit 82 itself (see FIG. 14). In the present example, for both of "USER-A-006@IDP-Y" and "USER-A-007@IDP-Y", the provisional user IDs have been transmitted to all the condition matching devices 12*a*, 12*b*, 12*c*, as shown in FIG. 14, and therefore, both of "USER-A-006@IDP-Y" and "USER-A-007@IDP-Y" are specified. The provisional user ID supplying unit 82 then specifies the provisional user IDs "USER-B-006@IDP-Y" and "USER-B-007@IDP-Y", representing the same users as "USER-A-006@IDP-Y" and "USER-A-007@IDP-Y" and corresponding to "http://matching-b.com", and transmits the specified IDs to the provisional user ID selecting unit 72 (step S70). The provisional user ID selecting unit 72 receives this provisional user ID list of "USER-B-006@IDP-Y" and "USER-B-007@IDP-Y" as a response to the request in step S69.

It is noted that the provisional user ID selecting unit 72 and the provisional user ID supplying unit 82 in the processing execution device 14*b* may repeat the request and response for each of "USER-A-006@IDP-Y" and "USER-A-007@IDP-Y", as in the case described above as another example of the processing in steps S67 and S68.

Further, in the present exemplary embodiment, it is assumed that the provisional user ID selecting unit 72 stores in advance the network addresses of the provisional user ID supplying units 82 in the processing execution devices 14*a*, 14*b*. In steps S67 and S69, the provisional user ID selecting unit 72 may transmit the pieces of information by using those network addresses as the destinations.

Further, the provisional user ID domain storing unit 73 may store the network address of the provisional user ID supplying unit 82 in the processing execution device 14*a* in association with "@IDP-X", and store the provisional user ID supplying unit 82 in the processing execution device 14*b* in association with "@IDP-Y". In this case, the provisional user ID selecting unit 72 may acquire the network address of the provisional user ID supplying unit 82 in the processing execution device 14*a* from the provisional user ID domain storing unit 73 prior to step S67, and perform the processing in step S67 by using that address as the destination. Similarly, the provisional user ID selecting unit 72 may acquire the network address of the provisional user ID supplying unit 82 in the processing execution device 14*b* from the provisional user ID domain storing unit 73 prior to step S69, and perform the processing in step S69 by using that address as the destination.

The provisional user ID selecting unit 72 transmits a list of the provisional user IDs "USER-B-001@IDP-X", "USER-B-004@IDP-X", "USER-B-006@IDP-Y", and "USER-B-007@IDP-Y" corresponding to the condition matching device 12*b*, which were obtained in steps S67, S68 and steps S69, S70, to the linked conditional matching unit 71 (step S71). The linked conditional matching unit 71 acquires this list of the provisional user IDs "USER-B-001@IDP-X", "USER-B-004@IDP-X", "USER-B-006@IDP-Y", and "USER-B-007@IDP-Y" from the provisional user ID selecting unit 72 as a response to the provisional user ID selection request (step S66).

The linked conditional matching unit 71 transmits the provisional user ID list "USER-B-001@IDP-X", "USER-B-004@IDP-X", "USER-B-006@IDP-Y", and "USER-B-007@IDP-Y" acquired from the provisional user ID selecting unit 72 and the linked conditional ID "123" received in step S57 from the linked conditional matching requesting device 1, to the condition matching execution unit 63 in the condition matching device 12*b*. By transmitting the provisional user ID list and the linked conditional ID in this manner, the linked conditional matching unit 71 requests the condition matching execution unit 63 to narrow down the users in the provisional user ID list so as to obtain a list of the users who meet the condition specified by the linked conditional ID (step S72).

Figure 9:
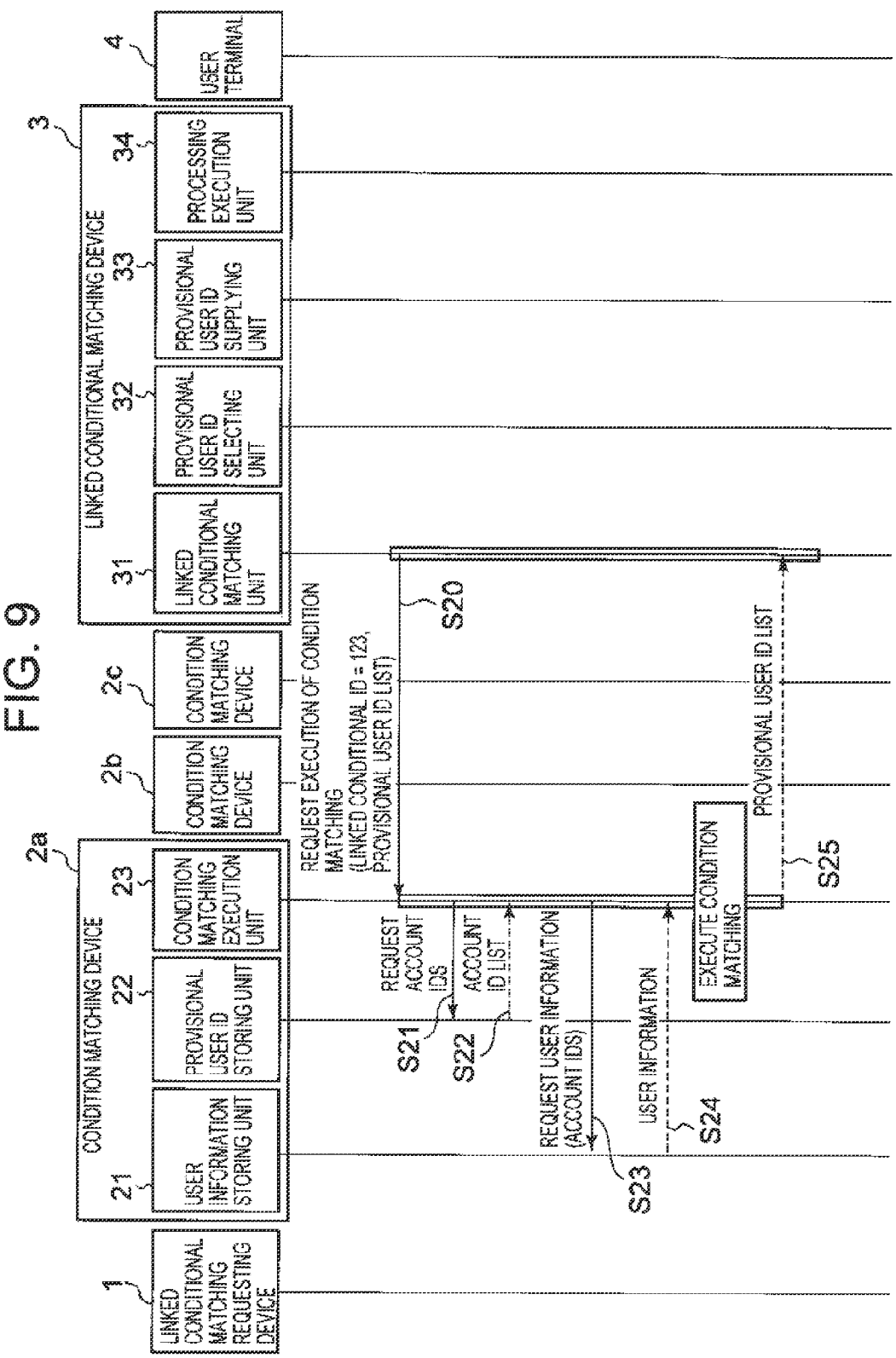
FIG. 9 is a diagram illustrating, by way of example, the progress of processing when the linked conditional matching device performs the linked conditional matching.
Figure 10:
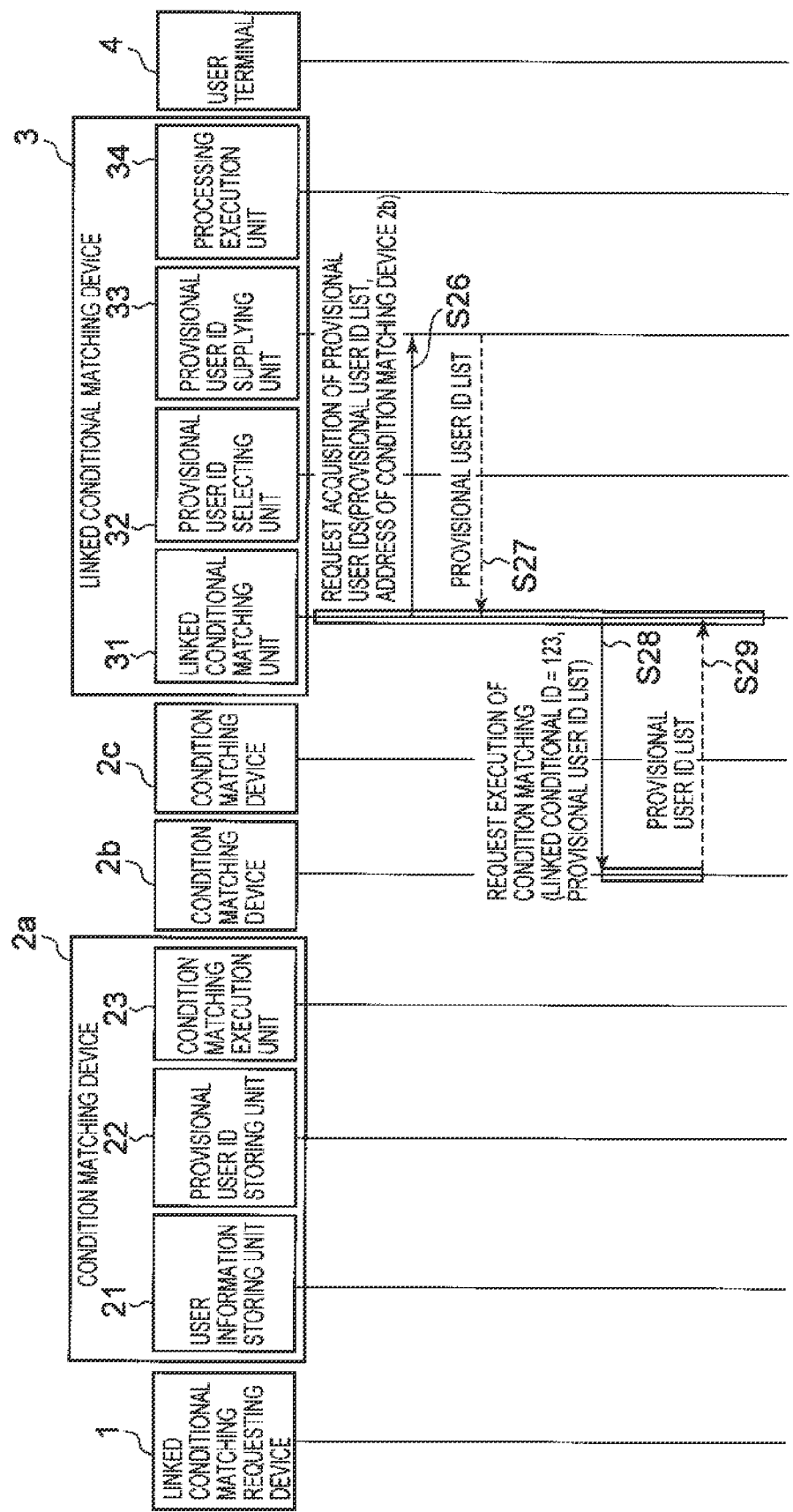
FIG. 10 is a diagram illustrating, by way of example, the progress of processing when the linked conditional matching device performs the linked conditional matching.
Figure 11:
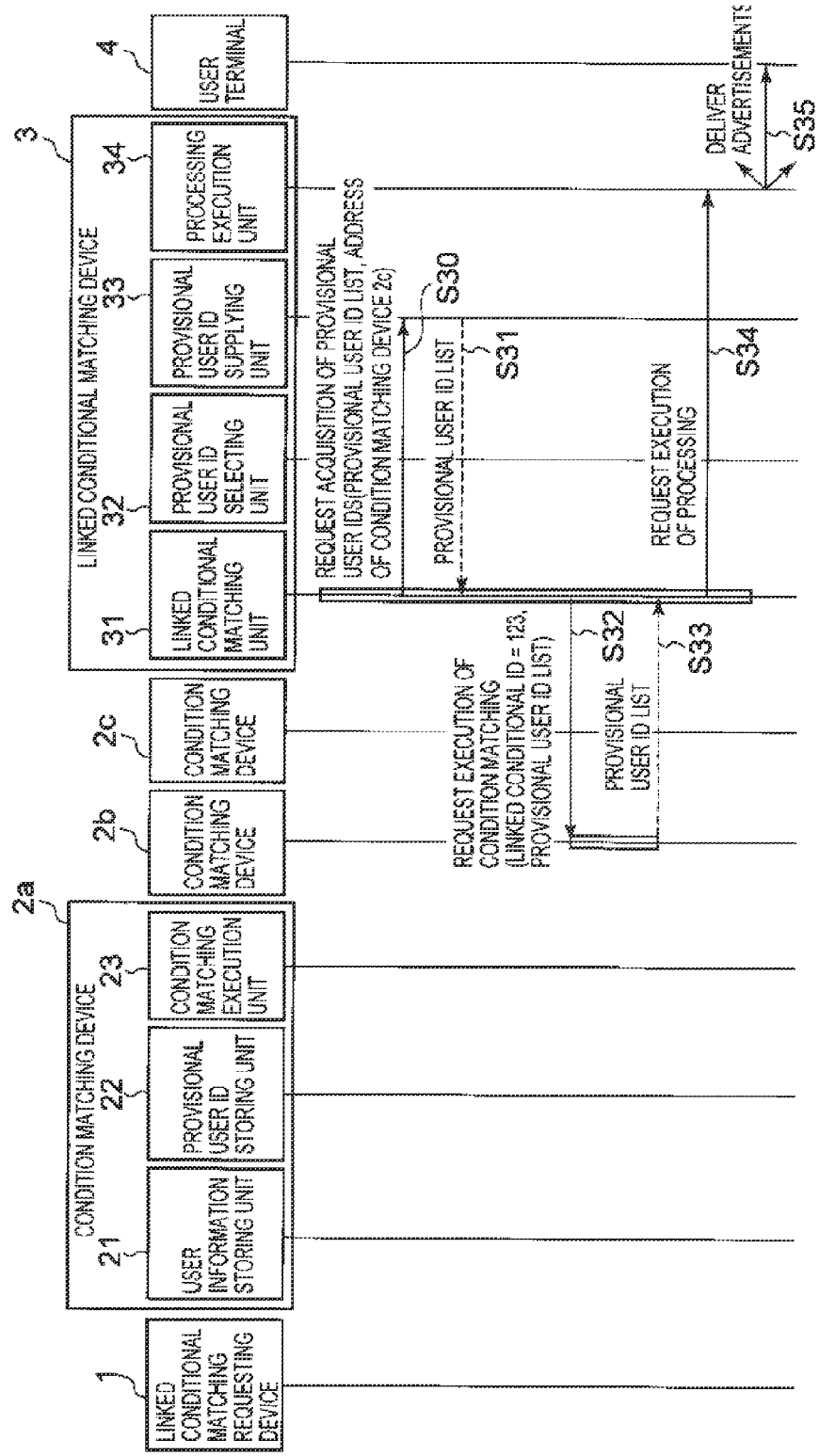
FIG. 11 is a diagram illustrating, by way of example, the progress of processing when the linked conditional matching device performs the linked conditional matching.

In the present exemplary embodiment, the operation of the condition matching device when receiving the provisional user ID list and the linked conditional ID is similar to the operation of each of the condition matching devices 2*a*, 2*b*, 2*c* when receiving the provisional user ID list and the linked conditional ID in the first exemplary embodiment (for example, steps S21 to S25 shown in FIG. 9).

That is, the condition matching execution unit 63 in the condition matching device 12*b* acquires the account ID list corresponding to the received provisional user ID list, from the provisional user ID storing unit 62 in the condition matching device 12*b*. In the present example, the provisional user ID storing unit 62 in the condition matching device 12*b* stores the information shown in FIG. 15(*b*). Therefore, the condition matching execution unit 63 obtains "hina", "ayano", "syou", and "sakura" as the account ID list from the provisional user ID storing unit 62.

Further, the condition matching execution unit 63 acquires the user information corresponding to those account IDs from the user information storing unit 21 in the condition matching device 12*b*. In the present example, the user information storing unit 21 in the condition matching device 12*b* stores the information shown in FIG. 2(*b*). Therefore, the condition matching execution unit 63 acquires "30" as the age group of "hina", "40" as the age group of "ayano", "30" as the age group of "syou", and "30" as the age group of "sakura" from the user information storing unit 21.

Then, the condition matching execution unit 63 in the condition matching device 12*b* specifies the account IDs matching the condition corresponding to the linked conditional ID "123" (the condition that "the user is in the age group of thirties"). This condition has been stored after it was received in step S55. In the present example, "hina", "syou", and "sakura" are in the age group of thirties, while "ayano" is in the age group of forties. Therefore, the condition matching execution unit 63 specifies "hina", "syou", and "sakura" as the account IDs matching the condition, and transmits a list of the provisional user IDs "USER-B-001@IDP-X", "USER- B-006@IDP-Y", and "USER-B-007@IDP-Y" corresponding thereto, to the linked conditional matching unit 71 in the linked conditional matching device 13 (step S73). As a result, the linked conditional matching unit 71 acquires the provisional user ID list "USER-B-001@IDP-X", "USER-B-006@IDP-Y", and "USER-B-007@IDP-Y" as a response to the request in step S72.

Next, the linked conditional matching unit 71 sorts the provisional user ID list acquired in step S73. Then, the linked conditional matching unit 71 transmits the provisional user ID "USER-B-001@IDP-X" including "@IDP-X" and the network address "http://matching-c.com" of the condition matching device 12c which is made to perform the condition matching next, to the provisional user ID supplying unit 82 in the processing execution device 14a corresponding to "@IDP-X", to thereby request the provisional user ID corresponding to "USER-B-001@IDP-X" and used in the condition matching device 12c (http://matching-c.com) (step S74).

In response to the request from the linked conditional matching unit 71, the provisional user ID supplying unit 82 in the processing execution device 14a extracts the provisional user ID "USER-C-001@IDP-X" corresponding to "USER-B-001@IDP-X" and used in the condition matching device 12c from the database (see FIG. 13), and transmits the extracted ID to the linked conditional matching unit 71 in the linked conditional matching device 13 (step S75). The linked conditional matching unit 71 receives this provisional user ID "USER-C-001@IDP-X".

Further, as to the provisional user IDs including "@IDP-Y", the linked conditional matching unit 71 makes a request similar to that in step S74 to the provisional user ID supplying unit 82 in the processing execution device 14b. That is, the linked conditional matching unit 71 transmits the provisional user IDs "USER-B-006@IDP-Y" and "USER-B-007@IDP-Y" including "@IDP-Y" and the network address "http://matching-c.com" of the condition matching device 12c which is made to perform the condition matching next, to the provisional user ID supplying unit 82 in the processing execution device 14b corresponding to "@IDP-Y", to thereby request the provisional user IDs corresponding to "USER-B-006@IDP-Y" and "USER-B-007@IDP-Y" and used in the condition matching device 12c (http://matching-c.com) (step S76).

In response to the request from the linked conditional matching unit 71, the provisional user ID supplying unit 82 in the processing execution device 14b extracts the provisional user IDs "USER-C-006@IDP-Y" and "USER-C-007@IDP-Y" corresponding to "USER-B-006@IDP-Y" and "USER-B-007@IDP-Y" and used in the condition matching device 12c from the database (see FIG. 14), and transmits the extracted IDs to the linked conditional matching unit 71 in the linked conditional matching device 13 (step S77). The linked conditional matching unit 71 receives these provisional user IDs "USER-C-006@IDP-Y" and "USER-C-007@IDP-Y".

The linked conditional matching unit 71 transmits a list of the provisional user IDs "USER-C-001@IDP-X", "USER-C-006@IDP-Y", and "USER-C-007@IDP-Y" received in steps S75 and S77, and the linked conditional ID "123" received from the linked conditional matching requesting device 1 in step S57, to the condition matching execution unit 63 in the condition matching device 12c. By transmitting the provisional user ID list and the linked conditional ID in this manner, the linked conditional matching unit 71 requests the condition matching execution unit 63 to narrow down the users in the provisional user ID list so as to obtain a list of the users who meet the condition specified by the linked conditional ID (step S78).

The operation of the condition matching device 12c that received the request in step S78 is similar to the operation of the condition matching device 12b that received the request in step S72. That is, the condition matching execution unit 63 in the condition matching device 12c acquires the account ID list corresponding to the received provisional user ID list, from the provisional user ID storing unit 62 in the condition matching device 12c. In the present example, the provisional user ID storing unit 62 in the condition matching device 12c stores the information shown in FIG. 15(c). Therefore, the condition matching execution unit 63 obtains "hina", "syou", and "sakura" as the account ID list from the provisional user ID storing unit 62.

Further, the condition matching execution unit 63 acquires the user information corresponding to the account IDs from the user information storing unit 21 in the condition matching device 12c. In the present example, the user information storing unit 21 in the condition matching device 12c stores the information shown in FIG. 2(c). Therefore, the condition matching execution unit 63 acquires "female" as the gender of "hina", "male" as the gender of "syou", and "female" as the gender of "sakura".

Then, the condition matching execution unit 63 in the condition matching device 12c specifies the account IDs that match the condition corresponding to the linked conditional ID "123" (the condition that "the user's gender is female"). This condition has been stored after it was received in step S56. In the present example, "hina" and "sakura" are female, while "syou" is male. Therefore, the condition matching execution unit 63 specifies "hina" and "sakura" as the account IDs matching the condition, and transmits a list of the provisional user IDs "USER-C-001@IDP-X" and "USER-C-007@IDP-Y" corresponding to those account IDs, to the linked conditional matching unit 71 in the linked conditional matching device 13 (step S79). As a result, the linked conditional matching unit 71 acquires the provisional user ID list "USER-C-001@IDP-X" and "USER-C-007@IDP-Y" as a response to the request in step S78.

The linked conditional matching unit 71 has requested the condition matching to each of the condition matching devices 12a, 12b, 12c indicated by the network address list received in step S57, and accordingly, the linked conditional matching unit 71 determines that there is no condition matching execution device to which it should request the condition matching next.

Next, the linked conditional matching unit 71 sorts the provisional user ID list acquired in step S79. Then, the linked conditional matching unit 71 transmits the provisional user ID "USER-C-001@IDP-X" including "@IDP-X" and the advertisement information to the processing execution unit 81 in the processing execution device 14a corresponding to "@IDP-X", and requests the processing execution unit 81 to deliver advertisements to the user terminal of the user specified by that provisional user ID (step S80). The advertisement information is the information received from the linked conditional matching requesting device 1 in step S57.

In response to the advertisement delivery request in step S80, the processing execution unit 81 in the processing execution device 14a delivers the advertisement information to the user terminal 4a of the user specified by "USER-B-001@IDP-X" (step S82).

In step S82, for example, the processing execution unit 81 requests, from the provisional user ID supplying unit 82, the single sign-on ID corresponding to the provisional user ID "USER-C-001@IDP-X" received in step S80, and acquires "USER-001" from the provisional user ID supplying unit 82. At this time, the provisional user ID supplying unit 82 may extract the requested single sign-on ID from the database (see FIG. 13), and return the ID to the processing execution unit 81. The processing execution unit 81 then transmits the advertisement information to the user terminal 4a of the user indicated by that single sign-on ID "USER-001".

As to the provisional user ID including "@IDP-Y", the linked conditional matching unit 71 makes a request similar to that in step S80 to the processing execution device 14b corresponding to "@IDP-Y". That is, the linked conditional matching unit 71 transmits the provisional user ID "USER-C-007@IDP-Y" including "@IDP-Y", among the provisional user IDs received in step S79, and the advertisement information to the processing execution unit 81 in the processing execution device 14b corresponding to "@IDP-Y", and requests the processing execution unit 81 to deliver advertisements to the user terminal of the user specified by that provisional user ID (step S81).

In response to the advertisement delivery request in step S81, the processing execution unit 81 in the processing execution device 14b delivers the advertisement information to the user terminal 4b of the user specified by "USER-C-007@IDP-Y" (step S83). The operation of the processing execution device 14b in step S83 is similar to the operation of the processing execution device 14a in step S82.

For example, the processing execution unit 81 in the processing execution device 14b requests, from the provisional user ID supplying unit 82, the single sign-on ID corresponding to the provisional user ID "USER-C-007@IDP-Y" received in step S81, and acquires "USER-007" from the provisional user ID supplying unit 82. At this time, the provisional user ID supplying unit 82 may extract the requested single sign-on ID from the database (see FIG. 14), and return the ID to the processing execution unit 81. The processing execution unit 81 then transmits the advertisement information to the user terminal 4b of the user indicated by that single sign-on ID "USER-007".

It is noted that the processing execution units 81 in the respective processing execution devices 14a, 14b may store in advance the single sign-on IDs and the mail addresses of the user terminals of the users indicated by the single sign-on IDs, for example, and transmit the advertisement information in the form of mail by using the mail addresses corresponding to the single sign-on IDs as the destinations. Alternatively, the processing execution units 81 may transmit the advertisement information in another manner.

Further, in the present exemplary embodiment, it is assumed that the linked conditional matching unit 71 stores in advance the network addresses of the processing execution units 81 in the processing execution devices 14a, 14b. In steps S80 and S81, the linked conditional matching unit 71 may make the processing execution requests by using those network addresses as the destinations.

Alternatively, the provisional user ID domain storing unit 73 may store the network address of the processing execution unit 81 in the processing execution device 14a in association with "@IDP-X", and store the network address of the processing execution unit 81 in the processing execution device 14b in association with "@IDP-Y". Then, the linked conditional matching unit 71 may acquire the network address of the processing execution unit 81 in the processing execution device 14a from the provisional user ID domain storing unit 73 prior to step S80, and perform the processing in step S80 by using that address as the destination. Similarly, the linked conditional matching unit 71 may acquire the network address of the processing execution unit 81 in the processing execution device 14b from the provisional user ID domain storing unit 73 prior to step S81, and perform the processing in step S81 by using that address as the destination.

In the exemplary embodiment described above, there were three condition matching devices. In the case of using four or more condition matching devices, the linked conditional matching device 13 may complete the processing similar to steps S74 to S79 on the fourth and other condition matching devices, and then perform the processing in step S80 and on.

Figure 19:
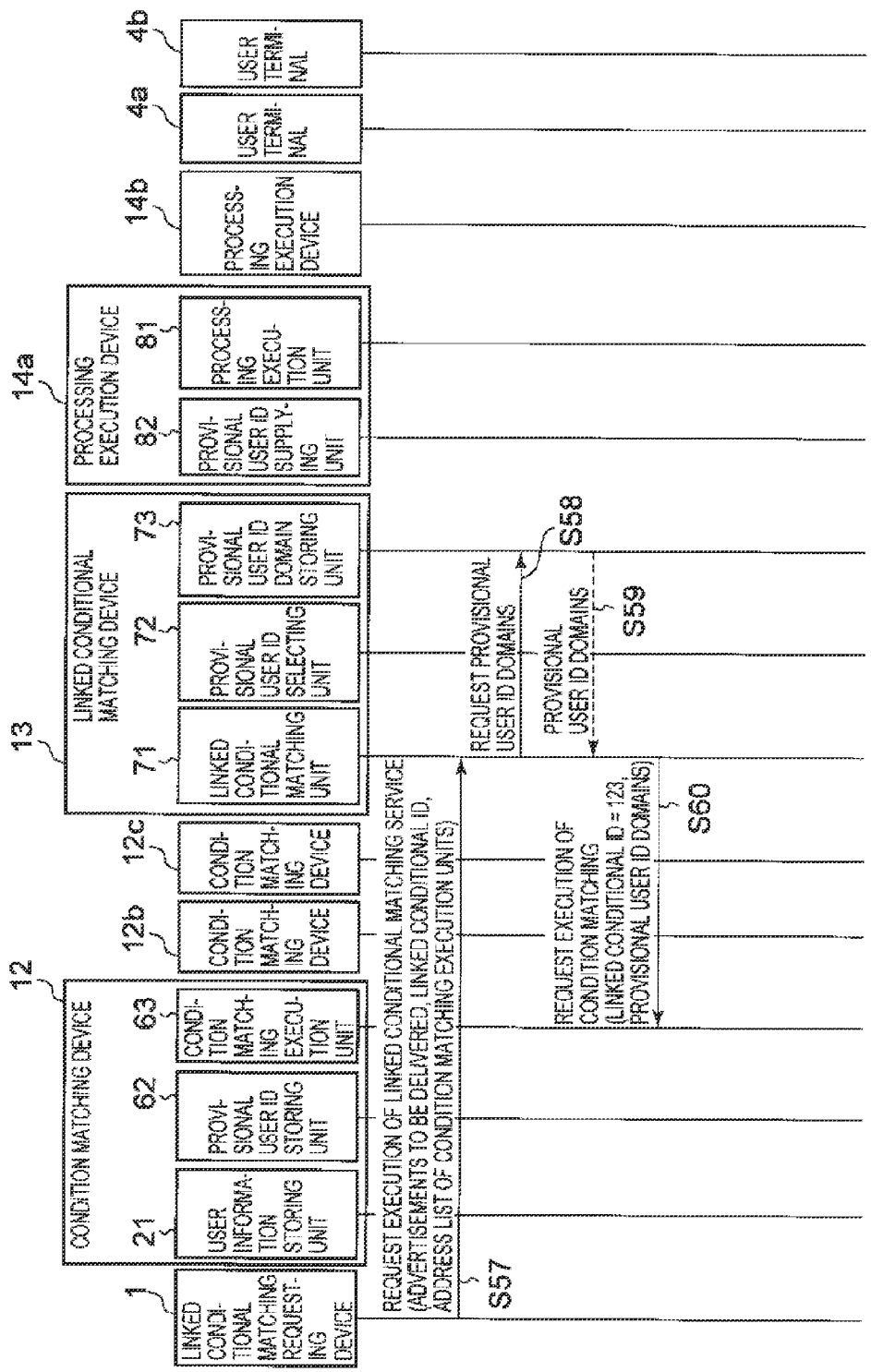
FIG. 19 is a diagram illustrating, by way of example, the progress of processing when the linked conditional matching device performs the linked conditional matching.
Figure 20:
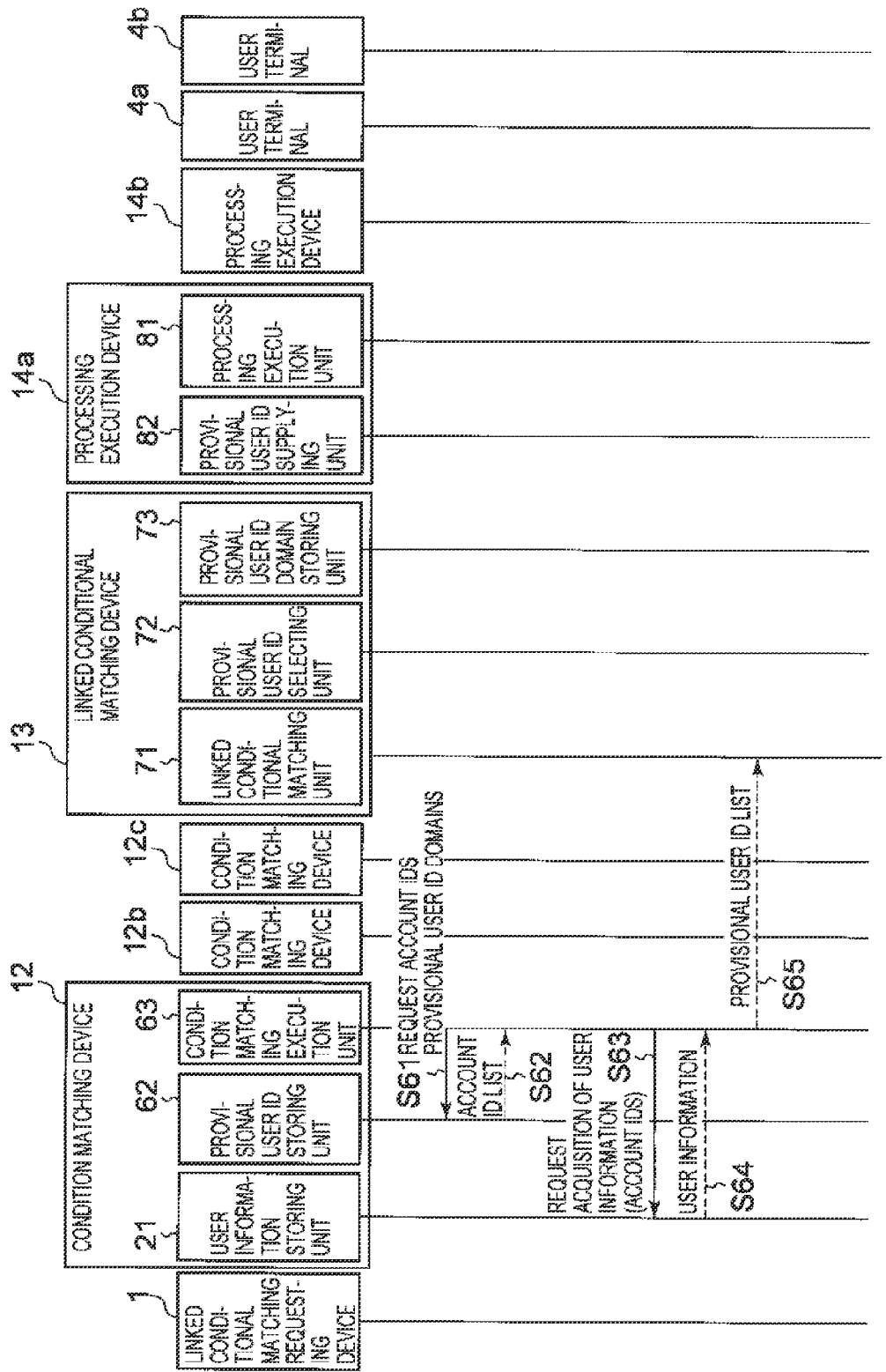
FIG. 20 is a diagram illustrating, by way of example, the progress of processing when the linked conditional matching device performs the linked conditional matching.
Figure 21:
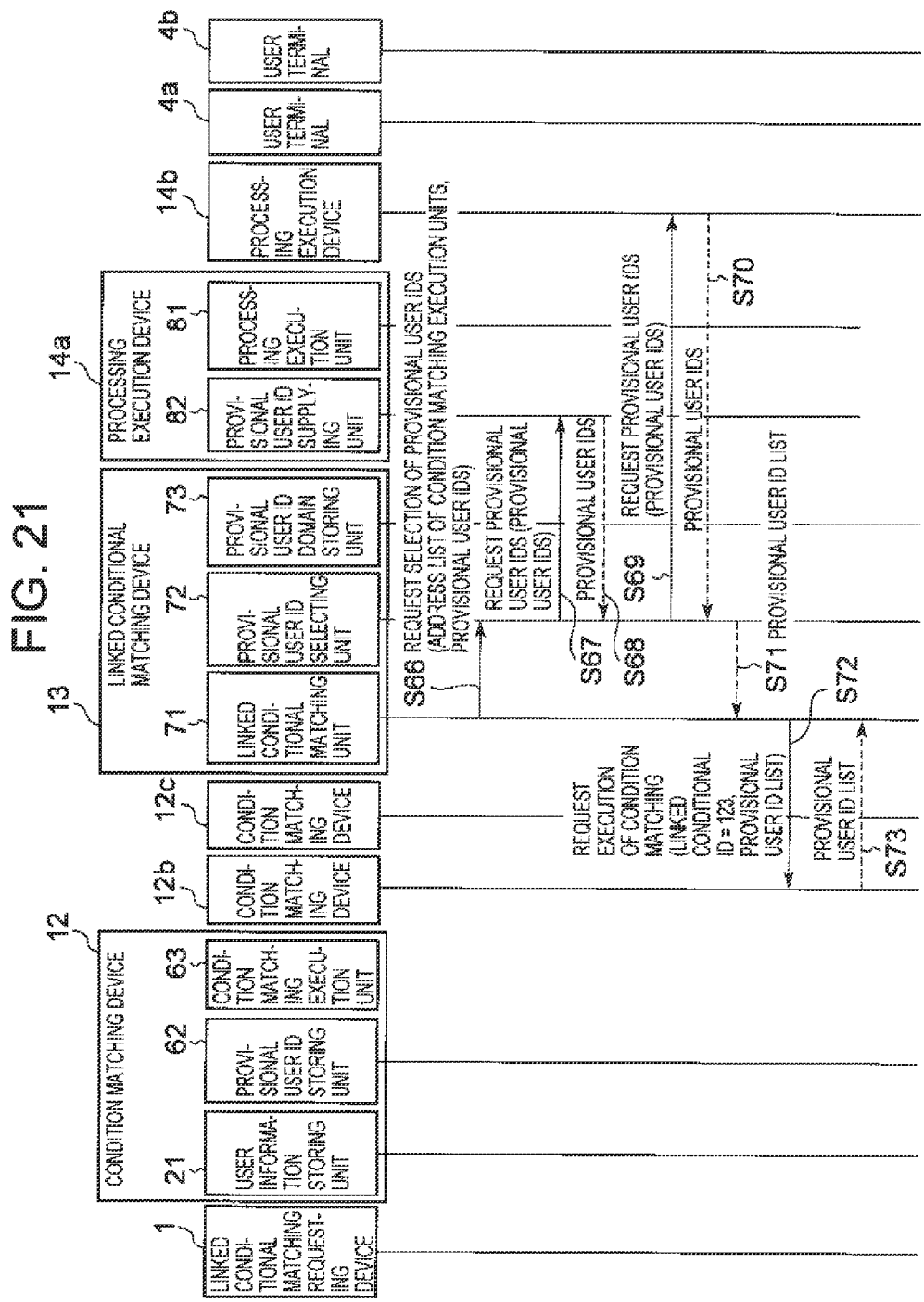
FIG. 21 is a diagram illustrating, by way of example, the progress of processing when the linked conditional matching device performs the linked conditional matching.
Figure 22:
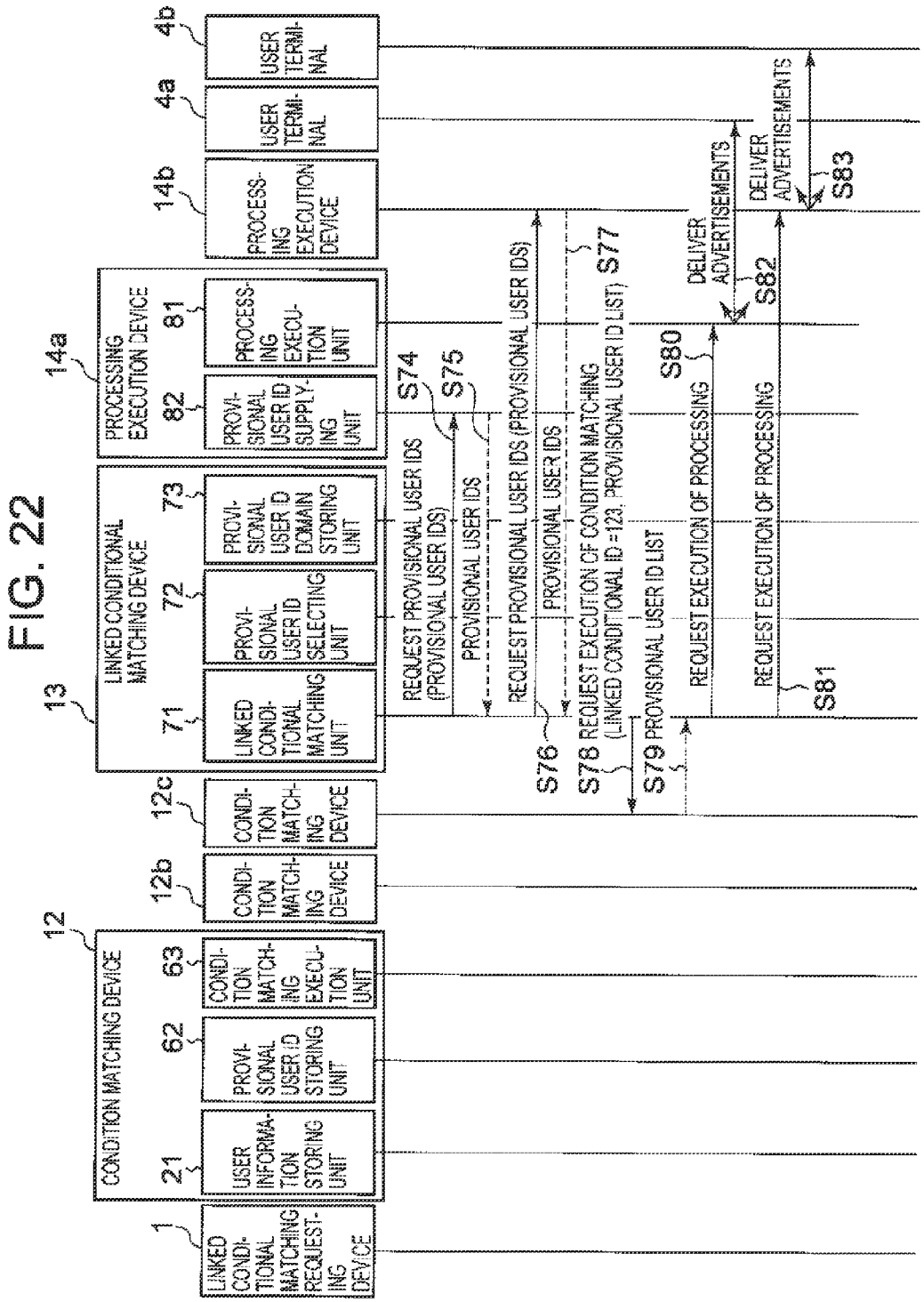
FIG. 22 is a diagram illustrating, by way of example, the progress of processing when the linked conditional matching device performs the linked conditional matching.

In the second exemplary embodiment, the linked conditional matching unit 71 transmits the provisional user ID domain(s) stored in the provisional user ID domain storing unit 73 to the condition matching device which is made to perform the condition matching first (see steps S58, S59, S60, and FIG. 19). Then, the condition matching device narrows down the provisional user IDs including the received provisional user ID domain(s) to the provisional user IDs corresponding to the user information matching a condition. Accordingly, even in the case where various communication carriers are managing processing execution devices, it is unnecessary to select the provisional user IDs of all the users who use the various communication carriers as the processing objects. Rather, the provisional user IDs of only the users who use the communication carrier(s) corresponding to the provisional user ID domain(s) that the administrator of the linked conditional matching device 13 has stored in the provisional user ID domain storing unit 73 are used as the processing objects for the linked conditional matching. As a result, the number of provisional user IDs of the users to be sequentially narrowed down can be restricted to a small number, so that it is possible to reduce the processing load on the linked conditional matching device 13 and each of the condition matching devices 12a to 12c. Further, the amount of information of the provisional user ID list can be restricted, which can reduce the network load on the Internet 5 as well.

After the provisional user IDs have been narrowed down in the first condition matching device, the provisional user ID selecting unit 72 selects the provisional user IDs of the users for whom provisional user IDs have been transmitted to all the condition matching devices 12a, 12b, 12c indicated by "http://matching-a.com", "http://matching-b.com", and "http://matching-c.com" (steps S67, S68, and steps S69, S70). Accordingly, as in the first exemplary embodiment, the processing load on the linked conditional matching device 13 and each of the condition matching devices 12a to 12c as well as the network load on the Internet 5 can be reduced.

Further, as in the first exemplary embodiment, each of the condition matching devices 12a to 12c does not need to transmit the user information to another device. This can suppress the risk of leakage of the user information. Further, it is unnecessary to encrypt the user information for transmitting the user information, which can reduce the processing load on the condition matching system.

Furthermore, the condition designator is able to cause the advertisement delivery processing or the like to be performed on the user terminals of the users who match the desired conditions, without the need to notify the administrator of the linked conditional matching device 13 and the communication carriers managing the processing execution devices 14a, 14b of the conditions that should be met by the user information.

In the case of determining a provisional user ID for each user in advance, it is preferable to prepare a different provisional user ID for each of the condition matching devices 12a, 12b, 12c. By doing so, it is possible to lower the risk of leakage of the user identity to a third party on the basis of the provisional user ID lists transmitted and received between the condition matching devices 12a, 12b, 12c, and the linked conditional matching device 13. However, a common provisional user ID for use in the condition matching devices 12a, 12b, 12c may be prepared for each user.

The description was made above of the case where the linked conditional matching unit 71 acquires the provisional user IDs selected by the provisional user ID selecting unit 72 and then causes each of the condition matching devices to sequentially narrow down the users. Alternatively, the linked conditional matching unit 71 may transmit the same group of provisional user IDs to a plurality of condition matching devices to cause the respective condition matching devices to narrow down the users. The example in this case is similar to the one described in the first exemplary embodiment, and thus, the description thereof will not be repeated.

In the second exemplary embodiment as well, it is unnecessary to use all the three types of user IDs, the account IDs, single sign-on IDs, and provisional user IDs, as long as the system is configured such that user IDs that can designate users between the linked conditional matching device 13 and each of the condition matching devices 12a, 12b, 12c (the user IDs that play a role similar to that of the above-described provisional user IDs) are used and that each of the condition matching devices 12a, 12b, 12c can specify the users whose user information matches the condition from among the users specified by those user IDs. Such an example will be described below as a modification of the second exemplary embodiment.

For example, it is unnecessary for each of the condition matching devices 12a, 12b, 12c to use the account IDs. In this case, each of the condition matching devices 12a, 12b, 12c may identify each user by the provisional user ID received from the provisional user ID supplying unit 82, and store that provisional user ID and the user information in association with each other. In this configuration, each of the condition matching devices 12a, 12b, 12c may include a storing unit (user information/provisional user ID storing unit) which stores the provisional user IDs and the user information in association with each other, instead of the user information storing unit 21 and the provisional user ID storing unit 62. Further, the user terminals 4a, 4b do not have to transmit the account IDs in steps S50, S52. The provisional user ID supplying unit 82 may transmit the provisional user IDs to the condition matching device in steps S51, S53. When the conditional matching device receives the provisional user IDs from the processing execution devices 14a, 14b, the condition matching device may store the user information of the users in association with those provisional user IDs in the user information/provisional user ID storing unit. The manner of storing the user information in association with the provisional user ID in the user information/provisional user ID storing unit is not particularly limited. In this configuration, the user information/provisional user ID storing unit stores the provisional user ID and the user information directly in association with each other. This enables the condition matching execution unit 63 to extract the user information of the user specified by the provisional user ID, from the user information/provisional user ID storing unit. Then, the condition matching execution unit 63 may compare the user information with the designated condition.

Figure 23:
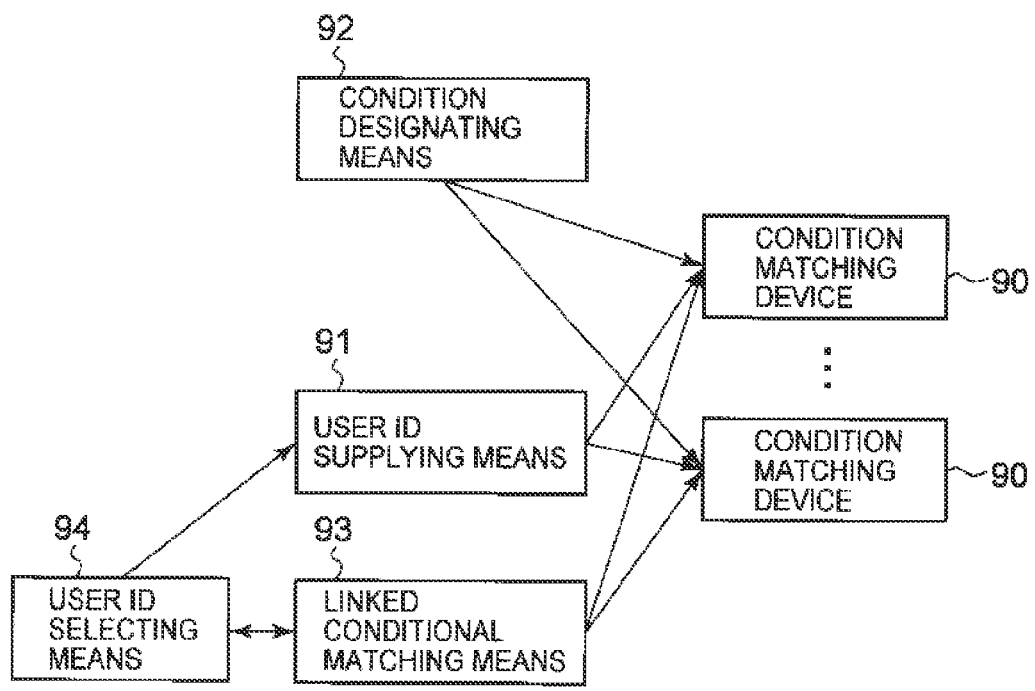
FIG. 23 is a block diagram showing, by way of example, the minimum configuration of the condition matching system according to the present invention.

A minimum configuration of the present invention will now be described. FIG. 23 is a block diagram showing, by way of example, the minimum configuration of the condition matching system of the present invention. The condition matching system of the present invention includes a plurality of condition matching devices 90, user ID supplying means 91, condition designating means 92, linked conditional matching means 93, and user ID selecting means 94.

Each of the condition matching devices 90 (for example, the condition matching devices 2a to 2c and the condition matching devices 12a to 12c in the exemplary embodiments) specifies any user whose user information matches a designated condition.

The user ID supplying means 91 (for example, the provisional user ID supplying unit 33, 73) is operable, in response to reception of condition matching device identification information for identifying a condition matching device (for example, the network address of a condition matching device) from a user terminal, to transmit a user ID (for example, provisional user ID) of a user who uses the user terminal to the condition matching device identified by the condition matching device identification information, and store user ID transmission status information (for example, the information shown by way of example in FIG. 5 or FIGS. 13, 14) indicating which user's user ID has been transmitted to which condition matching device.

The condition designating means 92 (for example, the linked conditional matching requesting device 1) transmits a plurality of conditions that have been determined for different categories of user information and that should be met by user information, respectively to the condition matching devices that store user information of the categories corresponding to the conditions.

The linked conditional matching means 93 (for example, the linked conditional matching unit 31, 71) repeats the processing of causing a condition matching device 90 that has received a condition from the condition designating means 92 to specify a user ID of any user whose user information matches the condition, to thereby specify the user ID of any user whose user information of the respective categories for which the conditions have been determined meets the corresponding conditions.

On the basis of the user ID transmission status information stored in the user ID supplying means 91, the user ID selecting means 94 (for example, the provisional user ID selecting unit 32, 72) selects the user ID of any user for whom user IDs have been transmitted respectively to the condition matching devices 90 that have received the conditions from the condition designating means 92.

Then, the linked conditional matching means 93 causes the user ID selecting means 94 to select the user IDs, and transmits a list of the selected user IDs to a condition matching device to cause the condition matching device to specify, from the list of the user IDs, the user ID of any user whose user information matches the condition transmitted to that condition matching device, and thereafter, sequentially transmits a list of the specified user IDs to another condition matching device to cause the condition matching device to specify, from the list of the user IDs, the user ID of any user whose user information matches the condition transmitted to that condition matching device.

With this configuration, it is possible to specify any user who matches a plurality of predetermined conditions, while suppressing the processing load and network load.

Figure 24:
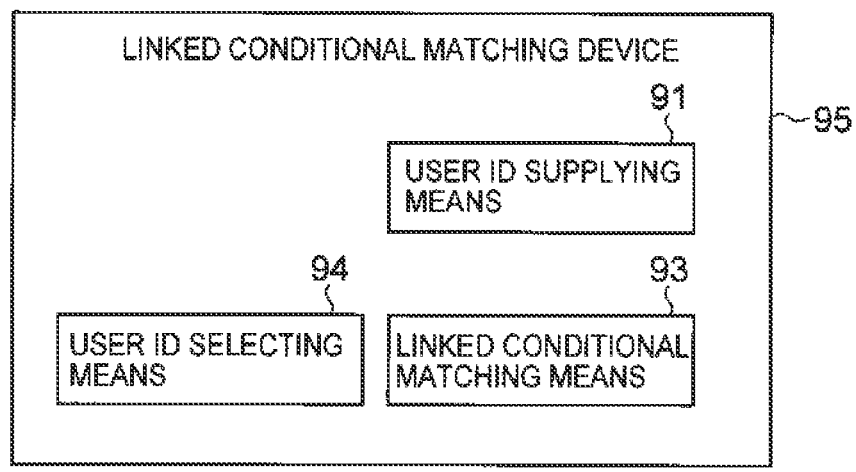
FIG. 24 is a block diagram showing an example of the minimum configuration of the linked conditional matching device according to the present invention.

FIG. 24 is a block diagram showing an example of the minimum configuration of the linked conditional matching device of the present invention. A linked conditional matching device 95 is connected with the above-described matching devices 90 and the condition designating means 92, which are not shown in FIG. 24. Further, the linked conditional matching device 95 includes user ID supplying means 91, linked conditional matching means 93, and user ID selecting means, which are the same as those described above.

Figure 25:
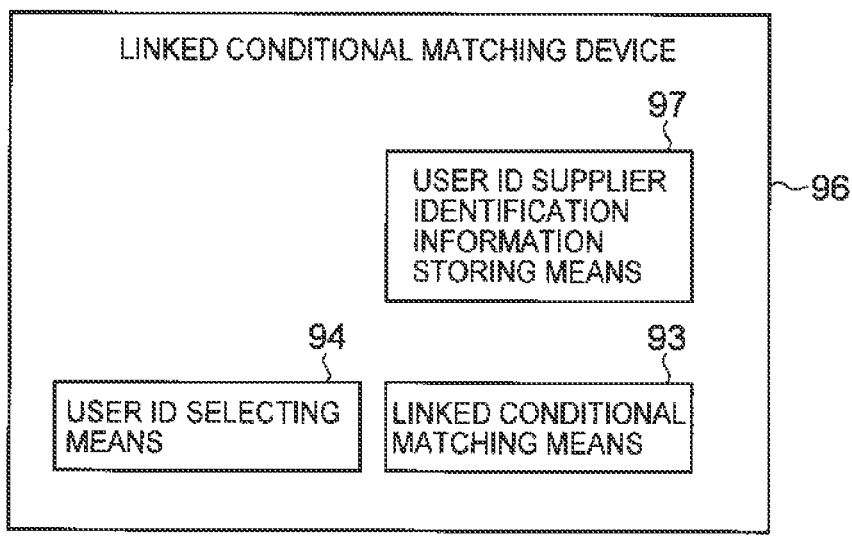
FIG. 25 is a block diagram showing another example of the minimum configuration of the linked conditional matching device according to the present invention.

FIG. 25 is a block diagram showing another example of the minimum configuration of the linked conditional matching device of the present invention. A linked conditional matching device 96 is connected with the above-described matching devices 90 and the condition designating means 92, which are not shown in FIG. 25. The linked conditional matching device 96 is also connected with user ID supplying means (not shown in FIG. 25). This user ID supplying means is operable, in response to reception of condition matching device identification information from a user terminal, to transmit a user ID and user ID supplier identification information (for example, provisional user ID domain) for identifying the user ID supplier the user terminal is using, to the condition matching device identified by the condition matching device identification information.

The linked conditional matching device 96 includes user ID supplier identification information storing means 97, linked conditional matching means 93, and user ID selecting means 94.

The user ID supplier identification information storing means 97 (the provisional user ID domain storing unit 73) stores predetermined user ID supplier identification information.

The linked conditional matching means (for example, the linked conditional matching unit 71) transmits the user ID supplier identification information stored in the user ID supplier identification information storing means 97 to one of the condition matching devices that have received the conditions from the condition designating means, to cause that condition matching device to specify, from among user IDs associated with that user ID supplier identification information, the user ID of any user whose user information matches the condition transmitted to that condition matching device. Further, the linked conditional matching means 93 causes the user ID selecting means 94 to select, from among those user IDs, the user ID of any user for whom user IDs have been transmitted to all the condition matching devices that have received the conditions from the condition designating means, and transmits a list of the selected user IDs to another condition matching device to cause that condition matching device to specify, from the list of the user IDs, the user ID of any user whose user information matches the condition transmitted to that condition matching device. Thereafter, the linked conditional matching means 93 sequentially transmits a list of the specified user IDs to another condition matching device to cause the condition matching device to specify, from the list of the user IDs, the user ID of any user whose user information matches the condition transmitted to that condition matching device.

Part or whole of the above-described exemplary embodiments may be described as in the following supplementary notes, although the description thereof is not limited thereto.

(Supplementary note 1) A condition matching system including a plurality of condition matching devices each specifying any user whose user information matches a designated condition, the system comprising: user ID supplying means operable, in response to reception of condition matching device identification information for identifying a condition matching device from a user terminal, to transmit a user ID of a user who uses the user terminal to the condition matching device identified by the condition matching device identification information, and store user ID transmission status information indicating which user's user ID has been transmitted to which condition matching device; condition designating means for transmitting a plurality of conditions that should be met by user information and that have been determined for different categories of user information, respectively to the condition matching devices which store user information of the categories corresponding to the conditions; linked conditional matching means for repeating processing of causing a respective condition matching device that has received a condition from the condition designating means to specify a user ID of any user whose user information matches the condition, to thereby specify the user ID of any user whose user information of the respective categories for which the conditions have been determined meets the corresponding conditions; and user ID selecting means for selecting a user ID of any user having his/her user IDs transmitted respectively to the condition matching devices that have received the conditions from the condition designating means, on the basis of the user ID transmission status information stored in the user ID supplying means; wherein the linked conditional matching means causes the user ID selecting means to select user IDs, and transmits a list of the selected user IDs to a condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

(Supplementary note 2) The condition matching system according to supplementary note 1, wherein the user ID supplying means is operable, in response to reception of the condition matching device identification information from a user terminal, to transmit the user ID and user ID supplier identification information for identifying a user ID supplier that the user terminal is using, to the condition matching device identified by the condition matching device identification information, the system comprises user ID supplier identification information storing means for storing predetermined user ID supplier identification information, and the linked conditional matching means transmits the user ID supplier identification information stored in the user ID supplier identification information storing means to one of the condition matching devices that have received the conditions from the condition designating means, to cause the condition matching device to specify, from among user IDs associated with the user ID supplier identification information, the user ID of any user whose user information matches the condition transmitted to the condition matching device, causes the user ID selecting means to select, from among the user IDs, the user ID of any user having his/her user IDs transmitted respectively to the condition matching devices that have received the conditions from the condition designating means, and transmits a list of the selected user IDs to another condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

(Supplementary note 3) The condition matching system according to supplementary note 1 or 2, wherein the user ID supplying means is provided for each user ID supplier, each user ID supplying means is operable, in response to reception of the condition matching device identification information from a user terminal, to transmit the user ID and user ID supplier identification information for identifying a user ID supplier corresponding to the user ID supplying means itself, to the condition matching device identified by the condition matching device identification information, the system comprises user ID supplier identification information storing means for storing predetermined user ID supplier identification information, and the linked conditional matching means transmits the user ID supplier identification information stored in the user ID supplier identification information storing means to one of the condition matching devices that have received the conditions from the condition designating means, to cause the condition matching device to specify, from among user IDs associated with the user ID supplier identification information, the user ID of any user whose user information matches the condition transmitted to the condition matching device, causes the user ID selecting means to select, from among the user IDs, the user ID of any user having his/her user IDs transmitted respectively to the condition matching devices that have received the conditions from the condition designating means, and transmits a list of the selected user IDs to another condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

(Supplementary note 4) The condition matching system according to any of supplementary notes 1 to 3, wherein the user ID supplying means is operable, in response to reception of the condition matching device identification information from a user terminal, to transmit a user ID that is a user ID of a user who uses the user terminal and that has been determined as a user ID corresponding to the condition matching device identification information, to the condition matching device identified by the condition matching device identification information.

(Supplementary note 5) The condition matching system according to any of supplementary notes 1 to 4, wherein the condition designating means assigns a common condition ID to a plurality of conditions determined for respective categories of user information, transmits the plurality of conditions, together with the condition ID, respectively to the condition matching devices which store the user information of the categories corresponding to the conditions, and transmits the condition ID to the linked conditional matching means, and when the linked conditional matching means causes the condition matching device to specify user IDs, the linked conditional matching means designates the condition by transmitting the condition ID.

(Supplementary note 6) The condition matching system according to any of supplementary notes 1 to 5, wherein the condition designating means transmits a list of the condition matching devices to which the condition designating means transmitted the conditions, to the linked conditional matching means.

(Supplementary note 7) A linked conditional matching device connected to a plurality of condition matching devices and condition designating means via a communication network, each condition matching device specifying any user whose user information matches a designated condition, the condition designating means transmitting a plurality of conditions that should be met by user information and that have been determined for different categories of user information, respectively to the condition matching devices which store user information of the categories corresponding to the conditions, the linked conditional matching device comprising: user ID supplying means operable, in response to reception of condition matching device identification information for identifying a condition matching device from a user terminal, to transmit a user ID of a user who uses the user terminal to the condition matching device identified by the condition matching device identification information, and store user ID transmission status information indicating which user's user ID has been transmitted to which condition matching device; linked conditional matching means for repeating processing of causing a respective condition matching device that has received a condition from the condition designating means to specify a user ID of any user whose user information matches the condition, to thereby specify the user ID of any user whose user information of the respective categories for which the conditions have been determined meets the corresponding conditions; and user ID selecting means for selecting a user ID of any user having his/her user IDs transmitted respectively to the condition matching devices that have received the conditions from the condition designating means, on the basis of the user ID transmission status information stored in the user ID supplying means; wherein the linked conditional matching means causes the user ID selecting means to select user IDs, and transmits a list of the selected user IDs to a condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

(Supplementary note 8) A linked conditional matching device connected to a plurality of condition matching devices, condition designating means, and user ID supplying means via a communication network, each condition matching device specifying any user whose user information matches a designated condition, the condition designating means transmitting a plurality of conditions that should be met by user information and that have been determined for different categories of user information, respectively to the condition matching devices which store user information of the categories corresponding to the conditions, the user ID supplying means being operable, in response to reception of condition matching device identification information for identifying a condition matching device from a user terminal, to transmit a user ID of a user who uses the user terminal and user ID supplier identification information for identifying a user ID supplier that the user terminal is using, to the condition matching device identified by the condition matching device identification information, and store user ID transmission status information indicating which user's user ID has been transmitted to which condition matching device, the linked conditional matching device comprising:

user ID supplier identification information storing means for storing predetermined user ID supplier identification information; linked conditional matching means for repeating processing of causing a respective condition matching device that has received a condition from the condition designating means to specify a user ID of any user whose user information matches the condition, to thereby specify the user ID of any user whose user information of the respective categories for which the conditions have been determined meets the corresponding conditions; and user ID selecting means for selecting a user ID of any user having his/her user IDs transmitted respectively to the condition matching devices that have received the conditions from the condition designating means, on the basis of the user ID transmission status information stored in the user ID supplying means; wherein the linked conditional matching means transmits the user ID supplier identification information stored in the user ID supplier identification information storing means to one of the condition matching devices that have received the conditions from the condition designating means, to cause the condition matching device to specify, from among user IDs associated with the user ID supplier identification information, the user ID of any user whose user information matches the condition transmitted to the condition matching device, causes the user ID selecting means to select, from among the user IDs, the user ID of any user having his/her user IDs transmitted respectively to the condition matching devices that have received the conditions from the condition designating means, and transmits a list of the selected user IDs to another condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

(Supplementary note 9) A condition matching method comprising: a step, performed by user ID supplying means, of, in response to reception of condition matching device identification information for identifying a condition matching device from a user terminal, transmitting a user ID of a user who uses the user terminal to the condition matching device identified by the condition matching device identification information, and storing user ID transmission status information indicating which user's user ID has been transmitted to which condition matching device; a step, performed by condition designating means, of transmitting a plurality of conditions that should be met by user information and that have been determined for different categories of user information, respectively to condition matching devices which store user information of the categories corresponding to the conditions; a step, performed by linked conditional matching means, of requesting user ID selecting means to select a user ID of any user having his/her user IDs transmitted respectively to the condition matching devices that have received the conditions from the condition designating means; a step, performed by the user ID selecting means, of selecting user IDs in response to a request from the linked conditional matching means; and a step, performed by the linked conditional matching means, of transmitting a list of the user IDs selected by the user ID selecting means to a condition matching device to cause the condition matching device to specify, from the list of the user IDs, the user ID of any user whose user information matches the condition transmitted to the condition matching device, and thereafter, sequentially transmitting a list of the specified user IDs to another condition matching device to cause the condition matching device to specify, from the list of the user IDs, the user ID of any user whose user information matches the condition transmitted to the condition matching device.

(Supplementary note 10) The condition matching method according to supplementary note 9, comprising a step, performed by user ID supplier identification information storing means, of storing predetermined user ID supplier identification information from among user ID supplier identification information for identifying user ID suppliers, wherein in response to reception of condition matching device identification information for identifying a condition matching device from a user terminal, the user ID supplying means transmits a user ID of a user who uses the user terminal and user ID supplier identification information for identifying a user ID supplier that the user terminal is using, to the condition matching device identified by the condition matching device identification information, the linked conditional matching means transmits the user ID supplier identification information stored in the user ID supplier identification information storing means to one of the condition matching devices which have received the conditions from the condition designating means, to cause the condition matching device to specify, from among user IDs associated with the user ID supplier identification information, the user ID of any user whose user information matches the condition transmitted to the condition matching device, and requests the user ID selecting means to select, from among the user IDs, the user ID of any user having his/her user IDs transmitted respectively to the condition matching devices that have received the conditions from the condition designating means, the user ID selecting means selects user IDs in response to a request from the linked conditional matching means, and the linked conditional matching means transmits a list of the user IDs selected by the user ID selecting means to another condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

(Supplementary note 11) A linked conditional matching program installed in a computer connected to a plurality of condition matching devices and condition designating means via a communication network, each condition matching device specifying any user whose user information matches a designated condition, the condition designating means transmitting a plurality of conditions that should be met by user information and that have been determined for different categories of user information, respectively to the condition matching devices which store user information of the categories corresponding to the conditions, the program causing the computer to perform: user ID supplying processing of, in response to reception of condition matching device identification information for identifying a condition matching device from a user terminal, transmitting a user ID of a user who uses the user terminal to the condition matching device identified by the condition matching device identification information, and storing user ID transmission status information indicating which user's user ID has been transmitted to which condition matching device; linked conditional matching processing of repeating processing of causing a respective condition matching device that has received a condition from the condition designating means to specify a user ID of any user whose user information matches the condition, to thereby specify the user ID of any user whose user information of the respective categories for which the conditions have been determined meets the corresponding conditions; and user ID selecting processing of selecting a user ID of any user having his/her user IDs transmitted respectively to the condition matching devices that have received the conditions from the condition designating means, on the basis of the user ID transmission status information stored in the user ID supplying processing; wherein in the linked conditional matching processing, the program causes the computer to perform the user ID selecting processing, to perform processing of transmitting a list of the user IDs selected in the user ID selecting processing to a condition matching device to cause the condition matching device to specify, from the list of the user IDs, the user ID of any user whose user information matches the condition transmitted to the condition matching device, and thereafter, to perform processing of sequentially transmitting a list of the specified user IDs to another condition matching device to cause the condition matching device to specify, from the list of the user IDs, the user ID of any user whose user information matches the condition transmitted to the condition matching device.

(Supplementary note 12) A linked conditional matching program installed in a computer connected to a plurality of condition matching devices, condition designating means, and user ID supplying means via a communication network, each condition matching device specifying any user whose user information matches a designated condition, the condition designating means transmitting a plurality of conditions that should be met by user information and that have been determined for different categories of user information, respectively to the condition matching devices which store user information of the categories corresponding to the conditions, the user ID supplying means being operable, in response to reception of condition matching device identification information for identifying a condition matching device from a user terminal, to transmit a user ID of a user who uses the user terminal and user ID supplier identification information for identifying a user ID supplier that the user terminal is using, to the condition matching device identified by the condition matching device identification information, and store user ID transmission status information indicating which user's user ID has been transmitted to which condition matching device, the computer including user ID supplier identification information storing means for storing predetermined user ID supplier identification information, the program causing the computer to perform: linked conditional matching processing of repeating processing of causing a respective condition matching device that has received a condition from the condition designating means to specify a user ID of any user whose user information matches the condition, to thereby specify the user ID of any user whose user information of the respective categories for which the conditions have been determined meets the corresponding conditions; and user ID selecting processing of selecting a user ID of any user having his/her user IDs transmitted respectively to the condition matching devices that have received the conditions from the condition designating means, on the basis of the user ID transmission status information stored in the user ID supplying means; wherein in the linked conditional matching processing, the program causes the computer to perform processing of transmitting the user ID supplier identification information stored in the user ID supplier identification information storing means to one of the condition matching devices that have received the conditions from the condition designating means, to cause the condition matching device to specify, from among user IDs associated with the user ID supplier identification information, the user ID of any user whose user information matches the condition transmitted to the condition matching device, to perform the user ID selecting processing, and to perform processing of transmitting a list of the user IDs selected in the user ID selecting processing to another condition matching device to cause the condition matching device to specify, from the list of the user IDs, the user ID of any user whose user information matches the condition transmitted to the condition matching device, and thereafter, to perform processing of sequentially transmitting a list of the specified user IDs to another condition matching device to cause the condition matching device to specify, from the list of the user IDs, the user ID of any user whose user information matches the condition transmitted to the condition matching device.

(Supplementary note 13) A condition matching system including a plurality of condition matching devices each specifying any user whose user information matches a designated condition, the system comprising: a user ID supplying unit operable, in response to reception of condition matching device identification information for identifying a condition matching device from a user terminal, to transmit a user ID of a user who uses the user terminal to the condition matching device identified by the condition matching device identification information, and store user ID transmission status information indicating which user's user ID has been transmitted to which condition matching device; a condition designating unit operable to transmit a plurality of conditions that should be met by user information and that have been determined for different categories of user information, respectively to the condition matching devices which store user information of the categories corresponding to the conditions; a linked conditional matching unit operable to repeat processing of causing a respective condition matching device that has received a condition from the condition designating unit to specify a user ID of any user whose user information matches the condition, to thereby specify the user ID of any user whose user information of the respective categories for which the conditions have been determined meets the corresponding conditions; and a user ID selecting unit operable to select a user ID of any user having his/her user IDs transmitted respectively to the condition matching devices that have received the conditions from the condition designating unit, on the basis of the user ID transmission status information stored in the user ID supplying unit; wherein the linked conditional matching unit causes the user ID selecting unit to select user IDs, and transmits a list of the selected user IDs to a condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

(Supplementary note 14) The condition matching system according to supplementary note 13, wherein the user ID supplying unit is operable, in response to reception of the condition matching device identification information from a user terminal, to transmit the user ID and user ID supplier identification information for identifying a user ID supplier that the user terminal is using, to the condition matching device identified by the condition matching device identification information, the system comprises a user ID supplier identification information storing unit for storing predetermined user ID supplier identification information, and the linked conditional matching unit transmits the user ID supplier identification information stored in the user ID supplier identification information storing unit to one of the condition matching devices that have received the conditions from the condition designating unit, to cause the condition matching device to specify, from among user IDs associated with the user ID supplier identification information, the user ID of any user whose user information matches the condition transmitted to the condition matching device, causes the user ID selecting unit to select, from among the user IDs, the user ID of any user having his/her user IDs transmitted respectively to the condition matching devices that have received the conditions from the condition designating unit, and transmits a list of the selected user IDs to another condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

(Supplementary note 15) The condition matching system according to supplementary note 13 or 14, wherein the user ID supplying unit is provided for each user ID supplier, each user ID supplying unit is operable, in response to reception of the condition matching device identification information from a user terminal, to transmit the user ID and user ID supplier identification information for identifying a user ID supplier corresponding to the user ID supplying unit itself, to the condition matching device identified by the condition matching device identification information, the system comprises a user ID supplier identification information storing unit for storing predetermined user ID supplier identification information, and the linked conditional matching unit transmits the user ID supplier identification information stored in the user ID supplier identification information storing unit to one of the condition matching devices that have received the conditions from the condition designating unit, to cause the condition matching device to specify, from among user IDs associated with the user ID supplier identification information, the user ID of any user whose user information matches the condition transmitted to the condition matching device, causes the user ID selecting unit to select, from among the user IDs, the user ID of any user having his/her user IDs transmitted respectively to the condition matching devices that have received the conditions from the condition designating unit, and transmits a list of the selected user IDs to another condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

(Supplementary note 16) The condition matching system according to any of supplementary notes 13 to 15, wherein the user ID supplying unit is operable, in response to reception of the condition matching device identification information from a user terminal, to transmit a user ID that is a user ID of a user who uses the user terminal and that has been determined as a user ID corresponding to the condition matching device identification information, to the condition matching device identified by the condition matching device identification information.

(Supplementary note 17) A linked conditional matching device connected to a plurality of condition matching devices and a condition designating unit via a communication network, each condition matching device specifying any user whose user information matches a designated condition, the condition designating unit transmitting a plurality of conditions that should be met by user information and that have been determined for different categories of user information, respectively to the condition matching devices which store user information of the categories corresponding to the conditions, the linked conditional matching device comprising: a user ID supplying unit operable, in response to reception of condition matching device identification information for identifying a condition matching device from a user terminal, to transmit a user ID of a user who uses the user terminal to the condition matching device identified by the condition matching device identification information, and store user ID transmission status information indicating which user's user ID has been transmitted to which condition matching device; a linked conditional matching unit operable to repeat processing of causing a respective condition matching device that has received a condition from the condition designating unit to specify a user ID of any user whose user information matches the condition, to thereby specify the user ID of any user whose user information of the respective categories for which the conditions have been determined meets the corresponding conditions; and a user ID selecting unit operable to select a user ID of any user having his/her user IDs transmitted respectively to the condition matching devices that have received the conditions from the condition designating unit, on the basis of the user ID transmission status information stored in the user ID supplying unit; wherein the linked conditional matching unit causes the user ID selecting unit to select user IDs, and transmits a list of the selected user IDs to a condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

(Supplementary note 18) A linked conditional matching device connected to a plurality of condition matching devices, a condition designating unit, and a user ID supplying unit via a communication network, each condition matching device specifying any user whose user information matches a designated condition, the condition designating unit transmitting a plurality of conditions that should be met by user information and that have been determined for different categories of user information, respectively to the condition matching devices which store user information of the categories corresponding to the conditions, the user ID supplying unit being operable, in response to reception of condition matching device identification information for identifying a condition matching device from a user terminal, to transmit a user ID of a user who uses the user terminal and user ID supplier identification information for identifying a user ID supplier that the user terminal is using, to the condition matching device identified by the condition matching device identification information, and store user ID transmission status information indicating which user's user ID has been transmitted to which condition matching device, the linked conditional matching device comprising: a user ID supplier identification information storing unit for storing predetermined user ID supplier identification information; a linked conditional matching unit operable to repeat processing of causing a respective condition matching device that has received a condition from the condition designating unit to specify a user ID of any user whose user information matches the condition, to thereby specify the user ID of any user whose user information of the respective categories for which the conditions have been determined meets the corresponding conditions; and a user ID selecting unit operable to select a user ID of any user having his/her user IDs transmitted respectively to the condition matching devices that have received the conditions from the condition designating unit, on the basis of the user ID transmission status information stored in the user ID supplying unit; wherein the linked conditional matching unit transmits the user ID supplier identification information stored in the user ID supplier identification information storing unit to one of the condition matching devices that have received the conditions from the condition designating unit, to cause the condition matching device to specify, from among user IDs associated with the user ID supplier identification information, the user ID of any user whose user information matches the condition transmitted to the condition matching device, causes the user ID selecting unit to select, from among the user IDs, the user ID of any user having his/her user IDs transmitted respectively to the condition matching devices that have received the conditions from the condition designating unit, and transmits a list of the selected user IDs to another condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

This application claims the priority of Japanese Patent Application No. 2010-188543 filed on Aug. 25, 2010, the entire content of which is herein incorporated by reference.

While the invention of this application has been described above with reference to the exemplary embodiments, the invention of this application is not limited to the above exemplary embodiments. Various modifications understandable by those skilled in the art can be made to the configuration and details of the invention of this application within the scope of the invention of this application.

INDUSTRIAL APPLICABILITY

The present invention is suitably applicable to the condition matching system that specifies users who match predetermined conditions.

REFERENCE SIGNS LIST 1 linked conditional matching requesting device
2a, 2b, 2c, 12a, 12b, 12c condition matching device
3, 13 linked conditional matching device
4, 4a, 4b user terminal
21 user information storing unit
22, 62 provisional user ID storing unit
23, 63 condition matching execution unit
31, 71 linked conditional matching unit
32, 72 provisional user ID selecting unit
33, 82 provisional user ID supplying unit
34, 81 processing execution unit
73 provisional user ID domain storing unit

The invention claimed is:

1. A condition matching system including a plurality of condition matching devices each specifying any user whose user information matches a designated condition, the system comprising:
 an user ID supplying unit operable, in response to reception of condition matching device identification information for identifying a condition matching device from a user terminal, to transmit a user ID of a user who uses the user terminal to the condition matching device identified by the condition matching device identification information, and store user ID transmission status information indicating which user's user ID has been transmitted to which condition matching device;
 a condition designating unit for transmitting a plurality of conditions that should be met by user information and that have been determined for different categories of user information, respectively to the condition matching devices which store user information of the categories corresponding to the conditions;
 a linked conditional matching unit for repeating processing of causing a respective condition matching device that has received a condition from the condition designating unit to specify a user ID of any user whose user information matches the condition, to thereby specify the user ID of any user whose user information of the respective categories for which the conditions have been determined meets the corresponding conditions; and
 an user ID selecting unit for selecting a user ID of any user having his/her user IDs transmitted respectively to the condition matching devices that have received the conditions from the condition designating unit, on the basis of the user ID transmission status information stored in the user ID supplying unit;
 wherein the linked conditional matching unit causes the user ID selecting unit to select user IDs, and transmits a list of the selected user IDs to a condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

2. The condition matching system according to claim 1, wherein
 the user ID supplying unit is operable, in response to reception of the condition matching device identification information from a user terminal, to transmit the user ID and user ID supplier identification information for identifying a user ID supplier that the user terminal is using, to the condition matching device identified by the condition matching device identification information, the system comprises an user ID supplier identification information storing unit for storing predetermined user ID supplier identification information, and the linked conditional matching unit transmits the user ID supplier identification information stored in the user ID supplier identification information storing unit to one of the condition matching devices that have received the conditions from the condition designating unit, to cause the condition matching device to specify, from among user IDs associated with the user ID supplier identification information, the user ID of any user whose user information matches the condition transmitted to the condition matching device, causes the user ID selecting unit to select, from among the user IDs, the user ID of any user having his/her user IDs transmitted respectively to the condition matching devices that have received the conditions from the condition designating unit, and transmits a list of the selected user IDs to another condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

3. The condition matching system according to claim 1, wherein the user ID supplying unit is provided for each user ID supplier, each user ID supplying unit is operable, in response to reception of the condition matching device identification information from a user terminal, to transmit the user ID and user ID supplier identification information for identifying a user ID supplier corresponding to the user ID supplying unit itself, to the condition matching device identified by the condition matching device identification information, the system comprises an user ID supplier identification information storing unit for storing predetermined user ID supplier identification information, and the linked conditional matching unit transmits the user ID supplier identification information stored in the user ID supplier identification information storing unit to one of the condition matching devices that have received the conditions from the condition designating unit, to cause the condition matching device to specify, from among user IDs associated with the user ID supplier identification information, the user ID of any user whose user information matches the condition transmitted to the condition matching device, causes the user ID selecting unit to select, from among the user IDs, the user ID of any user having his/her user IDs transmitted respectively to the condition matching devices that have received the conditions from the condition designating unit, and transmits a list of the selected user IDs to another condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

4. The condition matching system according to claim 1, wherein the user ID supplying unit is operable, in response to reception of the condition matching device identification information from a user terminal, to transmit a user ID that is a user ID of a user who uses the user terminal and that has been determined as a user ID corresponding to the condition matching device identification information, to the condition matching device identified by the condition matching device identification information.

5. A linked conditional matching device connected to a plurality of condition matching devices and a condition designating unit via a communication network, each condition matching device specifying any user whose user information matches a designated condition, the condition designating unit transmitting a plurality of conditions that should be met by user information and that have been determined for different categories of user information, respectively to the condition matching devices which store user information of the categories corresponding to the conditions, the linked conditional matching device comprising:

an user ID supplying unit operable, in response to reception of condition matching device identification information for identifying a condition matching device from a user terminal, to transmit a user ID of a user who uses the user terminal to the condition matching device identified by the condition matching device identification information, and store user ID transmission status information indicating which user's user ID has been transmitted to which condition matching device;

a linked conditional matching unit for repeating processing of causing a respective condition matching device that has received a condition from the condition designating unit to specify a user ID of any user whose user information matches the condition, to thereby specify the user ID of any user whose user information of the respective categories for which the conditions have been determined meets the corresponding conditions; and an user ID selecting unit for selecting a user ID of any user having his/her user IDs transmitted respectively to the condition matching devices that have received the conditions from the condition designating unit, on the basis of the user ID transmission status information stored in the user ID supplying unit;

wherein the linked conditional matching unit causes the user ID selecting unit to select user IDs, and transmits a list of the selected user IDs to a condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

6. A linked conditional matching device connected to a plurality of condition matching devices, a condition designating unit, and an user ID supplying unit via a communication network, each condition matching device specifying any user whose user information matches a designated condition, the condition designating unit transmitting a plurality of conditions that should be met by user information and that have been determined for different categories of user information, respectively to the condition matching devices which store user information of the categories corresponding to the conditions, the user ID supplying unit being operable, in response to reception of condition matching device identification information for identifying a condition matching device from a user terminal, to transmit a user ID of a user who uses the user terminal and user ID supplier identification information for identifying a user ID supplier that the user terminal is using, to the condition matching device identified by the condition matching device identification information, and store user ID transmission status information indicating which user's user ID has been transmitted to which condition matching device, the linked conditional matching device comprising:

an user ID supplier identification information storing unit for storing predetermined user ID supplier identification information;

a linked conditional matching unit for repeating processing of causing a respective condition matching device that has received a condition from the condition designating unit to specify a user ID of any user whose user information matches the condition, to thereby specify the user ID of any user whose user information of the respective categories for which the conditions have been determined meets the corresponding conditions; and an user ID selecting unit for selecting a user ID of any user having his/her user IDs transmitted respectively to the condition matching devices that have received the conditions from the condition designating unit, on the basis of the user ID transmission status information stored in the user ID supplying unit;

wherein the linked conditional matching unit transmits the user ID supplier identification information stored in the user ID supplier identification information storing unit to one of the condition matching devices that have received the conditions from the condition designating unit, to cause the condition matching device to specify, from among user IDs associated with the user ID supplier identification information, the user ID of any user whose user information matches the condition transmitted to the condition matching device, causes the user ID selecting unit to select, from among the user IDs, the user ID of any user having his/her user IDs transmitted respectively to the condition matching devices that have received the conditions from the condition designating unit, and transmits a list of the selected user IDs to another condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

7. A condition matching method comprising:

a step, performed by an user ID supplying unit, of, in response to reception of condition matching device identification information for identifying a condition matching device from a user terminal, transmitting a user ID of a user who uses the user terminal to the condition matching device identified by the condition matching device identification information, and storing user ID transmission status information indicating which user's user ID has been transmitted to which condition matching device;

a step, performed by a condition designating unit, of transmitting a plurality of conditions that should be met by user information and that have been determined for different categories of user information, respectively to condition matching devices which store user information of the categories corresponding to the conditions;

a step, performed by a linked conditional matching unit, of requesting an user ID selecting unit to select a user ID of any user having his/her user IDs transmitted respectively to the condition matching devices that have received the conditions from the condition designating unit;

a step, performed by the user ID selecting unit, of selecting user IDs in response to a request from the linked conditional matching unit; and a step, performed by the linked conditional matching unit, of transmitting a list of the user IDs selected by the user ID selecting unit to a condition matching device to cause the condition matching device to specify, from the list of the user IDs, the user ID of any user whose user information matches the condition transmitted to the condition matching device, and thereafter, sequentially transmitting a list of the specified user IDs to another condition matching device to cause the condition matching device to specify, from the list of the user IDs, the user ID of any user whose user information matches the condition transmitted to the condition matching device.

8. The condition matching method according to claim 7, comprising a step, performed by an user ID supplier identification information storing unit, of storing predetermined user ID supplier identification information from among user ID supplier identification information for identifying user ID suppliers, wherein in response to reception of condition matching device identification information for identifying a condition matching device from a user terminal, the user ID supplying unit transmits a user ID of a user who uses the user terminal and user ID supplier identification information for identifying a user ID supplier that the user terminal is using, to the condition matching device identified by the condition matching device identification information, the linked conditional matching unit transmits the user ID supplier identification information stored in the user ID supplier identification information storing unit to one of the condition matching devices which have received the conditions from the condition designating unit, to cause the condition matching device to specify, from among user IDs associated with the user ID supplier identification information, the user ID of any user whose user information matches the condition transmitted to the condition matching device, and requests the user ID selecting unit to select, from among the user IDs, the user ID of any user having his/her user IDs transmitted respectively to the condition matching devices that have received the conditions from the condition designating unit, the user ID selecting unit selects user IDs in response to a request from the linked conditional matching unit, and the linked conditional matching unit transmits a list of the user IDs selected by the user ID selecting unit to another condition matching device to cause the condition matching device to specify, from the list of the user IDs, the user ID of any user whose user information matches the condition transmitted to the condition matching device, and thereafter, sequentially transmits a list of the specified user IDs to another condition matching device to cause the condition matching device to specify, from the list of the user IDs, the user ID of any user whose user information matches the condition transmitted to the condition matching device.

9. A non-transitory computer readable information recording medium storing a linked conditional matching program installed in a computer connected to a plurality of condition matching devices and a condition designating unit via a communication network, each condition matching device specifying any user whose user information matches a designated condition, the condition designating unit transmitting a plurality of conditions that should be met by user information and that have been determined for different categories of user information, respectively to the condition matching devices which store user information of the categories corresponding to the conditions, the program causing the computer to perform:

user ID supplying processing of, in response to reception of condition matching device identification information for identifying a condition matching device from a user terminal, transmitting a user ID of a user who uses the user terminal to the condition matching device identified by the condition matching device identification information, and storing user ID transmission status information indicating which user's user ID has been transmitted to which condition matching device;

linked conditional matching processing of repeating processing of causing a respective condition matching device that has received a condition from the condition designating unit to specify a user ID of any user whose user information matches the condition, to thereby specify the user ID of any user whose user information of the respective categories for which the conditions have been determined meets the corresponding conditions; and user ID selecting processing of selecting a user ID of any user having his/her user IDs transmitted respectively to the condition matching devices that have received the conditions from the condition designating unit, on the basis of the user ID transmission status information stored in the user ID supplying processing;

wherein in the linked conditional matching processing, the program causes the computer to perform the user ID selecting processing, to perform processing of transmitting a list of the user IDs selected in the user ID selecting processing to a condition matching device to cause the condition matching device to specify, from the list of the user IDs, the user ID of any user whose user information matches the condition transmitted to the condition matching device, and thereafter, to perform processing of sequentially transmitting a list of the specified user IDs to another condition matching device to cause the condition matching device to specify, from the list of the user IDs, the user ID of any user whose user information matches the condition transmitted to the condition matching device.

10. A non-transitory computer readable information recording medium storing a linked conditional matching program installed in a computer connected to a plurality of condition matching devices, a condition designating unit, and an user ID supplying unit via a communication network, each condition matching device specifying any user whose user information matches a designated condition, the condition designating unit transmitting a plurality of conditions that should be met by user information and that have been determined for different categories of user information, respectively to the condition matching devices which store user information of the categories corresponding to the conditions, the user ID supplying unit being operable, in response to reception of condition matching device identification information for identifying a condition matching device from a user terminal, to transmit a user ID of a user who uses the user terminal and user ID supplier identification information for identifying a user ID supplier that the user terminal is using, to the condition matching device identified by the condition matching device identification information, and store user ID transmission status information indicating which user's user ID has been transmitted to which condition matching device, the computer including an user ID supplier identification information storing unit for storing predetermined user ID supplier identification information, the program causing the computer to perform:

linked conditional matching processing of repeating processing of causing a respective condition matching device that has received a condition from the condition designating unit to specify a user ID of any user whose user information matches the condition, to thereby specify the user ID of any user whose user information of the respective categories for which the conditions have been determined meets the corresponding conditions; and user ID selecting processing of selecting a user ID of any user having his/her user IDs transmitted respectively to the condition matching devices that have received the conditions from the condition designating unit, on the basis of the user ID transmission status information stored in the user ID supplying unit;

wherein in the linked conditional matching processing, the program causes the computer to perform processing of transmitting the user ID supplier identification information stored in the user ID supplier identification information storing unit to one of the condition matching devices that have received the conditions from the condition designating unit, to cause the condition matching device to specify, from among user IDs associated with the user ID supplier identification information, the user ID of any user whose user information matches the condition transmitted to the condition matching device, to perform the user ID selecting processing, and to perform processing of transmitting a list of the user IDs selected in the user ID selecting processing to another condition matching device to cause the condition matching device to specify, from the list of the user IDs, the user ID of any user whose user information matches the condition transmitted to the condition matching device, and thereafter, to perform processing of sequentially transmitting a list of the specified user IDs to another condition matching device to cause the condition matching device to specify, from the list of the user IDs, the user ID of any user whose user information matches the condition transmitted to the condition matching device.

* * * * *

UNITED STATES PATENT AND TRADEMARK OFFICE
CERTIFICATE OF CORRECTION

PATENT NO. : 8,924,422 B2 Page 1 of 1
APPLICATION NO. : 13/818269
DATED : December 30, 2014
INVENTOR(S) : Takeaki Minamizawa It is certified that error appears in the above-identified patent and that said Letters Patent is hereby corrected as shown below:

On the Title page, item 56

Column 2, - Other Publications: Delete "sam l/" and insert -- saml/ --

Column 2, - Other Publications: Delete "sam l" and insert -- saml --

Signed and Sealed this
Fifteenth Day of September, 2015

Michelle K. Lee
*Director of the United States Patent and Trademark Office*